(12) United States Patent
Hurwitz et al.

(10) Patent No.: US 7,537,153 B2
(45) Date of Patent: May 26, 2009

(54) METHOD AND COMPUTER PROGRAM PRODUCT FOR ELECTRONICALLY MANAGING PAYMENT MEDIA

(75) Inventors: Harlan A Hurwitz, River Edge, NJ (US); James H Halpin, New Milford, CT (US); Robert M Pickles, Jr., Chesapeake, VA (US); Daniel Wobser, Jackson, NJ (US); Corneliu C Chirnoaga, Edison, NJ (US); Mark Ladwig, Miami Beach, FL (US); Steven Antonelli, Suffern, NY (US); Darren Taylor, Wellingborough (GB)

(73) Assignee: De La Rue International, Limited, Hampshire (GB)

( * ) Notice: Subject to any disclaimer, the term of this patent is extended or adjusted under 35 U.S.C. 154(b) by 0 days.

(21) Appl. No.: 11/117,563

(22) Filed: Apr. 29, 2005

(65) Prior Publication Data

US 2006/0065717 A1 Mar. 30, 2006

Related U.S. Application Data

(60) Provisional application No. 60/566,912, filed on May 3, 2004.

(51) Int. Cl.
G06Q 40/00 (2006.01)
G06F 19/00 (2006.01)
G06Q 30/00 (2006.01)
G06Q 90/00 (2006.01)
G06G 1/14 (2006.01)
G06Q 10/00 (2006.01)

(52) U.S. Cl. ............... 235/379; 235/381; 235/385; 705/22; 705/28; 705/43; 705/44; 705/45

(58) Field of Classification Search ........... 235/379, 235/383, 381, 385; 705/22, 28
See application file for complete search history.

(56) References Cited

U.S. PATENT DOCUMENTS

| | | | | |
|---|---|---|---|---|
| 4,365,700 A | * | 12/1982 | Arimoto et al. | 194/206 |
| 5,313,050 A | * | 5/1994 | Hiroki et al. | 235/379 |
| 6,213,310 B1 | | 4/2001 | Wennersten et al. | |
| 6,554,185 B1 | * | 4/2003 | Montross et al. | 235/379 |
| 6,845,907 B1 | * | 1/2005 | Enright | 235/381 |
| 7,110,954 B2 | * | 9/2006 | Yung et al. | 705/1 |
| 7,120,365 B2 | * | 10/2006 | Yamazaki | 399/8 |
| 2002/0030101 A1 | * | 3/2002 | Inoue et al. | 235/381 |
| 2002/0063035 A1 | | 5/2002 | Blad et al. | |
| 2003/0149630 A1 | * | 8/2003 | Jacobs et al. | 705/17 |
| 2004/0249718 A1 | * | 12/2004 | Kuroda et al. | 705/17 |
| 2005/0108168 A1 | | 5/2005 | Halpin et al. | |

FOREIGN PATENT DOCUMENTS

| | | |
|---|---|---|
| EP | 0 724 242 A2 | 7/1996 |
| WO | WO 03/046841 A1 | 6/2003 |
| WO | WO 03/046842 A1 | 6/2003 |
| WO | WO 03/046845 A2 | 6/2003 |

* cited by examiner

*Primary Examiner*—Thien M. Le
*Assistant Examiner*—Tuyen K Vo
(74) *Attorney, Agent, or Firm*—Oliff & Berridge, PLC

(57) ABSTRACT

A method of electronically managing payment media, includes the steps of: (i) determining an amount of payment media dispensed from a payment media dispensing device, based on electronic point-of-sale data received from a point-of-sale register associated with the payment media dispensing device; and (ii) determining an inventory amount of the payment media remaining in the payment media dispensing device based on the determined amount of payment media dispensed from the payment media dispensing device. A computer program product can store a computer executable program that includes instructions to cause a controller of a transactions processing system to perform the above steps.

41 Claims, 19 Drawing Sheets

Fig. 2
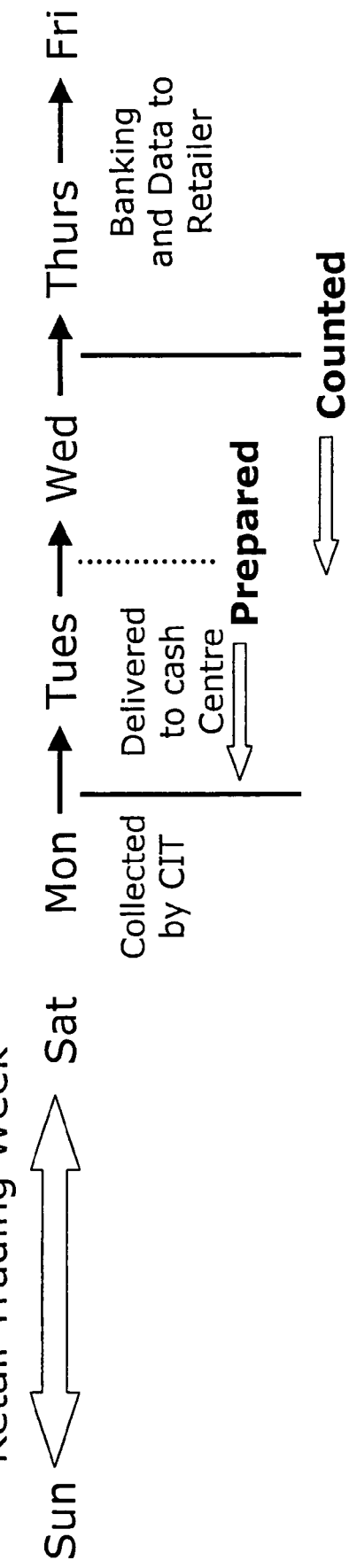
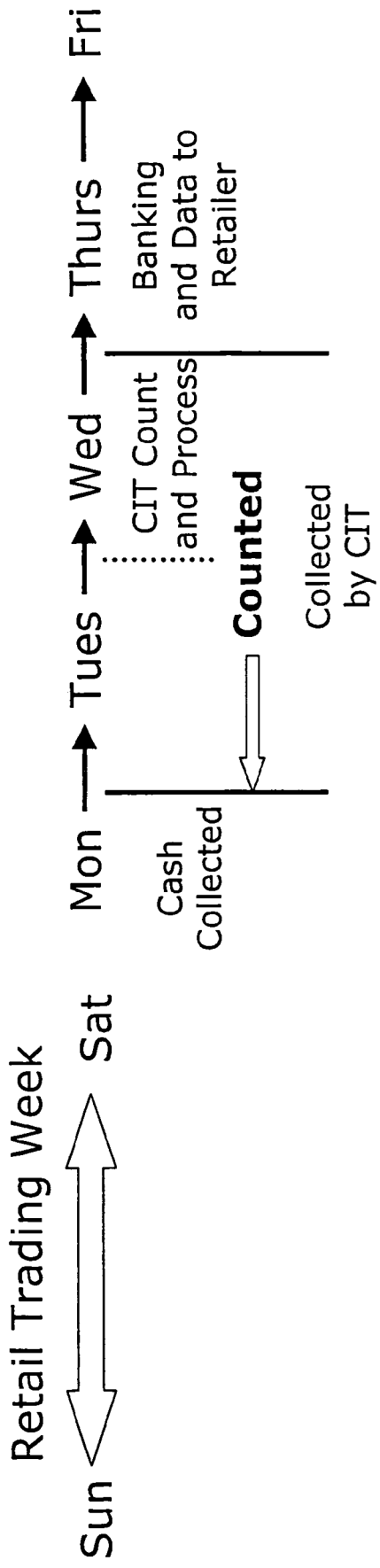

Fig. 10  Dispense Change

Count and Login + Rejects

Bank Deposit

Capacity Management

Event Timing Process

METHOD AND COMPUTER PROGRAM PRODUCT FOR ELECTRONICALLY MANAGING PAYMENT MEDIA

INCORPORATION BY REFERENCE

This Nonprovisional Application claims the benefit of U.S. Provisional Application No. 60/566,912, filed May 3, 2004, the disclosure of which is incorporated by reference herein in its entirety.

BACKGROUND

The invention relates to the use and management of payment media within a retail environment, including the handling of physical media, the processing of logical data associated with it and the maintenance of integrity between the physical media and the logical data. In particular the invention relates to the methods, apparatus and systems to enable secure, auditable, efficient and cost effective movement and recycling of payment media both within the retail environment and to final reconciliation with a banking institution, including processing through cash-in-transit, service providers.

There are a numerous issues facing the retailer with respect to managing the flow of valuable media such as cash. Notably:

Loss due to fraudulent activity or accounting errors.
Increased resource, equipment and working capital costs associated with handling large quantities of media on site.
The need to reduce the cost of handling and preparing media by third parties such as cash in transit operators and banks.
The need to reduce the time to refill or replenish media dispensing machines and to minimize the time to physically check the media dispensing receptacles so as to minimize the interruptions to customer service.
To secure the integrity of the payment media audit trail both within the retailer and potentially whilst the payment media is in transit.

SUMMARY

One aspect of the invention, relates to a method of electronically managing payment media, the method comprising: (i) determining an amount of payment media dispensed from a payment media dispensing device, based on electronic point-of-sale data received from a point-of-sale register associated with the payment media dispensing device; and (ii) determining an inventory amount of the payment media remaining in the payment media dispensing device based on the determined amount of payment media dispensed from the payment media dispensing device.

According to one embodiment, the step of determining the inventory amount also is based on a start amount of the payment media contained in the payment media dispensing device prior to dispensing the payment media.

According to one embodiment, the method also includes automatically determining that a refill operation should be performed for the payment media dispensing device based on the determined inventory amount. For example, it is automatically determined that the refill operation should be performed by comparing the determined inventory amount to a predetermined payment media level. According to one embodiment, the payment media dispensing device contains at least one of currency bills and coins of different denominations, and the comparing step is performed for each of the different denominations.

According to one embodiment, the method also includes the step of automatically determining a refill amount when it is determined that the refill operation should be performed. For example, when the payment media dispensing device contains at least one of currency bills and coins of different denominations, the refill amount can be determined for each of the different denominations for which the refill operation should be performed.

According to one embodiment, it is possible to issue an alert that the refill operation should be performed when it is determined that the refill operation should be performed. The alert can be issued on a display screen.

According to one embodiment, the method includes the step of automatically determining a refill amount based on a comparison of the inventory amount to a maximum desired amount of the payment media to be contained in the payment media dispensing device. For example, the refill amount can be automatically determined at least at one of an end of a shift and a beginning of a shift of a cashier that operates the point-of-sale register. In addition, the maximum desired amount can be adjustable. For example, the maximum desired amount can be set by a person other than an operator of the point-of-sale register with which the payment media dispensing device is used. According to one example, the maximum desired amount is a full capacity amount of the payment media dispensing device.

According to one embodiment, the inventory amount is determined each time that the payment media dispensing device dispenses the payment media. According to another embodiment, the inventory amount is determined at intermittent intervals.

According to one embodiment, the method is performed for a plurality of payment media dispensing devices located within a place of business. According to another embodiment, the method is performed for a plurality of payment media dispensing devices disposed in different buildings.

According to one embodiment, the payment media dispensing device is a passive device that does not generate data regarding the payment media dispensed from the payment media dispensing device.

According to one embodiment, the method also includes the step of providing reports based on the point-of-sale data, the reports being at least one of printed and displayed.

According to one embodiment, the payment media dispensing device also is capable of accepting payment media from a customer.

The payment media can include coupons, coins, and/or currency bills.

Another aspect of the invention relates to a computer program product for use in a system that includes a computer, a payment media dispensing device and a point-of-sale register that is electronically linked to the payment media dispensing device, the computer being electronically linked to the point-of sale register via a network, the computer program product comprising instructions that are executable by the computer for causing the computer to perform any of the methods described above.

BRIEF DESCRIPTION OF THE DRAWINGS

The current invention will now be described in detail by way of examples and by reference to the following figures.

FIG. 2 illustrates the current payment media cycle time line using either the traditional banking cycle or the Prime Count cycle.

DETAILED DESCRIPTION OF EXEMPLARY EMBODIMENTS

Figure 1:
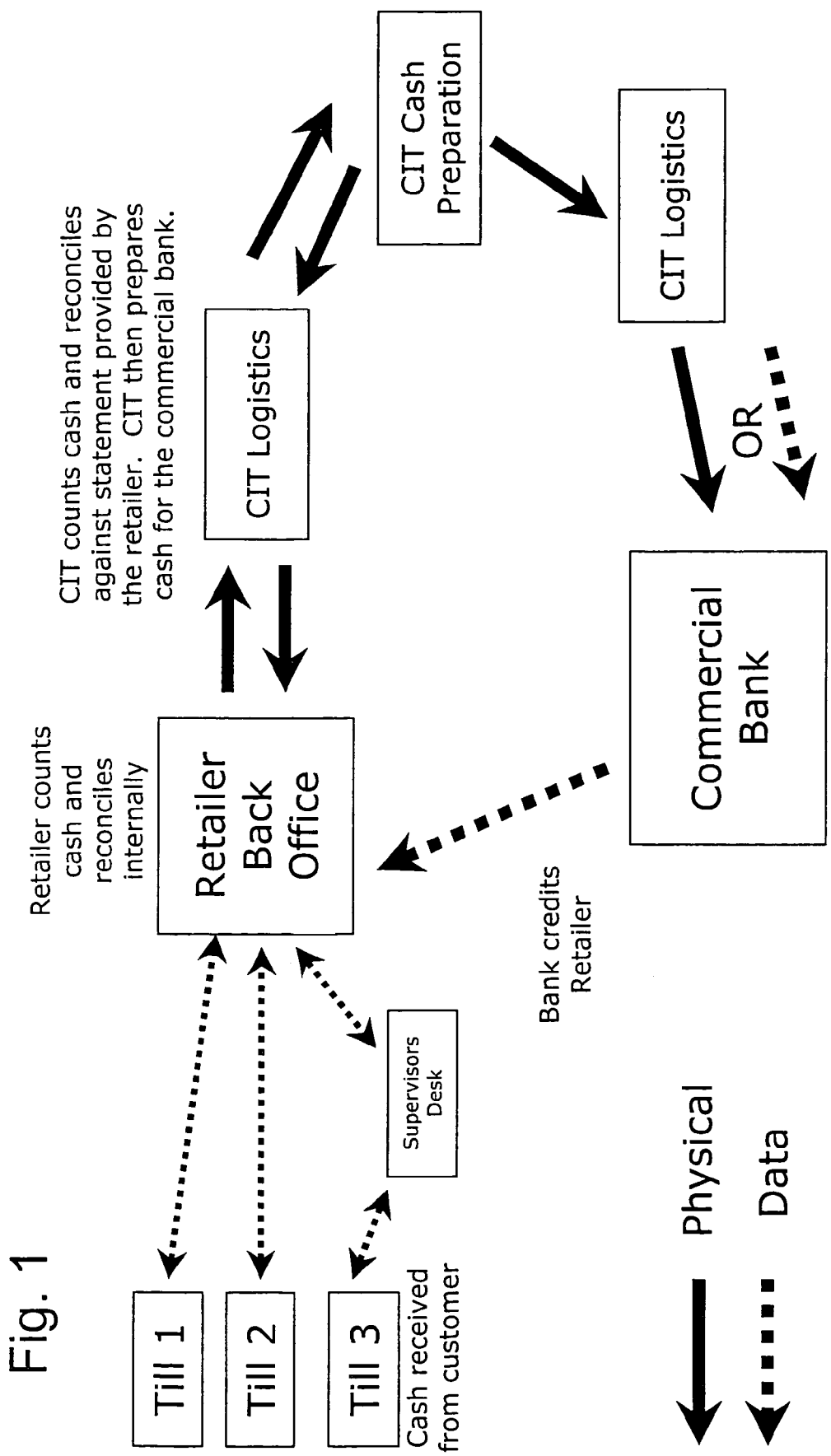
FIG. 1 shows a schematic illustration of the retail payment media cycle.

In order to understand the invention it is helpful to expand upon the problems briefly detailed above. It should be noted that within this document the term media is used to define payment media in its broadest sense and includes notes, coins, vouchers, checks, scrip, debit and credit card transactions plus their resulting paper receipts, casino chips, tokens of value, and electronic cash.

Loss Due to Fraudulent Activity

As with all environments where valuable media is present, fraudulent activity is a key concern. In this instance such activity can be in any number of forms. Examples of this include the passing of counterfeit currency, which may be accidentally or deliberately accepted by a cashier. As counterfeit currency is not legal tender and will not be accepted as such by a commercial bank the acceptance of it by the retailer constitutes a loss. It is also known for cashiers to deliberately pass excess change to associates or seek to defraud the retailer by not entering the correct value for goods. Such loss events are not confined to the shop floor and may take place in the back office either before or after media has been counted and/or prepared for CIT operators or a commercial bank. Essentially any point where there is human intervention or handling of media presents an opportunity for fraudulent activity. As a result any party receiving media has to recount it in order to be certain the correct amount has been passed. The recounting of media is costly and time consuming. If human intervention can be limited or avoided then the need to recount the media is also reduced or avoided.

Increased Resource Salary Costs to the Retailer

Retailers need to know the amount of media they are passing on to the CIT operator or commercial bank otherwise any loss whilst the media is in transit or with the CIT/Bank will have to be borne by the retailer. Obviously such a situation is wholly unacceptable to the retailer, so in general the media is counted prior to being picked up by the CIT Logistics. The counting activity is costly, time consuming and requires human intervention and the consequent exposure to fraudulent activity. However it is essential the retailer know exactly how much media they are passing out to a CIT or commercial bank so they currently have to employ additional staff or reallocate resource to this activity.

There are additional issues where a retailer is reallocating staff from other duties or requiring staff to carry out the counting function as part of their usual retail staffing duties. Notably it should be appreciated that unlike banking staff who are trained to handle media and equipment, many retail staff are only given very brief training, if any at all, and as such the counting process needs to be as simple as possible. The retail staff should not be required to interact to any great extent with the equipment or be required to make sometimes difficult decisions, e.g., the provision of till start funds or denomination distributions when issuing change.

Reduce the Cost of Handling and Preparing Media by Third Parties

Large retailers are required to present media to a CIT media processor, commercial bank or other third party in a given format. The format may be governed by the third party to enable them to count and reconcile the media as quickly and efficiently as possible. The onus is therefore on the retailer to ensure the media deposit is prepared correctly before passing to the bank. Where the retailer does not or cannot prepare the media, CIT operators may be used to prepare the media away from the retail site. This is very expensive and generally not a cost effective solution other than for the largest of retailers. Also as an additional media handling process is been carried out with human intervention there is another exposure to potential fraudulent activity.

Reduce Time to Refill or Replenish Payment Media Dispensing Devices (A) Retailers struggle endlessly with trying to minimize the inconvenience to their customers. Oftentimes at the check-out counters at such retailers, point of sale terminals will issue change based on the transaction amount and the money tendered by the customer. It is practically everyone's experience that the till drawers will run out of coinage or notes sufficient to make the appropriate change. In these circumstances, oftentimes the cashier must either travel to the back office or communicate somehow or other with a person in the office to bring out an appropriate advance which will allow the cashier to make the change for the current customer as well as the anticipated disbursements for a given, subsequent period of time. Not only does the customer then at the register have to wait out the delay, but others in line also must wait.

(B) It is apparent that this problem is or can be significant where a high number of transactions are to take place, for example express lanes, and/or where cash is a required medium of payment by the customer for the goods or services purchased.

(C) As retailers look to automate the various processes involved at POS registers, the use of automatic media dispensing and/or accepting devices is increasing. Such devices may be sealed and not otherwise easily visible to the cashier and/or back office person. Thus it becomes a difficult task to check the remaining level of media in such devices so as to anticipate and avoid the interruption of service when replenishing them.

(D) In addition to dispensing cash media, such terminals and/or other dispensing devices under the control of the POS terminal or otherwise situated in a retail establishment, will disburse other forms of media which have value at the point they leave the dispensing device. These might include for example, coupons to be used for a subsequent purchase in the store, gift certificates, postage stamps, loyalty rewards and so forth. As with the cash media, these items need to be replenished, tracked and be subject to an audit for the important reasons elaborated upon below.

It is intended that by addressing these issues five benefit streams are generated. These five benefit streams are loss prevention, reduction in operating costs, working capital reduction, reduction of third party costs and improved customer service. Loss prevention is self-explanatory and is the limitation of any losses through fraudulent activity. Reduction in operating costs relates to the lowering of internal staffing and systems costs. The reduction of working capital, i.e., the payment media liquidity necessary for processes within the retailer, results in lower float costs and interest lost. Third party costs relate to the costs associated with CIT, banking institutions and other agencies that might handle payment media generated or required by the retailer. Finally it is hoped that by improving efficiencies at point of sale and elsewhere customer service can be improved directly by increasing speed and accuracy at the point of payment and indirectly by releasing staff resources and management time to customer serving tasks.

In order to access these five benefit streams it has been recognized that the current approach to managing media processing procedures must be changed. In order to appreciate the improved processes it is important to know a little more about the retail payment media cycle.

Provision of a Secure Audit Trail

Currently within most retail environments a retailer is unable or finds it difficult to determine at what point media loss is occurring.

For example in many retail outlets a cashier will log onto a till at the start of a shift and log off at the end. Typically the till position will be taken up by another cashier who works the next shift. Furthermore, cashiers may log on and off of tills during a shift dependent upon the number of tills that need to be open at any one time due to customer demand. Tills may be emptied either periodically or only at the end of a day. It is very rare that a till will be cashed at the same time the cashier logs on or off. Consequently identifying which cashier was operating the till when a loss was incurred is currently near impossible. The retailer would wish to know which cashier was operating the till at the time when a loss occurred so the cashier can either be retrained, if the loss was a legitimate accident, or disciplined if the loss was deliberate and unlawful.

It is therefore desirable to provide methods that avoid human intervention during the media handling process on the shop floor, in the back office and at the CIT. By automating processes and providing physical, tamper evident secure means for transporting media it is possible to limit if not remove the need for retail staff to handle media once a initial count has been made.

It is also desirable to enable the retailer to count, reconcile and prepare the media in a format that is acceptable to the commercials banks thus removing the need for CIT operators to handle the media beyond the transportation requirement.

It is also preferable to provide a secure audit trail detailing media movement from the till to the bank. By providing security and integrity for both the physical media and audit trail it is possible to remove the need for media to be recounted by the commercial bank and in consequence the retailer could have their bank account credited far sooner than is currently the case.

With respect to the payment media dispensing and/or accepting devices, it is desirable to do spot audits of the devices while in operation on the floor. It is desirable to secure the audit trail in a random way so that over a given period all of the media dispensing devices can be checked, that is the actual physical content against the calculated value as determined by a media tracking type software accessing for example the POS transaction data.

Consider first the payment media management cycle within the retail environment as shown in FIG. 1 and the associated timeline, shown in FIG. 2, between the retailer accepting media from a customer and that media being credited to their Bank account.

In FIG. 1 media is accepted from a customer at a till. In the majority of retailers there will be more than one till and indeed could be tens of tills. Dependent upon the retailer the media may be taken directly to the back office to be reconciled or taken via a supervisor. The supervisor collects the media and may also issue change and start funds as and when required. Irrespective of the route, the media is taken to a secure back office area for counting and reconciling internally.

Once counted and reconciled the media is taken once a week or more to a Cash in Transit (CIT) operator. The transportation of media is usually via a secure CIT logistics operator, but it is known for other third parties to provide such services. Once the media is in the CIT it usually has to be prepared and put into a format suitable for high speed sorting and counting. This process is very time consuming and expensive. Once prepared, the media is counted and reconciled. Dependent upon the CIT operator's relationship with a commercial bank the media may or may not be then taken to the commercial bank. Increasingly the media is held at the CIT and redistributed back to retailers. The bank receives details of the media value from the CIT and credits the retailer's account accordingly. This cycle from retailer accepting media from a customer to having their account credited may take a significant period of time. The period of time is governed by the payment media cycle within which the retailer is operating. There are two main payment media cycles utilized by retailers, a Traditional Banking cycle and the Prime Count cycle both of which are illustrated in FIG. 2.

In both payment media cycles, the trading week is shown as running from Sunday to Saturday, this is typical but not always the case. Considering first the Prime Count cycle, the media is collected by a CIT logistics operator on a Monday. It is then delivered and through Tuesday prepared in a suitable format for counting. On the Wednesday, the media is then counted and finally the retailer's account is credited on the Thursday. If there is a very high volume of media, the preparation and counting may take several days each and thus delay the crediting of the account. For some retailers who take very large volumes of media, it can be more economically viable to have multiple collections during the retail week.

Typically, within the traditional banking cycle again the retail week is shown running from Sunday to Saturday. On Monday the retailer will collect the media which is then counted and reconciled internally on the Tuesday. Late Tuesday the media is collected and taken to the CIT operator. The CIT operator prepares and counts the media on Wednesday and into Thursday as appropriate for the volume of media. Finally the retailer has their account credited on the Thursday or Friday. Again the time required by the CIT is very much dependent upon the volume of media and the amount of preparation required. It is preferable to the retailer to improve this situation in two ways. Firstly the retailer would like to limit the cost of the CIT logistics, preparation and counting operations and secondly the retailer would like their account to be credited far sooner.

Figure 3:
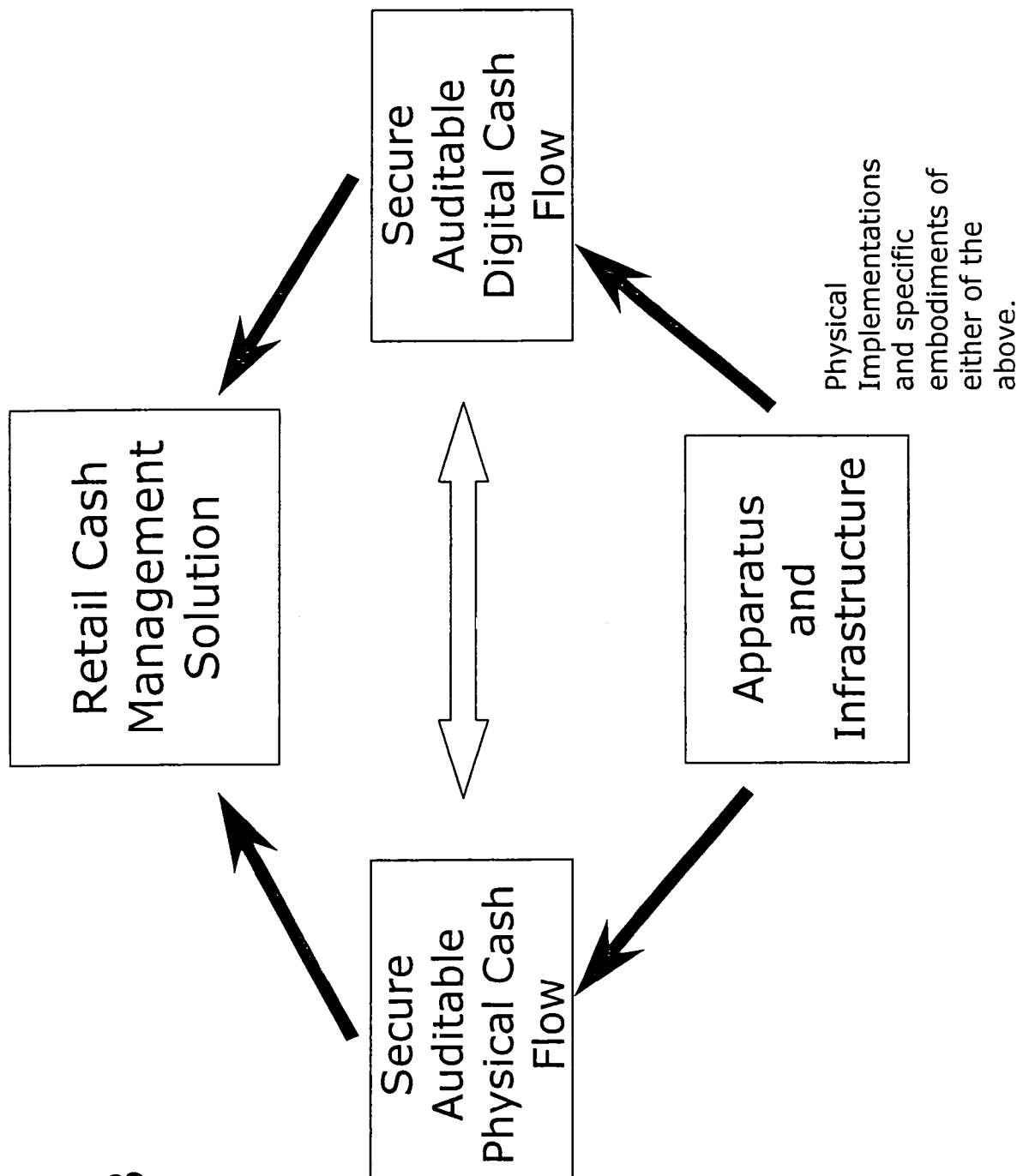
FIG. 3 schematically illustrates the various components that comprise a secure Retail Payment Media Management solution.

The cycle illustrated in FIG. 1 can be further simplified by considering the basic components independently of the retailer, CIT or commercial bank. This is illustrated in FIG. 3. In order to achieve a fully integrated retail media management solution, three key elements need to be considered: the provision of a secure auditable physical media flow, the provision of a secure auditable digital media flow and finally the apparatus and infrastructure required for implementing both of the above. The three elements are intended to provide the data integrity and security to remove the need for multiple media counts and consequently speed up the media cycle allowing the retailer to be credited far sooner than is currently possible. The combination of these three components enables the enhanced payment media management cycle.

Dependent upon requirement and need, differing levels of automation, tracking and audit may be introduced. The point at which a retailer decides to implement a solution will be very much dependent upon current practice and future requirement. Consider each of these three in turn.

Secure Auditable Physical Media Flow

It is essential that any party receiving media is confident that the media has not been interfered with in any way. This holds true throughout the media cycle from till to Bank. It is therefore essential that any movement of media is fully accountable and secure.

The secure, accountable movement of media begins with the till and the cashier. It is essential to limit the opportunity for fraud and if not possible, to ensure you can account for it. Several approaches are available to counter the issues surrounding the shop floor environment.

Provide a fully automated till position where the customer handles the media. A till operator may or may not be present to assist in the process of inputting the value of goods by scanning or keypad. Systems of this type are currently available, one example of which is the NCR Corporation's Fastlane™ series retail till. These provide a means by which the consumer retains control over the media transaction and the cashier does not generally become involved in the media transaction. The current offerings are limited as they do not then seek to carry this benefit through to the rest of the payment media management cycle.

Provide a means to automatically check for counterfeit documents as they are received from the customer. Currently the ability to determine whether a customer is passing a counterfeit note is reliant upon the skill of the cashier to detect the counterfeit. The reliance on the cashier's skill can be removed if the media is paid into the till via an automated media acceptor with authentication capability. Any suspect notes can be returned for manual inspection by the cashier or a supervisor, alternatively they may be returned to the customer. Obviously media is not the only form of physical payment accepted with retail stores, so the equipment should be capable of authenticating vouchers, coupons, checks and other financial instruments of value.

Provide a method of counting media receipts at or as near the till as possible. This enables a retailer to quickly identify which tills are falling short by a simple comparison of the value stated on the EPOS against the value counted. Apparatus is currently available to enable a retailer to count on the shop floor, examples of which include the "Cash Caddy" supplied by the ACT Company of the United Kingdom and devices as described in U.S. 20020063035 filed under the assignee name Kenneth R Dickinson. Such devices are designed to move from till to till by an individual but may also be provided with motors to drive the wheels making movement around the retailer easier.

The need to secure the physical movement of media is also present when considering the back office environment of the retailer. The level of media handling carried out in the back office will be dependent on the level of automation on the shop floor and the extent of involvement the retailer wants the CIT to have in preparing the media for the Bank. There are a number of approaches for providing a secure environment for media and/or media handling in the back office.

Where a till is fully automated and feeds media into a secure removable cartridge the back office may only serve as a secure holding area until the CIT arrives to make a collection.

Where tills are partially automated or media is collected into a storage medium on the shop floor it may be necessary to recount the media and store it in tamper evident secure containers in readiness for the CIT.

The retailer may wish to go further than this and make efforts to prepare media in a suitable format for the banks removing the need for the CIT to do any preparatory work.

Finally the retailer may wish to manage the media internally, reissuing media back into the store in a fully audited manner. The reissue of media may be, for example, to restock ATM's, or till floats. This enables the retailer to minimize the amount of media that needs to be handled by the CIT and Bank.

It is also important to consider the movement of media between the retailer, CIT and the bank. If the retailer is able to prepare the media in the correct format for the bank and secure it in a tamper evident container, then the need for the CIT is significantly reduced. As indicated earlier, the use of a CIT to prepare media introduces significant cost into the media cycle and an additional level of risk.

It should also be appreciated that the retailer would like to undertake many or all of the measures but without significant increase in staffing cost or having to retrain existing staff. Any solution should have a very simple interface with the user but be sophisticated enough to deal with the ever changing and complex retail environment.

Secure Auditable Digital Media Flow

As with physical media flow, it is essential that all parties concerned have confidence in the digital media flow. The digital media has an increasing importance as we move from manual to automated systems and a secure digital media flow could potentially remove the need to recount media repeatedly through the media cycle.

Many of the large retailers utilize advanced software applications for managing checkout operations, reconciliation, and numerous other functions. One example of such software is the IBM 4680-4690 Supermarket Application. Such software applications provide a starting point from which a secure digital audit can be put in place. Indeed it would be preferable for the audit process to begin at the point of sale in order to accurately reconcile till contents against transaction history.

However, it is not always cost effective or practical for all retailers to implement such a point of sale approach, so wider consideration has to be given to the whole retail payment media cycle. Wherever the reconciliation takes place, be it on the shop floor or the back office, the retailer needs to understand where any inconsistencies or shortfalls have taken place so they can account for the error and if necessary take further steps to prevent a recurrence. Essentially "bagging and tagging" media can achieve this. The bagging process refers to the physical measures that can be undertaken as highlighted above and the tagging refers to the digital measures. The media is tagged with its associated information, such as transaction history before being handled further. This tagging process can, as suggested above, occur as the money is entered into the till, as the money is taken from the till, or as the money is counted in the back office. However it should be appreciated that as the tagging process moves away from the point of media acceptance it becomes harder to track back to any inconsistencies that may have taken place at point of sale. That is absolute confidence in the audit trail can only be achieved after the media is "bagged and tagged". The tagged digital data can then be sent either directly to a commercial bank or it is proposed the data could be sent to a secure database so it can be interrogated by those who have a need to know. Such interrogation may be required by a retailer's Head Office that wishes to monitor media flow to and from its branches.

Obviously the physical and digital movement of media are not two wholly separate processes and are very much dependent upon each other. For example once the media is "bagged and tagged", it is preferable the media is not accessed again until the media reaches the commercial bank for counting and deposit. It is therefore essential that the CIT does not open the tamper evident physical containers to access the media.

Figure 4:
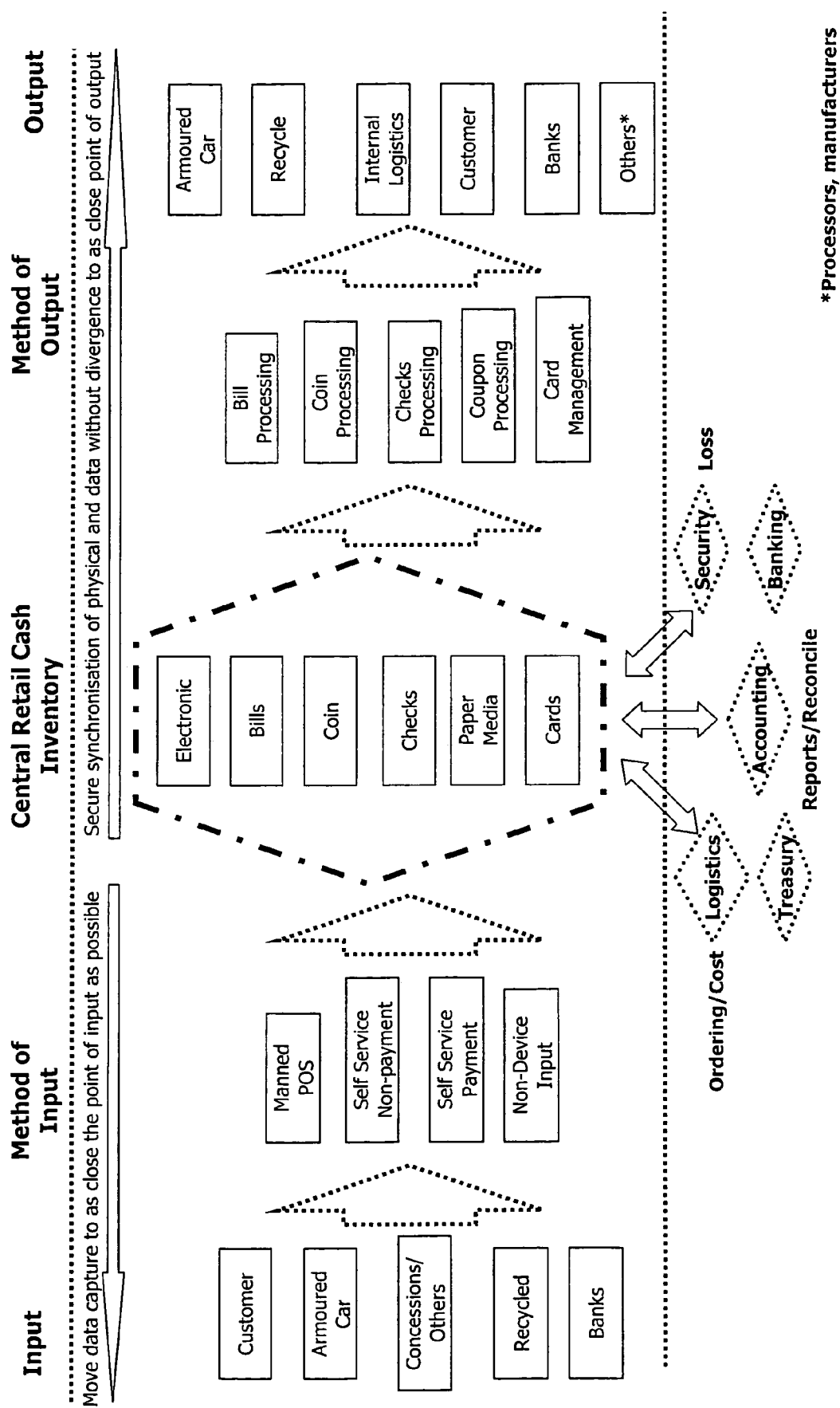
FIG. 4 illustrates the physical Retail Cash Inventory.

As will be apparent from the above discussion, the way in which the payment media cycle is managed can vary significantly dependent upon the needs and requirements of the individual retailer. However, irrespective of a particular retailer's requirements and needs, there are three basic aspects to the cycle. Payment media enters the retailer by a various means, it is retained within the retailer for a period, and finally payment media exits the retailer. FIG. 4 schematically illustrates this and shows the various processes associated with handling and managing media within a retailer.

FIG. 4 splits the movement and handling of payment media into five component areas: input; method of input; central retail payment media inventory; method of output; and output. In addition to these five sections, the figure also illustrates that the central retail payment media inventory can be interrogated to determine additional information for purposes such as logistics, treasury, accounting, banking and security.

Input

Payment media may be brought into the retailer by a number of sources and these are highlighted under the Input section.

Customer—The most significant, certainly in terms of volume of transactions if not also value, is input from customers. Customers visit the store and provide payment in return for goods. In the retail environment, customers can infuse additional payment media, through check cashing and through engagement in non-retail transactions, including ATM and other bank transactions, etc.

Armored Car—Deliveries of payment media can be made to the retailer by an Armored car. Typically such deliveries comprise low value payment media such as coin or small denomination notes, and paper media (coupons, vouchers etc.).

Concessions/Others—Within a retailer, particularly larger retailers, there may also be other concessions. Such concessions range from vending machines, customer deposit apparatus, to small shops within the main retail outlet.

Recycled—As well as new payment media being brought into the store, it is possible to reuse or recycle existing media. Though this is a wholly internal process it can still be viewed as being an input/output process.

Banks—New payment media may also come from a bank. This is particularly the case for smaller retailers for whom it may not be cost effective to use CIT operators.

Method of Input

Irrespective of where the input into the store comes from it must enter the retailer by some method. The various methods of input can be summarized as follows.

Manned Point of Sale—In many retailers the majority of payment media will enter via a manned point of sale device. These are usually tills manned by cashiers who will handle the payment media manually and effectively recycle payment media from the point of sale. Alternatively the customer may be required to deposit payment through some automated acceptance device. In either example a cashier oversees the process.

Self-Service Payment—It is becoming more common for large retailers to also have self-service payment facilities. These may be fully automated tills where the customer both self-scans goods and makes payment through some automated payment means. Alternatively vending machines may also be considered to be self-service payment. In addition to both these the retailer may also allow for payment of other services via automatic teller machines or the like. Such other services may include banking deposits, purchase of insurance, mobile phone top-ups, etc.

Self-Service Non-Payment—It is known for Retailers to have devices in store that accept payment media and redeem this for alternative payment media of an equivalent or related amount. One example of this is the coin deposit and value redemption machines supplied by CoinStar Inc. of Bellevue Wash. Here a user deposits loose unsorted, uncounted coin into a self-service coin acceptance device. The device counts the coin and provides the user with a voucher or equivalent for related value, which can then be spent within the store.

Non-Device Input—As indicated above not all payment media enters the retailer via the shop floor. A certain amount enters via banks or armored car. Such payment media will typically be delivered directly to the retailer back office where it will be processed and issued out to the shop floor in the form of start funds or cash advances.

Central Retail Cash Inventory

Once the payment media has been inputted into the retailer from whichever source and via whichever means it essentially sits in a central cash inventory. That is to say the payment media may be held in a variety of locations within the store including tills, back office, vending devices, etc., but it is the property of the retailer and therefore their responsibility. Once accepted by the retailer the payment media must be processed, such processing including moving and counting the payment media. In addition to this, periodically the central retail cash inventory is interrogated for purposes such as logistics, accounting, treasury, security and banking. These processes will be defined and discussed in more detail later. FIG. 4 shows the various types of media that might be held in the central retail cash inventory. Within many retailers, a key goal is the ability to effectively and efficiently manage this central retail cash inventory in order to provide the five benefit streams detailed above.

Bills—Various denominations of banknotes that may be all the same currency or a mixture of currencies from different issuing authorities. For example US Retailers situated on the borders of Canada or Mexico may take Canadian dollars or Mexican Pesos in addition to US dollars. Within Europe many countries now use the Euro but some countries such as the UK as yet do not. Some retailers in the UK or on mainland Europe may wish to accept both the Euro and Sterling. The ability to accept two different issues of currency is also beneficial during a handover period where either a currency is changing or, less dramatically, old designed notes are being pulled out of circulation for replacement by new notes.

Coin—Coin is still very heavily used throughout the world particularly for low value transactions. Coin is heavy and generally viewed as costly to handle from the perspective of the retailer. To this end it is very important that a retailer take all steps possible to maximize the efficient usage and management of coin. For the purposes of this document the term coin refers to currency coinage, gaming chips, small tokens and the like.

Checks—The extent of usage of checks varies a great deal dependent upon the country in which a retailer is based. Within the USA checks are still very heavily used and as such efficient handling and management of checks are of key value to the retailer.

Paper Media—For the purpose of this document the term paper media covers vouchers, travellers checks, coupons, dinner vouchers. Payment within a retailer need not always be made using currency but can be made by a variety of other means. Many retailers have their own gift vouchers, which can be purchased and redeemed within the retailer; the vouchers may be issued in return for coin deposit or in exchange for return of faulty goods. Some retailers will also accept travellers' checks such as those issued by American Express as an alternative to currency. Coupons are often used within retailers to obtain money off goods, and these need to be processed by the retailer so they can in turn receive money back from the manufacturer or issuer of the coupon. In some countries it is still not uncommon for staff to be issued with meal vouchers. Some retailers will accept such vouchers as an alternative means of payment and need to redeem their value from the organization that issued them.

Cards—An increasing number of transactions are paid for by magnetic-stripe or chip cards. Such cards are also referred to as credit, debit or store cards. Such transactions are typically handled via a third party but the retailer still needs to retain receipts generated by the transactions and keep track of the volume and value of such transactions.

Electronic—Another alternative form of payment is electronic. One example of an electronic payment is where a chip card or other similar device is charged with a value. The card can then be used to pay for goods and the value debited from the card. The cards can be charged at special points, which may be within a retailer, post office, or special location. Another form of electronic payment is EFT or electronic funds transfer. EFT is unlikely to be used for small purchases but it is not uncommon for very large high value purchases to be paid for by a direct transfer of funds from one bank to another.

Method of Output

Payment media taken into the retailer must at some point leave the retailer for a variety of purposes. The payment media can leave the retailer by any of a number of methods.

Bill Processing—Bills need to be processed and this may be done via a variety of payment media handling devices. The complexity and level of automation associated with the bill handling device will be very much dependent upon the volume and value of bills that need to be processed. Details of various types of apparatus will be discussed later in this document.

Coin processing—As for bills the apparatus used and level of processing associated with coin will be dependent of the volume and value of coin to be processed.

Check Processing—The extent to which checks are processed within the store will be very much dependent upon the volume of checks a retailer accepts. The processing of checks will be discussed in more detail later in this document.

Coupon Processing—As indicated above, many stores in return for a discount or some other incentive accept coupons. These coupons need to be processed and the extent of processing will typically be dependent upon the store policy.

Card Management—card transactions must be accounted for and processed. In addition the store must have a means for processing and handling card transaction receipts. Such receipts must be retained for a period in case a transaction is subsequently queried.

Output

Payment media taken into the retailer must at some point leave the retailer for a variety of purposes. The various points of output are as follows.

Armored Car—retailers will periodically prepare a bank deposit, which will need transporting to the retailer's bank. For large retailers the value of the deposit is such that it needs to be moved via an armored car carrier. Also an armored car may be used to collect payment media from other concessions or self-service non-payment inputs.

Recycle—rather than output the payment media in the form of a bank deposit the payment media may be recycled or reused back in store. This is a more efficient use of the payment media and potentially limits the need to order new payment media which would then need to be brought into the retailer at cost.

Internal Logistics—rather than make a bank deposit, payment media may be moved to another store. This is beneficial where a retailer has a number of stores and may wish to consolidate the back office activity. This also offers the potential for reuse/recycling of media across a wider number of stores. Alternatively where a store is located in a retail park or shopping mall each individual store may take their payment media to a central facility for processing. This facility is neither a bank or a CIT but a secure intermediary.

Customer—when a customer pays for goods or services with payment media they will usually require some amount of change. The issuance of change from the retailer is considered to be an output. In addition to this many retailers also provide cash back facilities when a customer pays by card. Here an additional payment is levied against the card in return upon the request of the customer who will then receive notes to the value of that additional payment.

Banks—smaller retailers for whom the value of payment media is not sufficient to justify the use of armored car will take payment media directly to a bank.

Others—by others we mean specialist processors or manufacturers who handle specific types of media such as coupons or dinner vouchers. The relevant media is either picked up or sent to the processor/manufacturer who then processes it and redeems the value to the retailer.

It will be apparent from the discussion thus far that there are three essential aspects: an input, a central inventory and an output. In order for the retailer to gain a full understanding of the nature of the inputs, outputs and the central inventory, they must be provided with a means to interrogate information generated by these three essential aspects. As indicated above the type of information the retailer requires can be defined as:

Logistical—the management of materials flow through an organization.

Accounting—maintaining and auditing an account, preparing records on assets and liabilities including preparation of reports and reconciling expected values against actual values.

Security—precautions taken against theft or loss.

Banking—knowledge and preparation of bank deposits.

Treasury—reconciliation of expected bank deposits against actual bank receipts.

If we now consider an ideal situation two basic assumptions can be made.

1. The input into the cycle is known.
2. The output from the cycle is known.

If you know exactly what your input and output are into and out of the cycle, and they match, then in principle there is no need to know what is happening in between. Indeed gaining knowledge of events between input and output represents additional costs to the retailer and as such must infer some form of additional benefit to justify this cost. It should also be noted at this point that simply having a physical 'inventory' is not sufficient and you must have an associated data or logical 'inventory'. The physical 'inventory' is concerned with the movement, handling and storage of the physical media. The logical 'inventory' comprises data generated from or as a result of processing or counting of the physical media. In an ideal situation the physical and logical will be wholly reflective of each other.

As illustrated in FIG. 4 and discussed previously, for a retailer, physical payment media can enter by any of a number of inputs and exit by any of a number of outputs. These inputs/outputs define the content of the central inventory. Whilst payment media is in the central inventory and during the process of entering and exiting the inventory the media is handled. At any point where the payment media is being handled it is exposed to risk and consequently can be diverted out of the inventory illegally or by accident. The net result is that the expected value of media is not necessarily, indeed unlikely, to be reflective of the actual value of media, i.e., there will be inconsistencies.

Figure 5:
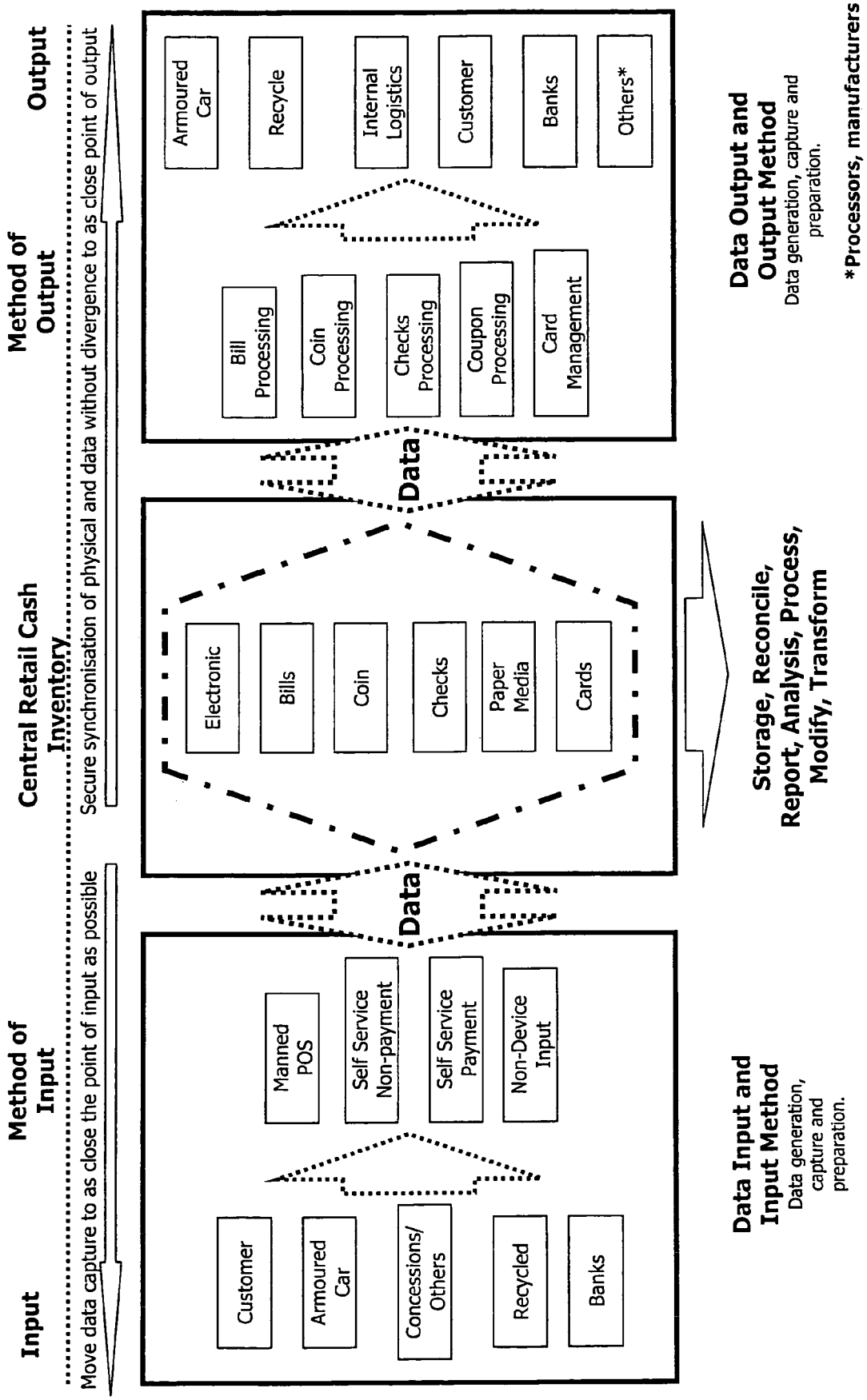
FIG. 5 illustrates the data or logical Retail Cash Inventory.

Now consider the non-physical, logical aspects, shown in FIG. 5. Larger retailers will have electronic point of sale data (EPOS) defining each and every transaction that takes place. It is this EPOS data that defines the reference by which the retailer measures the input and output of their inventory, certainly with respect to payments made into the store. Similarly inputs/outputs from armored cars, banks and the other input sources will also be monitored carefully and data files generated reflecting this activity. Consequently the logical represents the expected input and output of the inventory. If we assume that the logical is correct then we at least have a means to measure the physical. If we are able to provide a measure then we have some basis from which we can attempt to prevent losses, reduce internal costs, reduce external costs and reduce working capital.

The data is generated substantially real time within the retailer and in the first instance it will most likely be stored within the retailer. However it could be stored in a remote location such as a head office facility. In a further alternative, data generated may be duplicated with copies being held in multiple locations. In such situations it is clearly important that one of the data stores is treated as the standard and copies taking from it. This avoids possible confusion with multiple data stores being updated or added to without reference to other stores. In a preferred example, data is stored in one central location and shared. After a period of time this data may be archived at a different location, which will be dependent upon local law and the retailer's information retention policy.

The manner in which the data is stored can also have a bearing on how it is used subsequently. One approach is to store the data as a simple table structure. This is adequate and would be sufficient for the general interrogation of the data. In a more advanced and preferred example the data is stored in a relational database. By storing the data in this way there is greater flexibility in terms of interrogating the data and producing reports highlighting trends.

It is also feasible that any relational database or indeed any data store of the type described above can retain additional information on transactions beyond the financial data. For example the EPOS also keeps track of goods purchased and in some instances details of the customer. Considerable benefit may be gained by being able to link a customer with a particular transaction and the payment for that transaction.

As with the physical, once you have generated the data there are a number of things you can do with it. These can be grouped as follows.

Storage—Data is simply held until required. Storage may be temporary, long term and permanently archived.

Reconciliation—A first data set is compared to a second data set and exceptions highlighted. Both data sets may be held in the same central store or in different stores.

Reports—The data is interrogated in order to generate a defined report. The report may be a consolidation of multiple data sets derived from any of a number of sources.

Analysis—The data may be interrogated to find particular patterns, which can be used for predictive purposes, or to enable decision-making.

Processing—Data may be processed in order to derive certain information or to generate new data sets.

Modification—The data held in the central store may be modified to accommodate apparent errors/discrepancies. For example, in some stores not all sales provide sufficient data to enable complete processing of a payment; as a result the data must be modified to allow the payment process to be completed. One example of this is where the type of sale is not clearly identified, 'general sale'. If the type of sale is not identified, the amount of tax payable cannot be calculated. In order to overcome this, rather than flag every exception the retailer may wish to arbitrarily assign each exception to a particular tax rate. Thus the data has been modified to accommodate a discrepancy. An alternative example is where two tills may be counted as a single till deposit. Here the data will show one till as having a zero count and a second till as having an unusually high count. The data may then be modified so that the high till count is split between the first and second till. In another further example a till may balance but the media within the till may not. For example a till may show a shortage of $50 in payment media but an overage of $50 in checks. This could arise for a number of reasons such as an error when payment was made or the cashier cashing a check. To accommodate this the data may be modified to reflect the actual situation or it may be flagged for further action.

Transformation—Data may be changed from a first format to a second format, e.g., in order to communicate with another system. Alternatively only a limited amount of information may be required from the data. For example, in check processing, although an image of the whole check is captured, only a small amount of the information on the check is required and it is not required in an image format.

These various processes are usually undertaken by a computer application on a central control PC. One example of such an application is the CP4000™ payment media management system supplied by De La Rue Retail Payment Solutions. The CP4000™ application is a user of the central data store. The CP4000™ system can be viewed as an agent hanging off the data store to provide the functions described above. The CP4000™ system does not provide an input into the central data store. The CP4000™ system, amongst other functions, will do some analysis of the data and user input to determine what if any further actions are required, thus aiding the management of the physical media. This thinking has been further developed and will be discussed later in this document. For example the CP4000™ system may not allow you to close a transaction unless certain steps have been completed satisfactorily. Further to this the steps that are required for completion can be determined by previous entries. For example you may identify the till drawer as being payment media only and as such you will no longer be required to undertake steps relating to check or card payment. It has also been recognized that the applications like the CP4000™ system could also be used to provide wider functionality. For example:

Real time synchronized data platform—the concept of real time data will be discussed in more detail later in this document. However this idea proposes using the real time data platform to provide both local and non-local exception reports and alerts. For example a store manager would no longer be required to oversee a particular process and could be notified of key actions/exceptions by any of email, bleeper, text message, messaging, fax, phone etc. Such reports could be notification that reconciliation has started, processes have been completed, intervention is required or exceptions.

Stored data could be used for historical analysis—as the system builds up a central data store it also provides a history of activity. This historical information can be mined and analyzed to provide information on trends. Further to this, if sufficient data is present it can be used to forecast trends and make predictive determinations.

Combination of EPOS/Count data with other data sets available within the retailer—In principle it is also possible to connect the CP4000™ system to other database held within the retailer. For example, a connection to a Human Resources' database may allow for investigation into productivity issues for specific individuals. The count and reconciliation data could highlight where specific individuals consistently fall short against revenue targets or more seriously are always associated with large discrepancies between count and EPOS data. Other alternatives include connecting to other security systems such as overhead cameras or banking systems.

Data analysis and exception reporting—The data store provides a resource of information which can be interrogated. It is proposed that an application be provided that is capable of automatic analysis of the data generated, highlighting potentially suspicious behavior patterns. This may be done historically or substantially, immediately to provide exception reports effectively real time. The alert could be covert or overt. Examples of alerts include notifying a supervisor, notifying security, automatically refocusing surveillance equipment on the area of suspicious activity, starting additional data capturing capability at the till/cashier of concern. The additional data capture mentioned above could relate to video or data capture. One example of data capture would be to start collecting serial numbers from the notes being handled via a till or by a particular cashier. With the development of technology, serial number capture is becoming of more interest as it provides means to uniquely identify every single note and track it through the media cycle. There, an individual note can be identified and associated with a till, transaction and/or cashier.

Over a period of time certain patterns will become recognizable. These patterns can be stored and used to speed up the analysis process or make it more effective.

Figure 6:
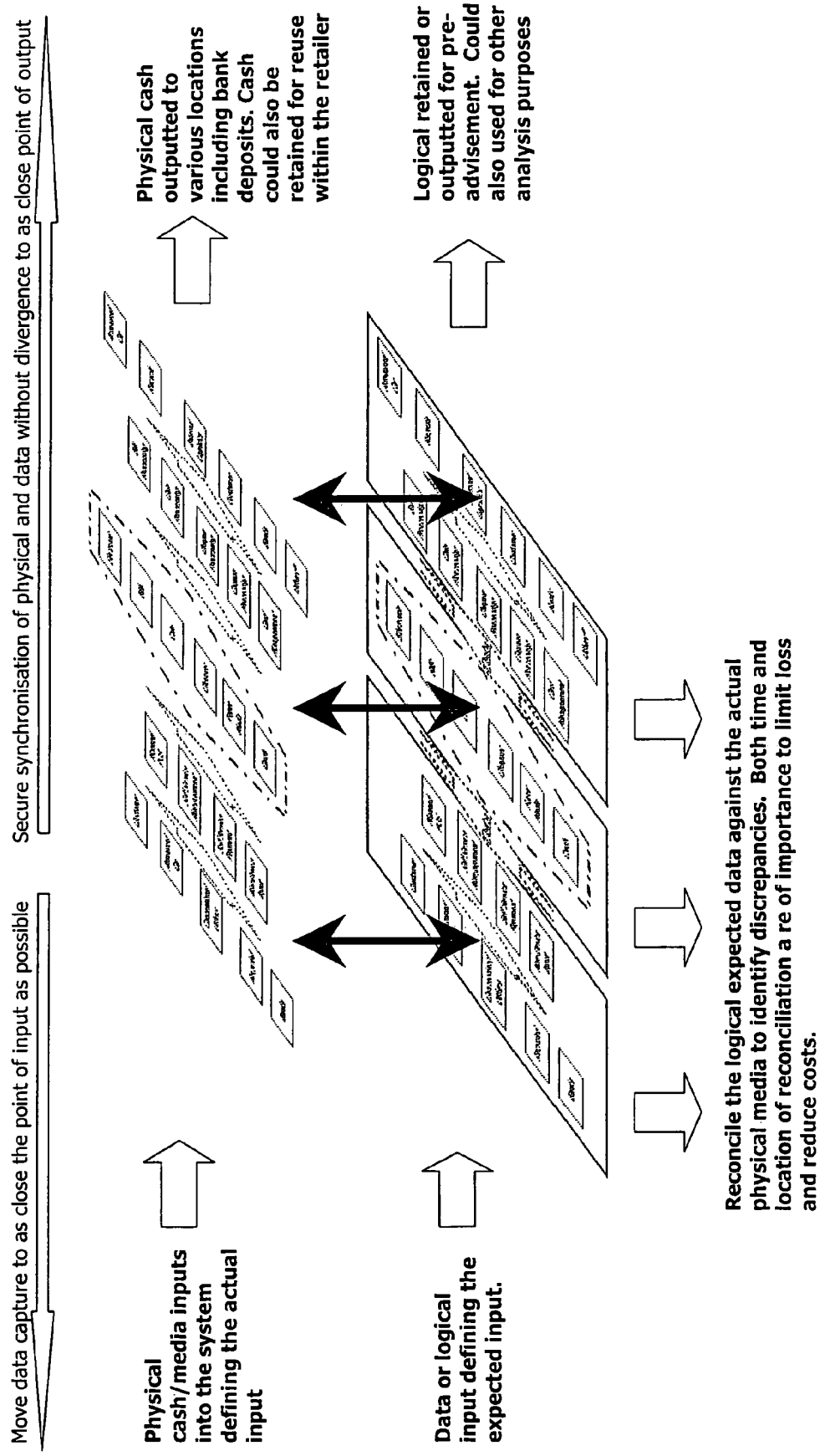
FIG. 6 illustrates schematically how the physical and logical inventories relate to each other.
Figure 7:
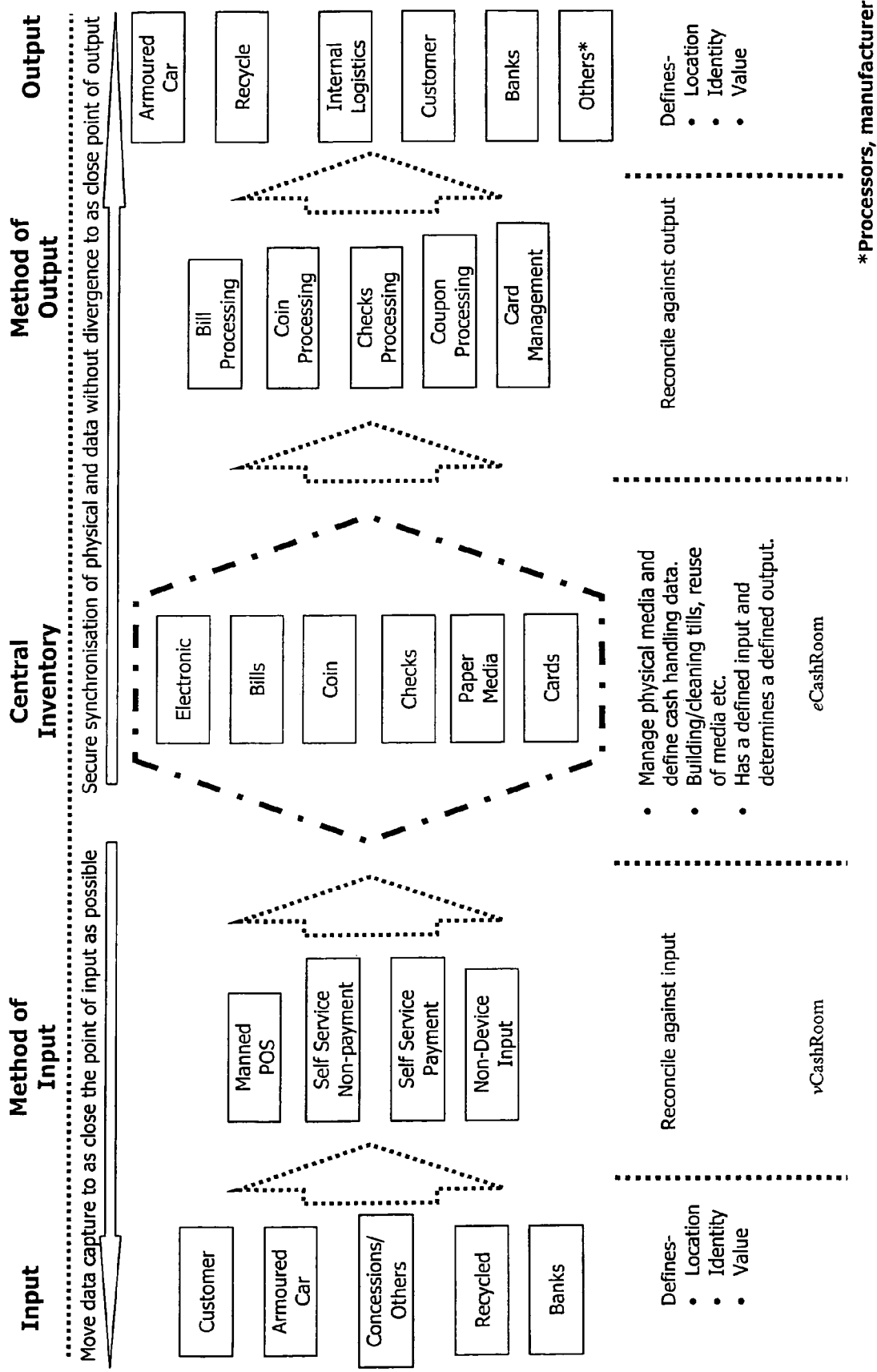
FIG. 7 illustrates the physical inventory and highlights key actions against the various process stages.

As highlighted above there are numerous ways in which the inputs and outputs of the physical inventory can be compromised. As a result it is of considerable value to the retailer to invest in methods of measuring the input/output of their media inventory. Indeed there is also value (that is loss prevention rather than value generation) to be had in interrogating the inventory at key points during internal processes post input and prior to output. This practice is currently widespread and referred to as reconciliation. Here the physical media is counted periodically and compared against the expected total as determined by the POS and other data files. FIG. 6 schematically illustrates this.

Within FIG. 6 the logical inventory sits over the physical inventory and the two are cross-referenced periodically. This is typically done by counting the physical payment media to generate new data that is then compared to the existing POS data. This activity usually takes place in the back office of the retailer, and is not an ideal situation.

Within current practices it is unusual for a retailer to measure the physical input/output against the expected data input/output at the actual point of entry/exit of the system. This means that the retailer does not actually know the exact content of their payment media inventory and as such cannot provide a definitive picture of loss or where the loss is occurring. The sooner the retailer can measure the actual input/output against the expected input/output the greater the opportunity for the retailer to identify inconsistencies. Knowledge of inconsistencies at the point of input/output also increases the ability to identify losses occurring during internal processes. If a retailer can understand where losses are occurring then they are better placed to undertake steps to limit those losses. This highlights two important concepts related to the security of physical media between processes, the location of reconciliation and the timing of reconciliation.

Location

Payment media should be accounted for as near to its point of entry into the inventory as possible, preferably actually at the point of entry. Further to this, the integrity and security of both the physical and logical should be maintained from the inventory to as close to the point of exit as possible.

In practice this can be achieved in a number of ways and with varying levels of automation dependent upon volume and value of media. Below are a series of examples making use of existing equipment that would allow a retailer to link the physical with the logical at or as near the POS as possible thus providing true POS reconciliation.

Smart Till—POS devices are becoming increasingly more complex and a till may consist of multiple means to accept payment media. In addition to a traditional till drawer the POS may also have other devices for accepting notes, coin or issuing change. An example of a bill accepting device is the compact Counter Cache® device available from De La Rue Retail Payment Solutions. This is a note acceptance device that takes in and securely stores notes preventing loss by till drawer snatches and also providing a means to account for notes at POS. Though not currently available, such a device could be provided with the means to denominate notes as they are deposited. This could be achieved, for example, by pattern recognition or detection of suitable coded magnetic features/threads that are present on some bills. In this example as the bill is accepted it is denominated and accounted for in the data file. In this way a picture can be built up at the POS not only of the value of bill deposited but also the split of denominations. Further, this data is available to allow for the store till inventory to be updated in real time. As a further benefit of such devices the bills can be authenticated as they are deposited allowing counterfeit or suspect notes to be returned directly to the customer at point of sale. Alternatively, such query notes can be placed in a separate storage area if the retailer does not wish to embarrass the customer or hold up the transaction.

Obviously the Counter Cache® device would only account for bills presented at point of sale. A further device, a note dispensing device, such as a Teller Cash Dispenser (TCD) available form De La Rue Retail Payment Solutions, can dispense bills of appropriate denominations. Another key media is coin. One example of how coin may be accounted for at the POS or at least significantly improved is by using a combination of the compact Counter Cache® device and/or TCD device and a change issuing device such as an InstaChange™ device also available from De La Rue Retail Payment Solutions. Here the value of the transaction is available from the EPOS data. When the cashier accepts funds from the customer they identify the type of media payment which will be made, be it cash, check, card, etc. If the cashier indicates that the transaction will be paid for in cash they also provide details of the value of payment media passed. At this point the cashier will deposit notes into the compact Counter Cache® device. The value of notes will match, exceed or be under the total value of the transaction. If the value matches no further action is required and the POS reconciles with the physical media. If the value of notes deposited exceeds the value of the transaction an instruction will be issued to the TCD device and/or the InstaChange™ device to provide the correct change. A further computer application which could be part of the payment media management system, e.g., the CP4000™ system, or a separate application, can be present on either the central control PC or a separate PC dedicated for the purpose which would be used to track the inventory of the dispensed notes and coinage. Data representing the start level of each of the note denominations ($1, 5, 10, 20) or coinage units (quarters, dimes, nickels, pennies, for example) would be appropriately entered into the system. The software would also access the transaction log (tlog) of the POS. As each transaction occurred, and where change was dispensed, the stored data representing the then present level(s) of change unit(s) would be adjusted to reflect the dispensed amount, so that reconciliation of the dispensing devices occurs as well as the POS and total physical deposit amounts, and even further the total retailer inventory. Finally if the value of notes deposited is under the expected value it is assumed that the remaining value has been passed in coin unless highlighted to the contrary by the cashier. Other alternatives include check, vouchers or coupons. As the value of coin to be passed is generally relatively low the retailer may take a decision to trust the cashier and carry out no further checks and the transaction would be considered to be correctly reconciled. Alternatively the change may be weighed prior to being placed into the till to confirm the value.

As an alternative to the above solution a smart till drawer could be used either in combination with a compact Counter Cache® device or on its own. By smart till drawer we are referring to till drawers such as those described by Tellermate of Cardiff, United Kingdom in their pending patent application EP724242. This patent application describes a till drawer provided with built-in scales that weigh media as it is deposited into the till drawer. It is proposed that the contents of the till are weighed periodically, each time the till drawer shuts for example, and reconciles this against the expected value as defined by the POS. Such a till drawer would provide the necessary means to provide POS reconciliation. However it should be recognized that where weight is an acceptable means for counting coin it is far from ideal for counting and denominating notes. This is particularly the case in countries where all denominations are the same size such as is the case in the USA. To this end it is proposed that the Tellermate till drawer be used in combination with a Compact Counter Cache® device and potentially also an InstaChange™ device.

Manned Recycling Till—It is recognized that tills are in reality recycling by their very nature whereby the ability to recycle is provided by the teller. In this context we are referring to the provision of one or more devices that allow for automated recycling, where the note and coin provided as change are counted and dispensed as change. Such recycling is usually associated with bills and coin and for the purposes of explaining this invention we will focus on these two types of media.

As for the smart till example above, devices are currently already available that allow for recycling of bills at the point of sale. In principle similar devices are feasible for the recycling of coin, but as coin is generally of lower value than bills, the risks associated with losses are lower and therefore there is less incentive to invest heavily in apparatus. It is more likely a combination of a smart till drawer, a TCD device and an InstaChange™ device would be used as in the above example.

Referring now to notes, two devices are currently available that would provide the ability to recycle notes at the point of sale. One example of a POS note recycler is the SafePay™ apparatus available from Gunnebo Company and described in the patent U.S. Pat. No. 6,213,310 (assigned to Cash and Change Control, Sweden). The SafePay™ apparatus can also be provided with a coin-handling unit, providing a complete solution. An alternative note handling solution is available from Barron McCann of Hertfordshire, United Kingdom who is again also able to provide a coin handling solution.

Such devices not only provide a means to reconcile at POS and validate payment media as it is deposited but also greatly enhance the efficiency of the POS and back office operations. That is by recycling media at the POS you limit the need for till skims and payment media advances during the day.

Self Service Non-Recycling Till—Within a number of large retailers, self-service tills have been introduced. These tills allow a customer to scan and pay for goods without the presence of a cashier. These provide benefits to both the customer and the retailer. The retailer limits the need to employ numerous cashiers to man every till and thus reduces cost. That said, it is usual to have one cashier supervising two or more tills, as intervention is occasionally required for certain processes and purchases. For example payment by check still requires intervention from a cashier. Also if a customer is buying alcohol or tobacco, some form of approval will be required in order to prevent minors from purchasing such goods. Despite the occasional interventions required, the use of self-service tills is beneficial with regard to the retail payment media cycle as they remove the need for a cashier to handle payment media. All notes and coin are deposited, verified and counted and the total can then be reconciled against the EPOS immediately. If required the till also issues change. In currently available tills it is usual for bills/notes to be accepted into a store and for change to be issued from a separate and not linked store. This is not an ideal situation with regard to handling of the physical media, despite being near ideal for generation and handling of data.

Fully Recycling Self Service POS—an ideal solution with regard to data generation, use and the management of media at POS is a fully recycling POS till. As with the non-recycling self-service till, the customer is responsible for scanning goods and depositing payment. However, here bills and notes are deposited into the same location from which the change is issued. This provides improved efficiency for the management of the media in much the same manner as for the manned recycling till with the additional cost and loss prevention benefits resulting from limiting the cashier's involvement. The ability to improve the efficiency of the payment media management will be described in more detail later in this document both in the context of reuse and recycling of media.

In all the above, we have provided examples of how, by moving the location of reconciliation to the point of entry of media into the inventory, significant benefit can be gained. We will now go on to discuss how the timing of reconciliation can also confer benefit for the retailer.

Timing

It has also been recognized that merely being aware of losses is not sufficient unless you are in a position to take some form of remedial action. The ability to reconcile the physical against the logical as close to the POS as possible provides a means for identifying and limiting opportunities for loss to occur. However this is of little benefit if any inconsistency found is not reported in a timely fashion. Ideally any inconsistency should be highlighted and reported whilst those parties effecting the transaction are still present so action can be taken. In the current example that would be at the point of sale.

For example where a customer is paying for goods at a manned POS two parties have the opportunity to undertake fraudulent activity. These parties are the customer and the cashier and indeed they may be colluding or sweet hearting. If the retailer can identify an inconsistency whilst both are present then they can take remedial action against one or both parties. Where a customer is responsible, to minimize embarrassment or delay the transaction, it is likely the retailer will ask them to tender the right money or provide alternative payment if one source has failed for what ever reason. Where the cashier is involved it is likely an exception report will be generated and a supervisor notified. As everyone occasionally makes mistakes the supervisor may choose to do nothing unless repeated mistakes keep occurring or the value is sufficiently high to cause concern. At this point they may replace the cashier on the till immediately and recommend retraining or undertake disciplinary action.

Provision of reconciliation at POS allows the retailer to align the physical inventory with the logical inventory. Not only is the physical and logical aligned, they are known. At this point it would be preferable that the payment media is not recounted again until it leaves the retailer. It is important to recognize that any handling of the payment media once accepted at point of sale represents both cost and risk. The major costs and risk associated with the creation and management of the payment media inventory is staffing. Thus any reduction in both the number of staff required to run the inventory and the time spent by any staff in relation to the inventory can have significant benefits. In the examples above we have provided a highly effective and efficient means for creating the inventory now we must provide a similarly effective means for maintaining the inventory.

Again considering an ideal situation once payment media has been entered into the retail inventory it should not be handled again until it exits the inventory or indeed until it enters a bank or CIT and the value credited to the retailer. It is important to note that it is critical that both the physical and logical retain both their integrity and remain synchronized until point of exit and the value is credited to the retailer.

It should also be recognized that not all payment media taken in at the point of sale needs to be or should be deposited at the bank. A significant proportion of the money accepted at POS can be reused as till floats, payment media advances and potentially for other applications such as refilling of ATM's. In order to accommodate this, many retailers will take payment media to the back office and recount it. During this process they will identify what can be reused and what needs to be used as a bank deposit. This process could in principle be automated and/or carried out at POS. There are two aspects to automating this process. Firstly provision of the knowledge of what should be available for reuse and secondly suitable apparatus or processes to enable this.

In order to provide the data relating to what should be reused it is necessary to know what is available currently and what is likely to be required. Payment media may be available from any of the inputs previously identified and may be required by any of the outputs. More detail on how this can be achieved from a data handling perspective is provided later in the document.

With regard to the apparatus required this will vary dependent upon the needs of the retailer and the point at which the process takes place.

Back Office Workstation—In a first example a secure facility is provided in the back office of a retailer. The workstation comprises a note counter, a coin counter or scales, check processor and a further store for other paper media such as coupon and card receipts. All these devices are linked through a central computer with a suitable display device. The computer may be controlled via a keyboard and/or some other pointing device such as a touch screen.

A full till would be brought to the workstation at the end of the day. A cashier may bring a single till or multiple tills may be brought in. The tills' contents may be transported in till drawers or in bags; and any pouches from Counter Cache® devices or cartridges for other types of note storage devices or coin handling devices would be brought along as well. Due to the difficulty that is experienced by some cashiers in carrying one or more till drawers to the back office, it is envisaged that a lightweight, insert device more suitable for transport will be substituted for the present configuration.

The operator would then identify the till to the workstation software by means of an identifier such as a barcode, RFID, EAS tag or by simply entering a code or pin number. This can be viewed as opening a transaction and may result in at least one or more actions including enabling the workstation to identify the EPOS file against which to reconcile, identify the relevant information pertaining to the start fund for that till for the next day, opening a transaction log for a given till, 'unlocking' the counting devices if they are "software locked" when not in use. Optionally the operator may also identify the cashier who was responsible for the till. To elaborate further on this it is normal to either reconcile the till or the operator; it is unusual to reconcile against both. If however a particular till or operator is consistently out of sync from the expected value, then a more rigorous process is undertaken to identify the origin of the discrepancies. In principle if reconciling both operator and till did not result in additional cost, then this would be a preferable option.

The operator could identify themselves through the use of various instruments employing available biometric techniques such as fingerprint, iris, facial recognition and the like.

Once the entity you are reconciling against has been identified, be that the till or the operator, the workstation prompts the user to undertake the first action. This example may be to place the notes from the till and/or Counter Cache® device onto the note counter and commence counting. As the note counter takes a short period of time to count the notes another action could be undertaken such as depositing coin to be counted in coin counter and/or sorter. Alternately, of course, the process could be reversed with the coin count initiated first off and then the note count simultaneously engaged as the coin count proceeds.

Once the note and coin have been counted, the operator may then be prompted to place a specified value and denomination split of notes into a secure area and the remainder replaced into the till for the next day's start fund. Coin could be treated in a similar manner with coin for depositing placed in a secure area and coin for start funds placed back into the till. For security reasons it may not be acceptable to place the start fund into the till until the till is required on the shop floor, however the till can be secured overnight in a rack to provide the necessary security. Alternatively only the coin may be placed in the till overnight and notes issued first thing the next morning. Still further, for a more secure arrangement, all media would be processed and stored securely at night. Empty tills would be stored in the rack overnight. At the start of business the next morning, the individual tills are taken off the rack, identified to the system which then proceeds to issue the respective start fund.

Once note and coin are accounted for, the other remaining media with the till needs to be processed. The processing of checks is discussed at length in De La Rue International Limited's co-pending U.S. patent application Ser. No. 10/969,991, and will not be covered in detail here. Coupons are generally accounted for at point of sale and no further processing carried out within the retailer. Coupons are collected together and then sent to either a specialist coupon processor or a manufacturer who redeems the value of the coupons. The retailer will take no further action unless significant discrepancies are identified between the expected value of coupon receipts and that received through the redemption process.

Once a till or entity has been counted and potentially reconciled it is preferable, though not essential, that the transaction is closed. The transaction may close automatically if, for example, the workstation detects that no further actions have occurred at any of the counting devices after a period of time has elapsed, a new till or entity is identified to the workstation, the operator logs out of the workstation, or the last process in a series of processes associated with reconciling the entity has been completed. However it is preferable that the operator indicates in some way that the processing of a given entity has been completed. In a preferred example this is by re-identifying the entity to the workstation via the barcode, RFID, PIN or other identifier. This clearly indicates that the transaction for a given entity is closed. Alternatively other means may be available to close a transaction. For example the user may be prompted to confirm the transaction is complete by an on screen instruction.

The concept of opening and closing a transaction associated with a particular entity is of significant value as it limits the possibility of multiple entities being counted together. It also enables greater accountability of both the entity being counted and potentially the operator. The process of opening and closing a transaction is not limited to the current example of the reconciliation of a till and could find application in any of the examples discussed herein, for example the opening and closing of the start find process.

Back Office Recycling Workstation—A more advanced variant of the above situation is where the workstation comprises apparatus capable of recycling media, which in turn greatly increases the efficiency of the processing particularly where media is to be reused.

In this example the workstation would comprise a banknote-recycling device (e.g. TCR Twin Safe™), a coin-recycling device (e.g. BCR Bulk Coin Recycler), a check processing device (e.g. Power Encode™), all available through De La Rue Retail Payment Solutions, and a means for storing other paper based media such a vouchers, card receipts and coupons. As with the example above, the till and/or operator is identified to the workstation thus also identifying the correct EPOS file and data detailing the start fund for the next day for the identified till. Again the operator may be specifically trained to use the workstation or in this case the process is sufficiently automated to be used by an untrained individual such as a cashier. In order to speed up processing of a till, some or all of the contents may be deposited into the note and coin recyclers prior to identifying the till. This allows the count process to start before the till is identified, saving time. If the till cannot be identified or is identified incorrectly the deposited money is returned to the operator. This process is described in more detail later in this document.

Irrespective of whether the till is identified prior to the count starting or after, the method of processing is the same. Notes are placed on the note recycling device and counted into a secure store. Coins are then placed in the coin recycler, counted and sorted. As the coin is being counted, the till drawer is placed under the coin recycler. Once the coin has been counted the operator presses a button to issue the next day's coin float. The coin-recycler then issues the correct value and denomination split of coin directly into the till drawer and into the correct trays within the drawer. This can be achieved by a docking station arrangement that ensures that the coin-recycler outputs are correctly aligned with the till drawer trays.

Where change is issued from an InstaChange™, automatic coin dispenser, again available through De La Rue Retail Payment Solutions, or other automated change issuing device at the point of sale, the coin holding cartridge, internal to the dispenser, is brought back to the back office. The coin cartridge's remaining contents are then emptied into the coin recycler in addition to any coin that may have been held in the till drawer. Then rather than place the till under the coin-recycler, the cartridge is placed underneath and this directly filled. Data received from the POS will include the amount and type of coinage dispensed and this information can be used to automatically determine and dispense the change necessary to bring the coin cartridge to its "full" level. Alternately, the amount needed to top off the cartridge can be based on a physical measurement or sensing of capacity utilization. Such a measurement can be done either by the InstaChange™ device itself or by the BCR or equivalent refill machine.

So too, certain note dispensing devices are passive in that they do not generate data about the denominations actually dispensed in response to a change directive from a POS register, for example. With such devices, the POS data will include the amount in type of denomination dispensed for a given device. This information can be used to determine and dispense the necessary bill denominations required to bring the note dispensing device to a predetermined starting level.

Other paper media and checks are handled as described above.

The till drawer and/or InstaChange™ cartridge is then placed in a secure area until the next day. Before the retailer opens the next day, or the next shift starts, the operator identifies the till again and requests a start fund from the note-recycler. The recycler then issues the correct value and denomination split of notes for that particular till drawer. This process allows for notes to be held securely overnight in the note recycler. As a result till drawers do not need to held as securely as they only hold a relatively low value of coin.

Alternatively, the note dispensing and/or coin cartridge can be topped off manually or with an assist device. This can be done at the register or in the back office. Data received from the POS will include the amount and type of notes and coinage dispensed and this information can be used to automatically determine and dispense the change necessary to bring the note dispenser and the coin cartridge to their "full" levels. If topped off in the lane, the InstaChange™ cartridge can stay there overnight since the device is locked providing the necessary security. A still further embodiment allows for the note and/or coin dispenser itself to include means within to check the coinage dispensed and to provide a suitable indication of the top-off amount required, either there at the check-out or in the back office.

In a further enhancement it has been recognized that it is not necessary to recycle all notes deposited into the note-recycler. Indeed the majority of notes only need storing until it is time to make a bank deposit. To this end the majority of notes could be stored in deposit areas rather than in a recycler cassette, roll storage module or other recycling storage means. It is therefore proposed to provide a note recycler with both recycling and deposit capability.

By way of an example the TCR Twin Safe™ device supplied by De La Rue Retail Payment Solutions comprises a note input/output, a transport means, detector means and storage means. The storage means currently comprises a number of roll storage modules. The roll storage modules are designed to enable recycling and are not ideal for processing very large deposits or issuing large amounts of bills in a single transaction. As indicated above, many notes accepted by the TCR Twin Safe™ device do not need to be recycled and as such do not necessarily need to be held in a roll storage module. For example, high denominations or unusual denominations will always be banked and never reissued as part of a start fund and thus will only be reissued from the TCR Twin Safe™ device as part of the bank deposit. Therefore if the TCR Twin Safe™ device were provided with a deposit cassette the notes could be deposited directly into the cassette rather than into the roll storage modules. The cassette could be then either removed and replaced when full in order to make a bank deposit or emptied at the appropriate time. It should also be recognized that the deposit cassette need not be a cassette in the traditional sense of the word, namely a secure metal container, this is in fact not a preferred option. Metal containers can give rise to logistics issues and problems ensuring that the correct number of cassettes are in the correct location and the right time. This somewhat inevitably results in there being far more cassettes than is required and as each cassette costs a significant amount of money this is not ideal. To this end it is preferable that the payment media is deposited into some form of secure tamper evident and disposable container. This may be secured within the TCR Twin Safe™ device and be accessible via a locked door. Examples of such containers are given in De La Rue International Limited's co-pending applications WO03046845 and WO03046842.

In a further enhancement it also recognized that simply depositing bills into a container in no given order is not ideal. It is normal that prior to the retailer being credited for the bank deposit the bills are counted by either the bank or a CIT. In some countries there are laws stating how bank deposits can be made. To this end banks and CIT operators will charge if the deposit is not presented properly. These charges add significantly to the cost of processing payment media. It is proposed that the TCR Twin Safe™ device with deposit facility described above could be employed in such a way as to avoid such charges.

When bills are deposited into the TCR Twin Safe™ device they are first taken and stored in the roll storage modules as is current practice. At this point no bills are taken into the deposit area. A predetermined time before collection of the bank deposit or upon instruction the TCR Twin Safe™ device starts preparing the bank deposit. The TCR Twin Safe™ device does this by moving notes from the roll storage modules to the deposit area one denomination at a time. That is, it first moves all the $1 bills it wishes to deposit, then all the $5 bills and so forth. This results in the deposit comprising a rainbow shaped stack of different denominations. This could be further enhanced by physically strapping bundles of single denominations. Alternatively separator cards could be automatically placed between each of the straps of single denominations. Thus when the bank deposit is collected it is already prepared. In a further enhancement the physically strapped bundles are provided with a barcode or other storage device providing detail on the value of notes in the strap. Such information could also be carried on a separator card.

Non-recycling Till with Payment Media Preparation—The processing described above need not be carried out in the back office and could be done at the point of sale. We have previously discussed the merits of reconciling a transaction at POS and doing this whilst the parties involved are still present. Additional benefit could also be gained if the payment media accepted at POS is further processed to ensure both the physical and logical are secured and cannot be tampered with again until they are accepted by the retailer's bank.

In current practice it is usual to accept payment media and place it either in a till drawer or some form of storage device. If payment media is placed in a till drawer it is generally not in a form suitable for direct collection by a bank or CIT and will require further preparation. Likewise payment media placed in deposit devices such as the compact Counter Cache® device is again not is a format suitable for a banking deposit. It would therefore be desirable to provide a POS with ability to accept and store payment media in a form suitable for making a bank deposit. In addition it would be desirable that such a POS be capable of determining the value and denomination mix required for its own start fund and ensuring this is not deposited at a bank. The apparatus would retain its own start fund and request additional funds only where a short fall in a given media or denomination occurs.

The ability to determine bank deposit and start funds automatically is described later in this document. In order to allow bank deposit preparation, some changes will need to occur at the POS itself Specifically bills and coin when accepted will need to both be counted and sorted. Current deposit devices merely count deposits and do not sort them resulting in a mixture of denominations. Further to this they do not discriminate between that part of the deposit that is to be retained and that part that is to be issued as a bank deposit at the appropriate time.

It is therefore proposed that the POS be provided with a more sophisticated deposit apparatus. In a first example this could be a variant on the compact Counter Cache® device in combination with a till drawer or alternatively a special self skimming till drawer. In this instance rather than simply accept notes into a single store, bills are moved into a series of separate storage regions dependent upon the denomination of bill deposited. Each storage region could be a cassette or in a preferred variant would be a tamper evident envelope or container. As the bills are deposited and transported to the tamper evident containers they are authenticated and denominated.

The authentication and denomination both validates the notes and ensures they are being directed to the correct container. This also enables the notes to be counted and reconciled against the POS. When the till closes or it is time to make a bank deposit, the till automatically determines what value of media is to be retained and what value is to be deposited at the bank.

Where the value to be deposited in the bank is equal to that held in a container, that container is taken and stored in a secure location. In a preferred embodiment the container is provided with additional information. This information may be provided in a machine-readable form such as a barcode/RFID or alternatively by alphanumeric characters. The information provided on the container could include the till, the cashier, value of contents, time of day, date and details of any exceptions.

Where the value to be deposited at the bank is not equal to that held in the container some further action would be required. This would happen where bills are required to make up a start fund for the next day or shift. In this instance the cashier would be prompted to remove the full container and place an empty container in the deposit device. The cashier would then be asked to remove notes from the full container and feed them into a suitable area for the start fund. Ideally this process should be validated in some way to ensure that the cashier is not removing the funds illegally. Such validation may be weighing the bills as they are placed in the till drawer. It is envisaged that coin could be handled in a similar manner.

Recycling Till with Payment Media Preparation—In a preferred approach, the till is provided with various means to recycle media as previously described. One such means is the SafePay™ secure payment media handling system supplied by Gunnebo and described in U.S. Pat. No. 6,213,310 (assigned to Cash and Change Control, Sweden). Such an apparatus allows a float to be held in a recycling device but also allows excess bills or bills for banking to be transferred to deposit containers. Coin can be handled in a similar manner. This device can be configured such that the recycling area only holds the float required for trading, and all excess funds are transferred to the deposit containers substantially immediately after the transaction. For example if any high or unusual denomination notes are accepted they are accepted into the recycling device and then immediately skimmed into a deposit container. Moreover each deposit container is specific to a denomination so the bank deposit is prepared physically. As the physical payment media is been accepted and automatically counted and sorted the till can be reconciled immediately against the EPOS data. Further to this it would also be possible to generate the banking deposit slip in real time for submission with the bank deposit. This could be done on a till by till basis or across several tills. Where several tills are to be deposited under a single banking deposit slip, as it most likely would be for a large retailer, the tills would be networked to a central control PC. The central control PC accepts data generated by all the tills relating to both the EPOS data and the data generated by the counting of the physical media. In the current solution this data will also include details of what volume and value of notes that have been skimmed for bank deposit. For each transaction the central control PC can thus undertake the reconciliation as a first process. If the reconciliation is correct the central control PC can then take the data and update a bank deposit slip to reflect the value and type of media moved into a deposit container. Whilst the till or tills are still open this bank deposit slip will be a file on the PC rather than a physical document.

When a bank deposit is due to be made two things must now occur. Firstly the containers containing the bank deposits from the various tills must be collected and taken to a secure area ready for collection. This is preferable to having the CIT operator collect deposits from each separate till. In addition to this the final bank deposit slip must be prepared for submission with the bank deposit. This may be done in a number of ways to ensure that the bank deposit slip is wholly reflective of the container contents.

In a first example at each till the removal of the deposit container from the till will send a signal to the central PC notifying it that the container has been removed and therefore no additional funds will be added to it. At this point the container may be provided with additional information as previously described. When all deposit containers have been removed and replaced with new deposit containers, a further signal is sent to the central PC that the bank deposit is ready and request the bank deposit slip to be prepared.

In a second example the central PC sends a message to all tills at a predefined period before the bank deposit is due to be collected. The tills then cease to add any further notes to the deposit containers and instead store them in the recycling region. The deposit containers are sealed and made ready for collection. The central PC therefore knows exactly what value is held in the deposit containers and can make up the bank deposit slip. When the deposit containers are collected and replaced with new empty deposit containers, the SafePay™ device moves any excess media acquired between the notification from the central PC and collection of the deposit container into the new empty deposit container.

Irrespective of the location and timing of reconciliation or the extent of reuses and where you manage that reuse of media from, it is still essential to move payment media from one location to another at some point. This even applies where payment media is collected pre-prepared and securely packaged from POS by the CIT operator. Any movement of media, no matter how securely packaged, represents a risk. It is important to minimize this risk as best you can and methods for measuring this risk are described in De La Rue International Limited's co-pending application WO03046841.

Bank Pre-advisement—As highlighted previously, the aim is to secure both the physical and logical integrity of the payment media as soon as it enters the retailer until the point it leaves the retailer. In an ideal situation once payment media enters the retailer it is secured and reconciled against EPOS. If the payment media is physically secured, to the extent that there is negligible or no risk of loss and the value of the bank deposit determined and prepared in the correct format, then in principle there is no reason why the retailer's bank could not be advised of the value of the bank deposit and the retailer be credited.

Such pre-advisement of bank deposit is very desirable for the retailer. In principle such pre-advisement could occur from the point the bank deposit is prepared and therefore based on the above example could be at the POS. However it is more likely this will occur in the back office where the payment media would be considered to be in a more secure environment. To this end there are two possible scenarios that could take place. Either secure deposit containers are brought to the back office and secured in someway; or, payment media is brought non-secured to the back office for processing via a workstation as also described previously.

Where the deposit containers are brought to the back office, they would be handled as described in De La Rue International Limited's co-pending application WO03046845. Here a secure tamper evident container is provided with information in a machine-readable format detailing its contents. As the container is deposited into a secure deposit device the container is inspected to ensure that it has not been tampered with and secondly the information pertaining to its contents are read. Once the container's integrity is confirmed and the data detailing its contents confirmed, i.e. the logical integrity ensured, it can be accounted for. In this example, at the point the container is deposited in the back office, the bank would be pre-advised that the deposit has been made and credits the retailer's account accordingly.

As an alternative, rather than secure tamper evident containers of pre-prepared payment media being brought to the back office, till drawers of unprepared and potentially uncounted payment media are brought to the back office for processing. In this example it is envisaged that a workstation as described previously would be present in the back office. For the purpose of this example we will consider the Back Office Recycling Workstation provided with a TCR Twin Safe™ device and a BCR Bulk Coin Recycler.

In this example the cashier or operator would approach the workstation and deposit and process the contents as before. Indeed all the physical processing of the payment media is the same as in the previous example. However, upon completion of the till deposit the control software determines what value of the deposit is to be retained and what value is to be deposited at the bank. This decision may be taken upon completion of counting and reconciliation of a single till, group of tills or all tills within a store. Whenever the decision is taken the bank deposit slip is updated and the bank pre-advised electronically of the value of the deposit. As the TCR Twin Safe™ device and BCR are secure stores and the payment media within them cannot be handled without manipulating the associated logical/data, the bank can trust the deposit information and credit the retailer's account accordingly. In order to create this level of trust, the bank may require access to the data files in real time so it can see what is entering and exiting the TCR. This is feasible and can be achieved by a suitable network link between the retailer back office and the bank.

Further to this, if the TCR Twin Safe™ were provided with a deposit facility along side the roll storage modules as described previously then money transferred to the deposit area could not be recycled and is therefore even more secure. Indeed in a preferred embodiment the TCR Twin Safe™ device and BCR would be provided with such deposit areas and pre-advisement of a deposit would only be made to a bank when payment media is deposited into the secure deposit area.

In addition to pre-advisement of the bank, others may be advised as required. For example if the systems are automated, there becomes little need for a supervisor to oversee all operations and they could therefore be advised remotely of events occurring in the back office. Indeed as a further enhancement they could pass instructions to the workstation or automated facilities to commence or cease operations if they feel it necessary. So, too, in a still further enhancement, cognizant personnel at a remote location, the home office for example, networked into the system, can obtain up to date status of the retail location's deposited assets for their auditing and accounting purposes.

Likewise, armored car carriers or CIT operators could be notified that a deposit is ready to be collected to ensure that payment media is prepared essentially just in time. In some instances it maybe preferred that the armored car/CIT or bank notify the retailer when to prepare the deposit. Again this is perfectly feasible and could be achieved by instruction over a network, by phone, fax, email, text message etc.

Apparatus and Infrastructure

Figure 8:
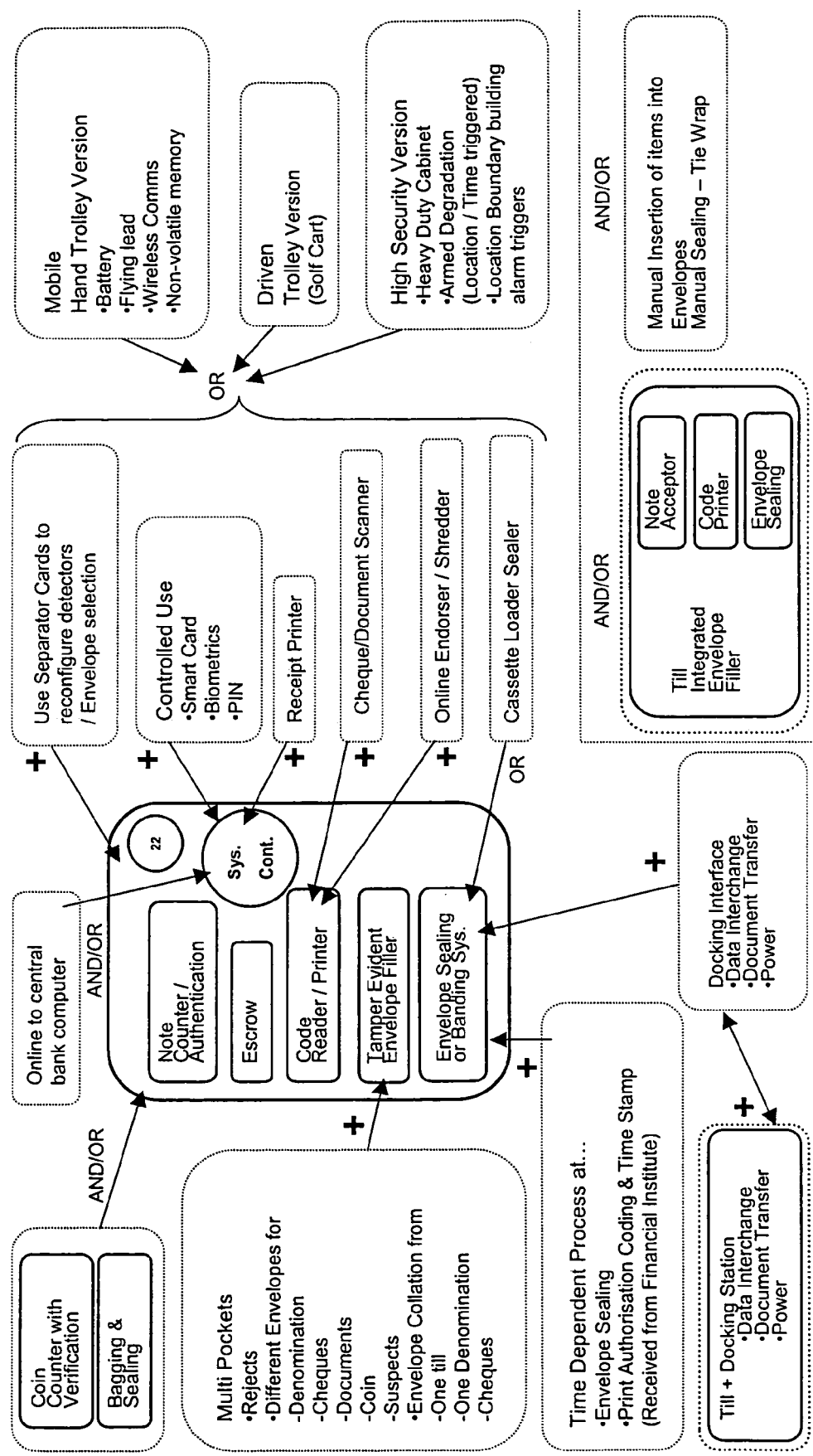
FIG. 8 illustrates some of the apparatus that could be utilized within a Retail Payment Media Management solution.

In order to be able to provide the physical and digital audit trail, various items of equipment are required as the infrastructure to support this equipment. The type of equipment required is illustrated in FIG. 8. This is not a comprehensive summary but goes someway to giving an impression. At a most basic level a solution could be implemented using entry level payment media counting equipment such as the 2650™ device sold by De La Rue Cash Systems connected to a suitable local area network. More typically it is envisaged that the solution utilize more advanced payment media acceptance and dispensing equipment such as the Mach® series of coin counters and sorters, one of the TCD range of payment media dispensers, or the TDU range of payment media acceptors, all available from De La Rue Cash Systems. Indeed it is preferred that the acceptance and dispensing process be combined into a single machine, the TCR Twin Safe™ sold by De La Rue Cash Systems, for example. Such devices handle multiple payment media types, including bills and coins, for example. Further examples of such devices include the De La Rue Retail Payment Solutions "Power Encode" for check encoding and settlement, and the De La Rue "2000", "4000" and "6000" "Cash Counters". Typically such automated counting devices are connected to a controlling device such as a personal computer but, in some instances, the controlling device forms part of the counting device. Indeed, more than one counting device may be connected to a single controlling device, or a single counting device may be connected to multiple controlling devices, or multiple counting devices may be connected to multiple controlling devices. However it should be appreciated that the current invention is not limited by the above equipment. The examples of systems and methods of the current invention can use such apparatus as a means for implementing the invention. The systems and methods of this invention can also make use of similar apparatus as is supplied by other manufacturers. An example of how this equipment may be used is given herein for illustrative purposes.

For the purposes of this example the following devices will be referred to for use with payment management at POS and payment management in the back office. All the devices referred to are available from De La Rue Retail Payment Solutions.

|  | POS Payment Management | Back Office Payment Management |
|---|---|---|
| Bills | Counter Cache ® TCD 4000 ™ Cash Counter | 2800 ™ counter |
| Coins | InstaChange ™ dispenser CDS 3010 ™ Coin Deposit Solution | Mach ® Coin Counter and/or Sorter |
| Checks |  | Power Encode ™ |
| Payment Media Management Software |  | CP4000 ™ |

POS Payment Management

Before the start of the trading day a member of the store staff takes a full InstaChange™ cartridge to each till. When a cashier starts their shift they use the 4000™ Cash Counter to count the start fund to ensure it is accurate. They are then ready for customers.

The details of the start funds issued are automatically managed by the CP4000™ software, which allows for reconciliation at a later date.

At each manned point of sale the customer then pays for their goods by whichever media is appropriate.

When the customer pays with bills:
All bills which are non-float denominations are placed into the Counter Cache® device (i.e. $50/$100/$2 etc.);
For all other denominations, bills are placed directly into the till drawer;
Change required in bills is given from the till point coin and/or bill dispensing device and coin change is paid by the InstaChange™ dispenser, and the transaction log, accessible to the media tracking software, is analyzed to update the media, including note and coinage inventory.

When the customer pays with coin:
All coin payments are placed directly in the till drawer for secure storage.

When the customer pays with any other forms of media the payment is placed directly into the till drawer and securely stored until the end of day.

A new payment management tracking software is proposed which is presently directed to managing coinage usage associated with passive (that is, the dispensing device does not generate a transaction data log itself) coin dispensing devices such as the InstaChange™ device. The POS is interfaced with the coin dispensing devices such as InstaChange™ for issuing a change-dispense command in transactions where change back is required. The tracking software accesses the coin records of the transaction log (tlog) of the POS data files for the different registers where automatic coin dispensing can take place. By reading this POS data, it is thus able to determine the amount of coinage dispensed in quantity and coin denomination and thus can obtain the current inventory of a particular device as well as transaction history including lane and/or cashier, coin dispensed and total dispensed. By comparing this data to start fund coin levels for the various dispensing devices which are available to this software, the amount of coinage for each unit of coin necessary to return to the start level is determinable. POS is interfaced to InstaChange™ issuing a coin dispense for change back transactions. The tracking software monitors the POS change back transactions from the tlog or coin files trickled out from transaction log, as they occur. The change dispensed by denomination is calculated using the same algorithm as InstaChange™. The starting position of the dispensing device is decremented by the calculated coin dispense for the accountability (till or cashier) required. The inventory position is calculated each time the tracking software is started or at predetermined periods to generate reports without user intervention.

A confirmation screen is included that allows the user to confirm the inventory that was added to all InstaChange™ units. It shows all the terminals and the suggested replenishment amounts. A user has the option to edit any terminal replenishment amount individually and then choose "accept all" to confirm the entire batch.

The tracking software can provide InstaChange™ refill suggestions containing only full rolls up to user defined upper target limits. If required, the tracking software will allow a user to manually set the upper target limits at points less than capacity. For example, if a store does not want to keep a full InstaChange™ canister at a certain register it can set that InstaChange™ fill level for all denominations to half of capacity and the tracking software will use half full as the target capacity. The levels will be set by denomination and will be displayed as a whole number of coins. The upper target level will allow users to prevent excessive coin being held in canisters. A configurable lower level will be included to prevent canisters from not being adequately filled. An appropriate notice will be given, either to the cashier or the back room, which will initiate the required action to remedy the low level condition. The InstaChange™ capacity upper and lower limits will be set in the administration section of the software and the upper limit will be set to full as the default. Similar routines in the tracking software can be directed to the note dispensing devices. Each dispensing device in the store can have its own upper and lower levels reflecting its individual, unique status in the store.

Inventory is maintained by denomination per InstaChange™, for example, Inventory=start position−used+reload.

As part of the inventory management capabilities of the software, the usage can be monitored and recommendations made to lower inventory if coins are unused after an appreciable time period.

Similarly, the media tracking software can monitor the POS transaction logs to determine the note portion of the change to be disbursed and calculate, by denomination, the bills actually discharged from the note dispensing device such as the TCD device of De La Rue Retail Solutions.

The same processes can take place with other media dispensing devices. If the tracking software has included within it the same algorithms used by the dispensing device to arrive at the denomination split required to accomplish the media disbursement, it can calculate the current inventory levels of such a device by decrementing the known, start levels for each denomination split by the unit amounts applied by the software contained in each dispensing device.

At the customer service desk or other high volume bill dispensing locations, a TCD is deployed to provide accurate and secure provisioning of bills. The TCD is in addition to an InstaChange™ dispenser, and fully automated refund and exchange management is delivered. Once again, POS data can be read to determine the notes and coinage dispensed so as to maintain a real time inventory of media and provide a means for directing the levels of each, sufficient to refill a given device.

At the end of each cashier's shift the appropriate bill start fund for the next operator is counted and left in the till. All other bills are deposited into the Counter Cache® device. Once this has been completed a divider is placed into the Counter Cache® device to differentiate among successive cashiers.

If the retailer wishes to have 'real time' cashier accountability all bills in addition to the start fund are placed in the Counter Cache® device which is then taken back to the cash office and a new cache placed at the till point. This is not the preferred process as this requires labor to be available in the cash office. A significant saving results with the proposed solution and process.

All coin received in payment is taken to the coin deposit machine and deposited. The cashier enters their identification number, and the register, into the coin deposit machine and the deposit is counted and the information passed to the CP4000™ cash office system to allow full reconciliation by operator/shift at the appropriate time.

The coin start fund for each shift other than the first shift is the value of coin remaining in the InstaChange™ dispenser. This is calculated by the full cartridge less coin dispensed per shift throughout the day and so forth, information available from accessing the transaction log of the POS data.

At the end of the final shift of the day the following day's start fund is left in the register, verified by a supervisor and all other bills are placed in the Counter Cache® device. This eliminates the need for start funds to be produced in the cash office.

The sealed Counter Cache® device is then taken to the cash office. The empty Counter Cache® device for the following day is taken to the register at the same time as the InstaChange™ cartridges.

All InstaChange™ cartridges are taken to the cash office and secured until the cashing up process.

All other media is taken to the cash office at the end of the day and secured.

During the day customers with large volumes of coin deposit them into the coin deposit machine which produces a bar coded receipt which is then exchanged for payment of goods at the till point. The receipts are envisaged as including means for enhancing their validity so as to inhibit counterfeiting and tampering. For example, the use of magnetic stripes, or embedded integrated circuit devices and the like confirms the barcoded information and insures a correct transaction. An alternative approach would be to credit the user's store account with an appropriate credit by networking the determined count data at the coin deposit machine to the account. This would then be available system-wide to be redeemed or credited against a purchase.

For self-service registers the bills and coin taken in payment during the day are taken to the cash office and secured. At the start of each day the bills and notes required for start funds are brought from the cash office as part of the morning process.

Back Office Payment Management

At cashing-up time, either post-trading or pre-trading the following day, the takings are processed and the reconciliation process takes place.

Each media is then processed, reconciled, start funds' requirements produced and bank deposits prepared.

The CP4000™ system is linked to the retailer's EPOS system and all payment data totals and the associated breakdown are automatically transferred.

The cashing up process:

Checks

Firstly all checks are placed in the power encoder. This will then process the checks without any involvement of the cash office assistant. If the store takes more checks than the unit has capacity, then these will need to be added subsequent to the unit finishing the first quantity. Additionally the retailer may need to batch checks. If this is the case, then a blank batching slip needs to be added when prompted by the machine.

Bills

The operator then processes the bills. They count the Counter Cache® device contents having selected the appropriate till and shift on the CP4000™ system. The notes for the first shift (the start to the first divider) of the register are placed on the top of the 2800™ counter and the count data is then passed directly to the CP4000™ system. This process is then repeated for each subsequent shift and register until all of the registers opened during the previous day(s) have been processed.

The CP4000™ system will know the start fund requirement for the TCD(s) and self service registers, and as bills go through the 2800™ counter the first pocket collects this requirement and all other bills are sent to the second pocket. Once the start fund requirements have been reached all notes are sent directly to the second pocket.

The bills, collected into the second pocket from each till in turn, are added together to produce a bank deposit of mixed notes (eliminating the need to produce separate bank deposits). The CP4000™ system automatically keeps a running total of counts and provides the data to produce a bank deposit slip (reducing the number of discrepancies to manage in the bank reconciliation process).

Once all processing of bills and checks is completed and the bank deposits have been produced, they are stored in the safe in preparation for armored car collection. (If bills need to be sorted by denomination, due to bank regulations or cost issues, then they are run through the 2800™ counter, which separates each denomination in turn, and bank deposits produced are reconciled automatically with the count totals as a further check).

All other payment media are stored in the cash office until the point they are due to be transported to the corporate office, usually via internal logistics.

At this point in the process the CP4000™ system reconciles all count data (bills from the 2800 count and coins from the CDS data) and reports all discrepancies and these are distributed automatically to the appropriate personnel within the store.

The CP4000™ system flags when the Coin Deposit Solution needs to be emptied. This is done by a combination of machine fill levels and coin requirements for start funds.

The coin is then collected from the CDS and deposited into the relevant Mach® machine which sorts and counts the deposit. Once completed the Mach® machine automatically passes the count data to the CP4000™ system which is reconciled against the expected count.

The sorted coin is then stored and InstaChange™ cartridges are filled for the following days advance.

Payment Logistics

Bills and checks are taken by the CIT to a bank/payment media processor. Due to coin being generated within the store, no exchanges or payments for floats take place. In addition armored car costs are reduced because no deliveries are required, just collections.

Armored car collections are optimized for the retailer.

All other media is taken by internal logistics to the corporate office.

Third Party Payment Management

The payment media is processed within the bank or the voucher/coupon manufacturer. The count data is then transmitted to corporate.

With coin provisioning needs being fulfilled from within the store, there is no supply of coin from the bank and therefore an elimination of associated costs.

Payment Accounting

The CP4000™ system collects accounting information including EPOS data and prepares a payment media position report which can be accessed by corporate for processing and reconciling against third party count numbers.

Due to the increased accuracy of count data the discrepancies, losses and workload throughout corporate are all reduced.

The above example can also be illustrated by considering each type of media.

Bills

As customers pay with bills at a register the cashier places and secures notes in excess of the float in a Counter Cache® device. At the end of each day (or shift if required) the notes in excess of the required start fund are placed in the sealed Counter Cache® device which is then taken to the cash office.

At the time when the retailer counts the takings, the bills are placed directly onto the 2800™ counter which transfers the value balances and the data directly to the CP4000™ payment media management software.

The payment media management software also informs the 2800™ counter of the bills required for the store start fund for customer service desks with TCD's and self-service registers. As these required bills are processed they are collected in the first pocket. All other bills are sent to the second pocket. Once the start fund requirements have been reached all bills are sent directly to the second pocket.

Multiple registers' bills from the second pocket are added together to produce a bank deposit of mixed notes (eliminating the need to produce separate bank deposits). The software automatically keeps a running total of counts and provides the data to produce a bank deposit slip (reducing the number of discrepancies to manage in the bank reconciliation process).

The notes are then transported to the bank which counts them and provides corporate with a count figure which is reconciled with the bank deposit number in the General Ledger output from the CP4000™ system.

The CP4000™ system passes a general ledger file to EPOS which is then sent to corporate for processing and reconciling against third party count numbers.

Due to the increased accuracy of count data the discrepancies, losses and workload in corporate are all reduced.

Coin

Customers deposit coins collected at home into the coin deposit solution. The unit counts the deposit and takes a percentage fee and provides the customer with a barcoded receipt for the remaining value (or networks the data to the user's account, see above) which is used for payment at the point of sale. This brings in an additional revenue stream for the retailer.

The coins are then securely held within the CDS until the point the store takes the total deposit to the cash office.

In the cash office they deposit the coins through a Mach® sorter which balances the count with the CDS expected total. The coins are then manually placed into an InstaChange™ cartridge.

At the end of each day the InstaChange™ cartridges are taken to the cash office. The further payment management software which again accesses the transactional log of the POS data reflecting the quantity and coin denomination dispensed for each InstaChange™ device and by comparing this to the stored data reflecting coinage start funds, can direct the user as to the quantity and denomination type necessary to fill each cartridge. Alternatively the software can direct an automatic cartridge filling device to discharge the appropriate amount and load each cartridge. The cartridges are then filled for the following day.

All coin taken in payment by cashiers is deposited into the coin deposit solution (CDS) at the end of each shift. The register will be identified to the unit before coin is deposited.

Where the CDS is not deployed in the retailer the coin will be taken directly to the cash office and sorted/counted in the Mach® device and the data passed directly into the CP4000™ system.

Checks

Customers pay with checks at a point of sale and they are stored in the register drawer in a secure manner. At the end of each day the checks are taken to the cash office.

At the cashing up time checks are placed into the power encoder which processes the checks and encodes the front of them with a Magnetic Image Character Recognition strip including the check value confirmed from the EPOS data. The checks are then sent to the bank and savings of 3-5 cents per check are delivered.

Other Media

Other media is stored securely at the point of sale, taken to the cash office and following cashing up the media is transported via internal logistics to the corporate office at the relevant times.

Data Overview

The CP4000™ system takes data from EPOS and all hardware peripherals and undertakes all the required counting and reconciliation processes. Following this process it provides management information reports to the store staff along with producing a General Ledger output file for corporate reporting.

The further payment management software, likewise extracts data from the transactional log of the EPOS and accesses specifically the coin records to get current inventory of the InstaChange device(s). This further payment management software can monitor other software feeds such as the ATM transactional log or any bill dispensing or accepting device. By monitoring the software feeds whether it be the POS data or individual device data feeds, the further payment media management software can provide a real time media inventory of the store as a whole, or the retail company across numerous stores, as well as third party users of such software as may be allowed by the controlling entity.

This further payment media management software generates triggering events through a user interface or otherwise which will alert store personnel to the need for refilling or replenishing the various media dispensing devices thus avoiding the need to physically check such devices on a periodic basis. With such real time oversight, the replenishment of such devices can be done on a predictable basis to avoid the relatively random approach now followed by retailers which gives rise to interruptions at the various registers to the inconvenience and delay of customers.

This further payment media tracking software, again aware of the store or entity "safe" inventory on a real time basis, can take a global view of media in the store or entity in order to optimize the labor and workload in either a fixed or variable process. This further payment media tracking software can automatically issue or provide change order requests and requirements for coin and notes to bring the inventory up to suitable levels based on established thresholds stored in the data store for such software. Such change orders can be issued even hours and days ahead, based in part on trends reflected in the various transactional logs and the history of the store(s) or entity.

So too, with the continual monitoring of the individual device inventories, back office personnel can be directed to perform the till skims and/or bank deposits during the day based on the real time inventory knowledge. This further reduces the number of interruptions at the individual registers thus, again, minimizing the disruptions to customer service.

In summary, the features of the payment media tracking software allow for accessing the POS transaction logs of the registers so as to extract the coin and/or bill dispensing or accepting records to thus determine the current inventory of all such payment media as well as provide a history for a given lane, and/or cashier, the total media dispensed as well as media dispense per denomination.

Management at various levels, with suitable accessibility identification would provide, and/or be provided, pertinent information. Daily usage reports and displays through appropriate interface are available. The particular set of reports for a given day can be configurable and printable as a group. The entity itself will configure the reports that comprise a daily set in a manner most beneficial to themselves. Of course individual reports within a given set are available. Weekly and longer term reports similarly will be an inherent capability of the tracking software. Of course, the reports can be executed and generated at a time which allows for an efficient use of the operator's time so that he does not have to stand around waiting for an appropriate report.

The tracking software can produce various reports including:

(1) Terminal by Cashier Inventory Report—this would be the sum of all cash dispense and/or accept transactions determined from a transaction log of a POS terminal, by cashier in transaction order.

(2) Terminal Media Advance Report—each terminal is identified at the time of the report with an appropriate direction as to the number of the media denomination necessary to bring the dispensing device to its start level, if any (stated in full rolls if the media involved is coins, for example, with the number of rolls less than what would cause an overfilling circumstance at the dispensing device).

(3) Terminal by Cashier Detail Report—where the cash dispense and/or accept transactions are extracted from the transaction log by cashier sequentially for a given terminal are shown.

(4) Media Loan Data by Terminal or Cashier—reflecting the starting level for each media dispensing device which is considered part of the store inventory for that media. All media dispensed would be considered a loan to that particular terminal or cashier depending on how the particular store and/or retailer chooses to establish accountability.

(5) Inventory Summary Report—for a terminal, including the starting inventory, the amount dispensed and/or accepted and the ending inventory are provided.

Further the media tracking software provides in appropriate format, audit information which will allow the user to select individual dispensing and/or accepting devices at any time for spot audit. The program can select various units for spot auditing in a random way during a period designated as the audit period. The party auditing, after they have done their separate physical count of media remaining in a particular device, can compare it to the calculated value. Provision is made to adjust the inventory level based on the finding of the auditor, that is the actual versus the calculated value.

While the principal application of the media management software is in the area of cash acceptance and disbursing, that is bills and coins, it is extendable to other "inventory" items that have value at the point they are dispensed, including for example, gift certificates, postage stamps, loyalty rewards, etc. The ability to track the dispensing of these further examples of media, replenishment of same, and reconciliation through their auditing, are manageable within the tracking software.

Of course other registers within the entity can be tracked similarly, for example customer service counters, ATM devices and the like, where media is accepted and/or dispensed.

The above example confers the following benefits to the retailer.

The Benefits to the Retailer

Cost:
  Reduction/elimination of float provisioning costs from the bank
  Reduction in labor costs due to
    Sorting and counting notes
    Sorting and counting coin
    Reconciling tills/operators
    Producing start funds
    Producing bank deposits
    Counting till contents
    Undertaking spot checks
    Counting and balancing the safe
    Providing change or refunds for customers
    Undertaking till skims
    Manning tills
    Management time within the payments process
    Head office audit department
  Elimination of labor counting checks
  Reduction in processing costs of checks by the bank
  Reduction/elimination of advances (TCD/InstaChange™ capacity)
  Reduced training time for new payment media operatives
  Reduction in time counting till contents
  Increase in revenue through % of deposit
  Elimination of paperwork Loss Prevention & Security:
  Losses identified real time (at the end of each shift/day)
  Reduction in payment media discrepancies
  Increase in accuracy of change provision
  Real time targeted notification of loss information (the CP4000™ system emails reports)
  Improvement in security of bills and coins at the P.O.S.
  Introduction of tighter controls
  Standardized work flow dictated by management software
  Reduction in opportunity for theft Payment Media Flow:
  Reduction/elimination of float provisioning from banks
  Reduction in payment media holding (elimination of start funds in the cash office)
  Faster recognition of deposited finds through pre-advisement Management Information:
  Improved accuracy of:
    Takings counting and reconciliation
    Bank Deposits
    Loss information
    General ledger information
  Improvement in timeliness of:
    Loss information
    General ledger information
    Treasury Payment Media Position
  Centralized reporting of all payment operations
  Reduction/elimination of manual errors Customer Service:
  Improvement of change accuracy
  Reduction in queue lengths
  Quicker resolution of refunds
  Improving the shopping experience for the customer (TCD/InstaChange™ devices)

Dependent upon number and total value of transactions other alternative apparatus may be used as shown below. These are identified for illustration purposes only with the understanding that there are many similar devices that can readily implement the respective aspects of the invention.

| Solution Function | Product | Alternatives |
| --- | --- | --- |
| Coin Generation | CDS 3010 ™ Coin Deposit Solution | Not Applicable |
| Secure Storage | Counter Caches (not pouch) | Self Skim Till |
| Change Provision | TCD | Manual Process |
| | InstaChange ™ dispenser | Manual Process |
| Start Fund Management | 4000 ™ Cash Counter | 6000 Cash Counter |
| Check Processing | Power Encode ™ check encoder | |
| Coin Processing | Mach ® 6 | Mach ® 3 |
| | Mach ® 6 | Mach ® 9 |

-continued

| Solution Function | Product | Alternatives |
|---|---|---|
| | Mach ® 6 BCR | Mach ® 12 |
| Note Processing | 2800 ™ counter | 8643 ™ |
| | 2800 ™ counter | 8672 ™ |
| Software | CP4000 ™ Media Tracking Software | Not Applicable Manual Process |

However it should be appreciated that the current invention is not limited by the above equipment. In the current invention the apparatus only serves as a means for implementing the invention.

The current invention goes someway to solving the problems detailed above. In particular the current invention focuses on providing a solution for the retailer's back office activity comprising the provision of start funds, change, counting, sorting and reconciling payment media, by providing both a real time tracking capability as to the acceptance and dispensing of payment media as well as end of day, post trading reconciliation and accounting. The current invention provides a simple to use, intelligent and versatile solution for the retailer.

Preferred embodiments typically will not permit any funds transfer event to occur without logging into the system either before, during or within a specified time period after the transfer event.

As stated previously, the retail back office has to carry out several basic functions. These are:
1. Issue a start fund at the start of the day for every till.
2. Issue change upon demand.
3. Accept till deposits at intervals during the day.
4. Prepare and issue a bank deposit upon demand.
5. Prepare and issue a cash advance upon demand.

In addition, the following functions also may be carried out:
6. Preparing, saving and reporting and communicating payment media handling system inventories, audits, safe counts and similar activities;
7. Making advances to the payment media handling machine(s) from a vault safe, an armored car safe, or safes other than the payment media handling machine's;
8. Preparation and saving of desirable media management information, such as, for example, lists of legal tills or cash registers for one or more retail operations, lists of breakdowns of money denominations and species that make up CIT (e.g., armored car) and/or bank deposits; starting inventories of tills; lists of POS transactions associated with tills; legitimate sales dates; special sales dates; etc. For example, the payment media handling system may include a calendar of operational and non-operational days, and operational and non-operational hours, thereby validating and permitting operation of day-to-day activity of the payment media handling system. Moreover, specification of sales dates enable payment media handling systems to operate using multiple concurrent sales dates.
9. Management of more than one retail operation within a given store, e.g., grocery and clothing operations in a single store, by a single payment media handling system, and/or management of more than one retail store, e.g., closely situated stores, by the same payment media handling system;
10. Enhanced communication functions, including use of various types of communications networks LAN, WAN, internet, intranet, etc.) as well as using RF and other communication technologies, among payment media handling machines, safes, front offices, back offices, remotely located personnel and operations; auditing trail communication, supervisory notifications, etc.;
11. Foreign currency conversion and foreign currency storage and handling, e.g., in certain locations, e.g., in retail locations near foreign countries, banking centers, etc.;
12. Techniques, including pre-programmed error detection and correction schemes, user interface menus, scripts or other guidance to facilitate overcoming malfunctions, e.g., currency jams, tears, etc., and unauthorized, including fraudulent, uses of payment media handling devices, as well as communication of malfunction status to responsible parties, e.g., police officials, maintenance technicians, supervisors, customers, etc.;
13. User friendly characteristics of payment media handling facilities, devices, and methods;
14. Audit and audit trail generation, physical security measures, dealing with payment media shortages and payment media management errors;
15. Methods of dealing with and/or reacting to security incidents, including robberies, alarms (including false alarms), to include agendas, scripts, lockdowns, notification of authorities, supervisory notifications, etc.;
16. Permitting withdrawals from payment media handling devices by personnel other than cashiers using established procedures, authorization levels, etc.
17. Reporting period rules and protocols, including find transfer event periods such as, for example, calendar day, sales day, time of day and virtual days.

All these events need to be carried out with as little input from the users as possible to limit their time at the apparatus and the need for the users to make decisions or manipulate the function of the apparatus. Various aspects of the current invention enables all the above to be carried out and provide an intelligent, secure and user friendly interface.

The payment media cycle and its associated time line illustrated in FIGS. 1 and 2 have already been discussed. Referring to FIG. 3, some aspects of the invention are focused on providing a secure auditable physical payment media flow and a secure auditable digital payment media flow. Specific apparatus for achieving both in the context of the current invention will be discussed, but it should be appreciated that the examples are non-limiting and alternative apparatus could be utilized.

Intelligent Start Fund Process

Figure 9:
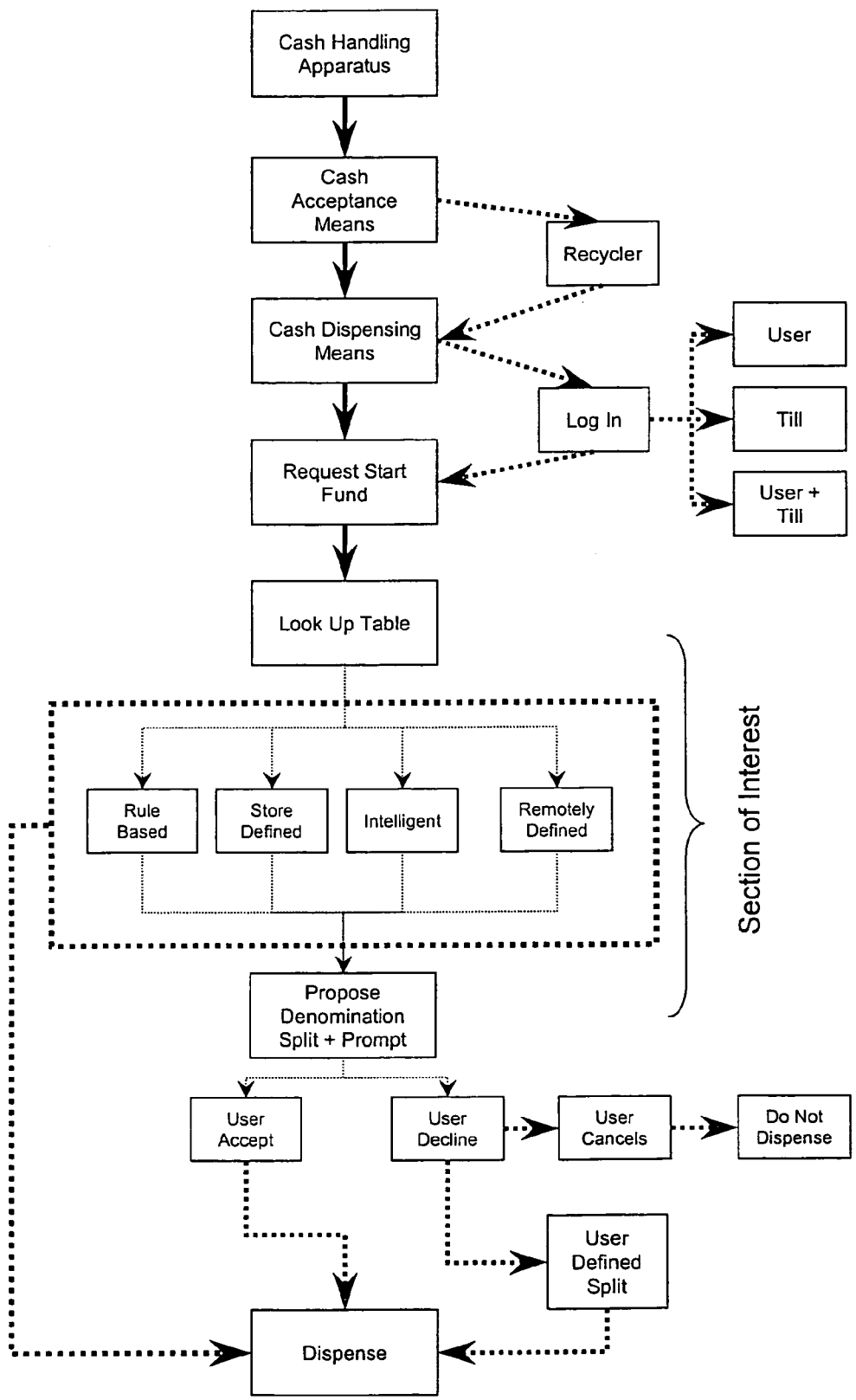
FIG. 9 illustrates a first embodiment of the invention and schematically shows an intelligent start find process.

A first embodiment is illustrated in FIG. 9 and shows an intelligent start funds process. It is standard practice within retailers to provide tills with a start find or float at the start of trading. The start fund provides the till with sufficient payment media to be able to provide change during the initial period of trading. The size and denomination distribution of the fund can vary dependent upon a number of factors, including Size and location of retailer.
Time of day, week, year.
Type of till.

The size and location of a retailer can significantly influence the start fund. For example large out of town retailers will tend to cater to people doing a weekly shop and therefore making high value transactions. Such transactions are more likely to be paid for using electronic means such as debit and credit cards and as such the need for change is reduced. Smaller town center retailers are likely to carry out a much larger number of smaller transactions, which are more likely to be paid for using payment media. Consequently there is a greater need for the till to contain large amounts of change.

The time of day, week and year can also have a great effect on the start fund required. The start fund needs to take into account people's shopping patterns. The majority of transactions within many retailers take place over the weekend and predominantly on a Saturday. The start fund needs to take account of this. Also considering time of year, national holidays, events and festivals are likely to significantly influence the volume of trade and as such the start fund needs to be altered accordingly.

Finally within many larger retailers and large grocers in particular there are a variety of different types of tills. For example you may have tills catering to shoppers with ten items or less; you may have cash only tills; or you may have partially or fully automated tills. Limited numbers of items are more likely to be paid for in cash and as such the need for change is greater, similarly for cash only tills. Partially or fully automated tills are more likely to receive payment via electronic means and consequently their need for a large start fund is reduced.

The first embodiment of the invention provides a means to intelligently supply start finds to specific tills without necessarily any additional input from the user requesting the start fund.

The first embodiment comprises a payment media handling apparatus having a payment media dispensing means and optionally a payment media acceptance means. The payment media dispensing and acceptance means may be combined within a single apparatus and further to this be capable of recycling payment media. The apparatus also has a user interface, the user interface may be a traditional PC with a keyboard and a mouse or other pointing means such as a touch screen. In this embodiment and all subsequent embodiments the user interface may be presented in the style as a browser. The format is increasingly familiar with users and as such provides a recognizable interface. The interface provides the means by which the user can easily interact with the payment media handling apparatus. Typically the first operation carried out by the user will be to login and identify either themselves, their till or both themselves and their till. Though this is preferable for security and auditing purposes, it is not essential.

The user will then request a start fund via the user interface. If the user has not logged in or during the log in has not identified their till they will be prompted to identify the till for which they require the start fund. Once the start fund has been requested and the till identified, the apparatus reviews by one of a number of means what the start fund should be in terms of value and denomination distribution. The apparatus may then automatically dispense the start fund or alternatively display the intended start fund. If the start fund is displayed prior to dispense, the user will be given the option to accept or decline the proposed start fund. If accepted the start fund is dispensed, if declined the start fund process may be cancelled or the user prompted to enter an alternative value and distribution for the start fund. Once the start fund is defined by the user and so long as sufficient funds are present within the apparatus, the fund is dispensed. It is appreciated by the inventors that a retailer may not want to let all of its staff define their own start funds, and, as such, authority levels may be built in and a user may require supervisor assistance in order to carry out this operation. It is currently preferred that the start fund is dispensed automatically and no further intervention is required from the user. This both speeds up the process and limits the need for the user to worry about the event, all the processing and thought behind the transaction has been done for them. Moreover, the payment media handling system also provides the ability to change start fund amounts, time of availability, etc., including the ability to predetermine and/or override predetermined start fund aspects, including amounts and time of availability.

As indicated, the intelligence behind the start fund distribution may be provided by a number of means.
Rule based.
Defined by store policy.
Defined by remote policy.
Intelligently defined based on real time data analysis.

Rule Based

The rule based approach is the most simplistic and would rely on predefining a series of criteria. The type of criteria used would include those highlighted above such as size and location of retailer, type of till and time of day, week, and year. Other criteria could also be used as appropriate. When a user identifies themselves, the apparatus will review the criteria base and issue the correct fund accordingly. For example the user has identified the till, the apparatus knows the time of day, week and year and based on these simple criteria issues the appropriate start fund value and distribution.

Defined By Store Policy

An alternative approach to using rules is to utilize a look up table whereby specific values and denomination splits can be defined against specific tills. A store manager or cash room supervisor would define the value and denomination split for each of the tills and enter these into a look up table. When a user requests a start fund for a particular till, the apparatus refers to the look up table and issues the appropriate start fund.

The look up table could be completed off line and then up-loaded in its entirety or just a single entry modified for a specific till. Dependent upon the complexity of the look up table, the values and denomination split could remain the same for a till all day, every day or vary dependent upon time of week, year or any other variable.

Defined by Remote Policy

This is essentially the process as described and defined by store policy. The advantage here is that a remote authority, such as a head office, has the ability to manipulate start funds. This may be preferable for large retailers who wish to monitor payment media flow and payment media management from a central point and as such need the ability to define key store payment media policies. To enable this, the apparatus must be networked by some means. This may be, for example, by a dedicated connection, a closed network or a secure internet connection, or a secure telephone or facsimile connection.

Intelligently Defined Based on Real Time Data Analysis.

The inventors also envisage that if the apparatus were networked with the tills and electronic point of sale (EPOS) data, it would be possible to define start funds based on real data and potentially at real time. By monitoring the payment media inflow and outflow of a till over a period of time, it is possible to predict the probable start fund. Such forecasting applications have been developed for ATM cash management and cash management in the wider financial markets. One example is the Prognis™ software package sold by De La Rue Cash Systems.

Such an approach would allow for the accurate prediction of start funds and limit the need for supervisors, head office or users to concern themselves so deeply with predicting the payment media needs of the till. Such direct networking of the tills to the apparatus has further advantages including improved payment media accounting and reconciling.

The inventors have also recognized that an increasing number of retailers restock Automatic Teller Machines (ATMs)

that are present on their premises. The current embodiment and subsequent embodiments could be broadened to encompass the management of such ATM facilities as well. In doing so, the retailer can further limit the amount of payment media that needs to be transported and counted off site thus reducing cost.

The systems and methods according to this aspect of the invention provide the ability to maintain and issue multiple start fund profiles, and to accept updated profiles from external systems such as, for example, EPOS, Cash Office/Payment Media Management and/or optimizing systems. For example, a retail store's service desk or refunds counter typically has to keep lots of payment media on hand for refunds and uses start funds for this purpose. The ability to modify the amount and time of dispensing of start funds is also included in the system and methods according to some aspects of this invention.

Intelligent Dispensing of Change

The second embodiment provides a means to intelligently supply change to a user in the most suitable denomination split.

Figure 10:
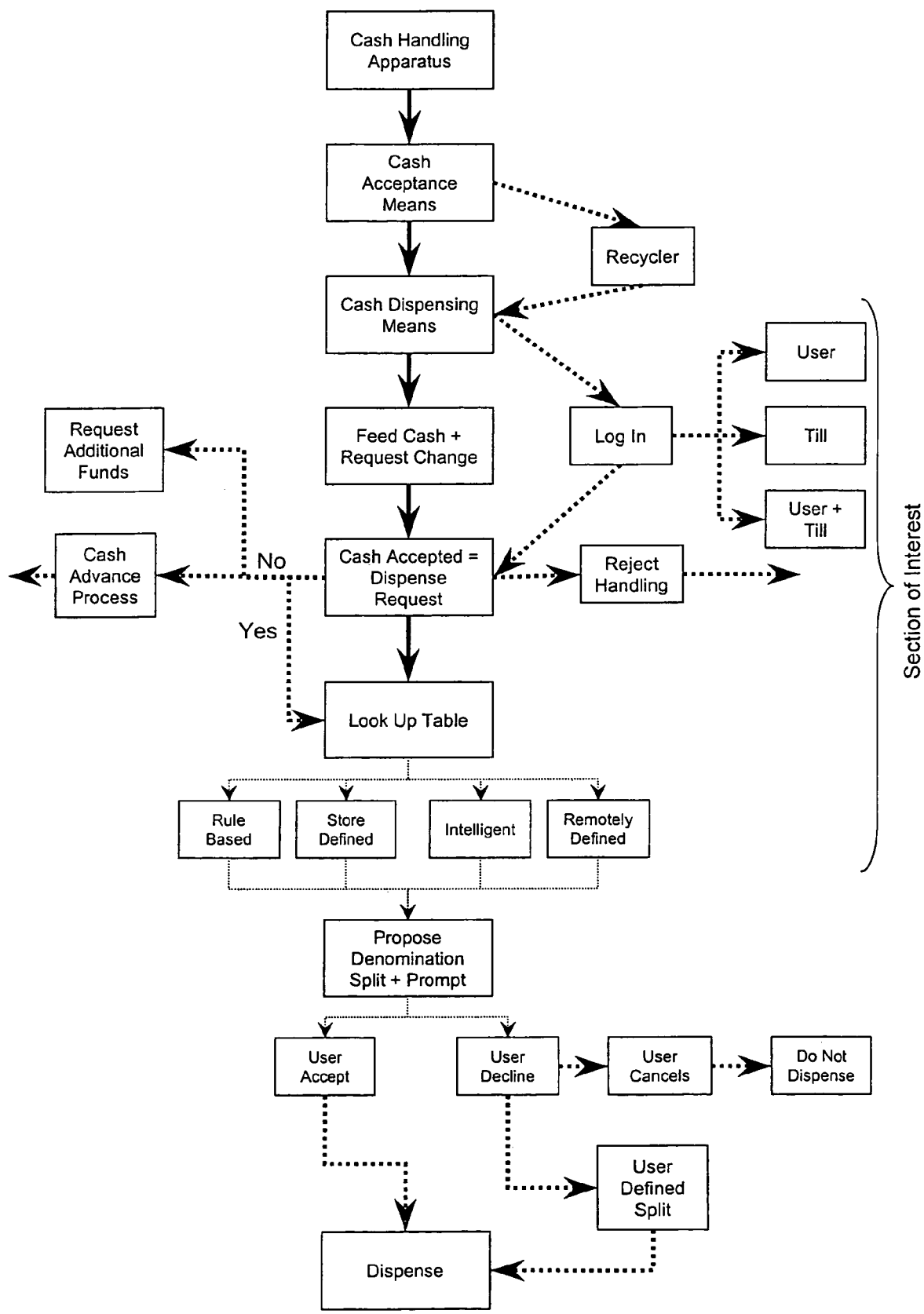
FIG. 10 illustrates a second embodiment of the current invention and shows an intelligent change dispense process.

The intelligent change dispense process is shown in FIG. 10. A payment media handling apparatus comprises a payment media acceptance and a payment media dispensing means. The payment media acceptance and dispensing means may be combined within a single apparatus and further to this be capable of recycling payment media. The apparatus optionally also has a user interface, the user interface may be a traditional PC with a keyboard and a mouse or other pointing means such as a touch screen. The interface provides the means by which the user can easily interact with the payment media handling apparatus. The apparatus may also have the ability to allow users to login and identify either themselves, their till or both themselves and their till. Though this is preferable for security and auditing purposes it is not essential. Indeed within the current embodiment it may be seen as a disadvantage to allow users to login. For the majority of instances the transaction will be a straight swap with a sum of money being exchanged for the same sum of money but in a different denomination split. By requesting a user to login, you merely lengthen the time required for the user to spend at the machine. If wider functions are allowed, such as combining the issuance of a payment media advance in combination with dispensing change, then logging in becomes more essential.

The user then indicates that they would like some change, this is typically done via the user interface but it is conceivable that the apparatus could be placed in a default mode to give change unless prompted to do otherwise. If in such a default mode, the apparatus would assume it is to give change for any payment media placed in the acceptance means.

The user then places the payment media in the acceptance means and the payment media is accepted. The payment media acceptance means would typically have the ability to determine denomination and validity of deposited funds. Any funds that cannot be identified would typically be returned to the user. Alternatively they may be accepted into a separate storage area and the user asked to identify the denomination. This latter approach may be used to prevent the user attempting to re-feed a note several times and thus spend an excessive period of time at the machine. This does present the opportunity for fraudulent activity but the retailer may prefer to accept this rather than have staff spend an extended period of time at the payment media handling apparatus. Further detail on the reject handling process is given later.

In addition to this, the user may also require a payment media advance in combination with the change, that is the user presents $50 but requires $100 in change. The apparatus may be configured to allow this, but it is likely it will require the user to login before performing such an operation. The payment media advance process is described in more detail later.

Once the payment media has been accepted, then the change is dispensed. In the current embodiment, the nature of the denomination split is determined intelligently and can utilize a similar decision process as described for the intelligent start fund process.

More specifically the rule based process would be dependent upon the size of denomination presented. For example:
  If the amount of payment media calculated by the apparatus <=$50 then the given exchange amount is equal to all $1's.
  If the amount of payment media calculated by the apparatus >=$51 and <=$75 then the given exchange denomination distribution is equal to 5×$5's and the balance in $1's.
  If the amount calculated by the apparatus >=$76 then the even exchange denomination is equal to or up to 50×$1's, 5×$5's, up to 5×$10 and the balance in $20's.
  If the change request is an odd number, the denomination distribution is highest rule and $1's.

In addition to this, the payment media handling apparatus may adjust the denomination distribution dependent upon its contents. If the apparatus is low on $5 bills then it may adjust to dispense additional $1 bills or alternative higher denomination bills.

Alternatively, the store may wish to define its own change policy. Another alternative is to allow a remote function such as a head office to define the change policy. Finally if the apparatus is networked to the tills, it would be possible to define change policy dependent upon knowledge of the real store activity, this may even be done in real time. Using such a networked system, the apparatus could review what change is being utilized most heavily at which tills and alter the change policy accordingly either for specific tills or for all tills.

Once the appropriate denomination split has been determined, the apparatus may dispense automatically or display the proposed split and ask the user to confirm their acceptance. If the user is given the opportunity to confirm/decline their acceptance of the proposed denomination split, they may also be given the chance to redefine the denomination split prior to dispensing. As with the Start Fund Process, a retailer may only want to allow a limited number of users to be able to redefine denomination split and as such a user would need to log in and have the correct authority level.

Simultaneous Count and Login

Figure 11:
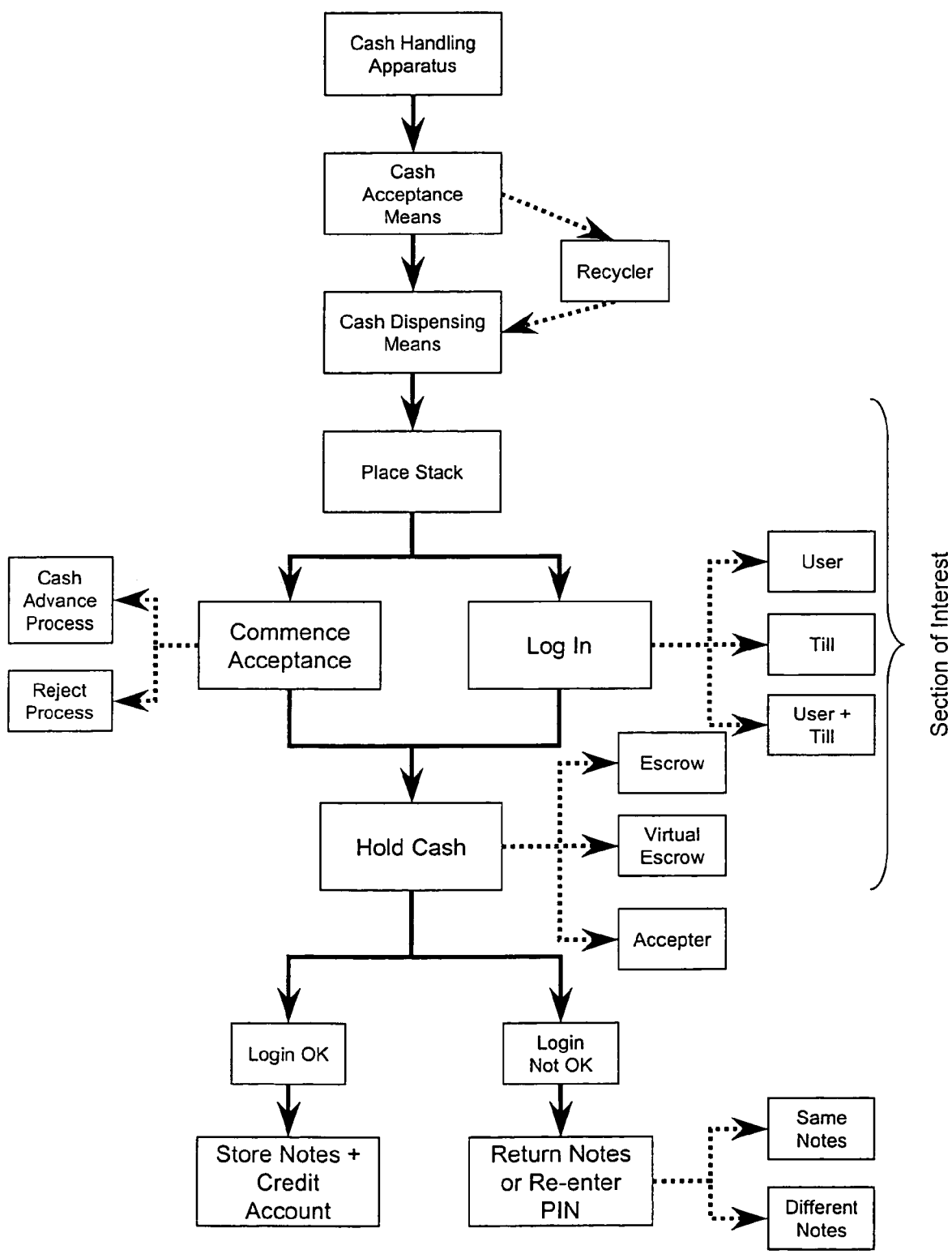
FIG. 11 illustrates a third embodiment of the current invention and shows a simultaneous count and login process.

A third embodiment of the invention is shown in FIG. 11 and shows the simultaneous count and login process. This aspect of the invention comprises a payment media handling apparatus having a payment media acceptance means and optionally a payment media dispensing means. The payment media acceptance and dispensing means may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus.

As indicated previously, the first operation undertaken by a user is to login. This process takes time and delays the payment media acceptance process. It is therefore proposed that as soon as the user places payment media onto the payment media acceptance means, the payment media is accepted, validated, counted and stored. Whilst this process is occurring, the user logs in. If the login process is successful, the payment media is retained and the user notified that the process has been successful. If the login process fails, the user will be prompted to login again. If the user continually fails, for example three failed attempts are made, the payment media is returned.

Dependent upon the configuration and nature of the apparatus, the payment media may be held and returned in a number of ways. If a note acceptor and a note dispenser are used, then it is preferable that the notes are held in a physical escrow prior to final acceptance upon successful login. If login is unsuccessful, the same notes are returned from the escrow to the user. Alternatively it would be possible to accept all the notes into an acceptor and then return different notes upon a failed login from a dispenser. Though possible, this is not a preferred approach as it presents the opportunity for an unscrupulous employee to launder invalid notes.

If a recycling apparatus is used, again there are two options for returning the notes. A physical escrow could be used to hold the notes as before, only making final acceptance upon successful login. Alternatively, as is the case for the TCR Twin Safe™ device, the notes are accepted and stored in the machine. If a login attempt fails, the same notes are returned from the store back to the user. As the notes are issued on a last in first out basis, you can be confident you are returning the same notes. In all cases the notes are not credited to the accounting software until a successful login has taken place.

The inventors have also recognized that this functionality could also be used for other processes. For example, if a store has a policy not to return heavily soiled notes to its customers, the apparatus could be used to accept soiled notes and return more suitable notes. This would be achieved by feeding soiled notes into a spare storage area. Typically such a storage area already exists for high or unusual denominations of notes. Typically this additional storage area will not be used for reissuing notes during the day and only emptied at the end of the day for bank deposit purposes. Once the soiled notes are stored, clean notes would be issued from the appropriate storage area.

The principal advantage of allowing someone to login and count simultaneously is the reduction in time spent at a machine. This is particularly beneficial at the end of a shift or trading day when multiple users may wish to deposit till contents. All the time the users are waiting to deposit their till contents, the retailer is paying them. Also any delay in getting the till contents into a secure location is increasing the exposure to risk of fraudulent activity or theft. It is very much in the retailer's interest to count, reconcile and store the notes as rapidly as possible.

Reject Handling Process

Figure 12:
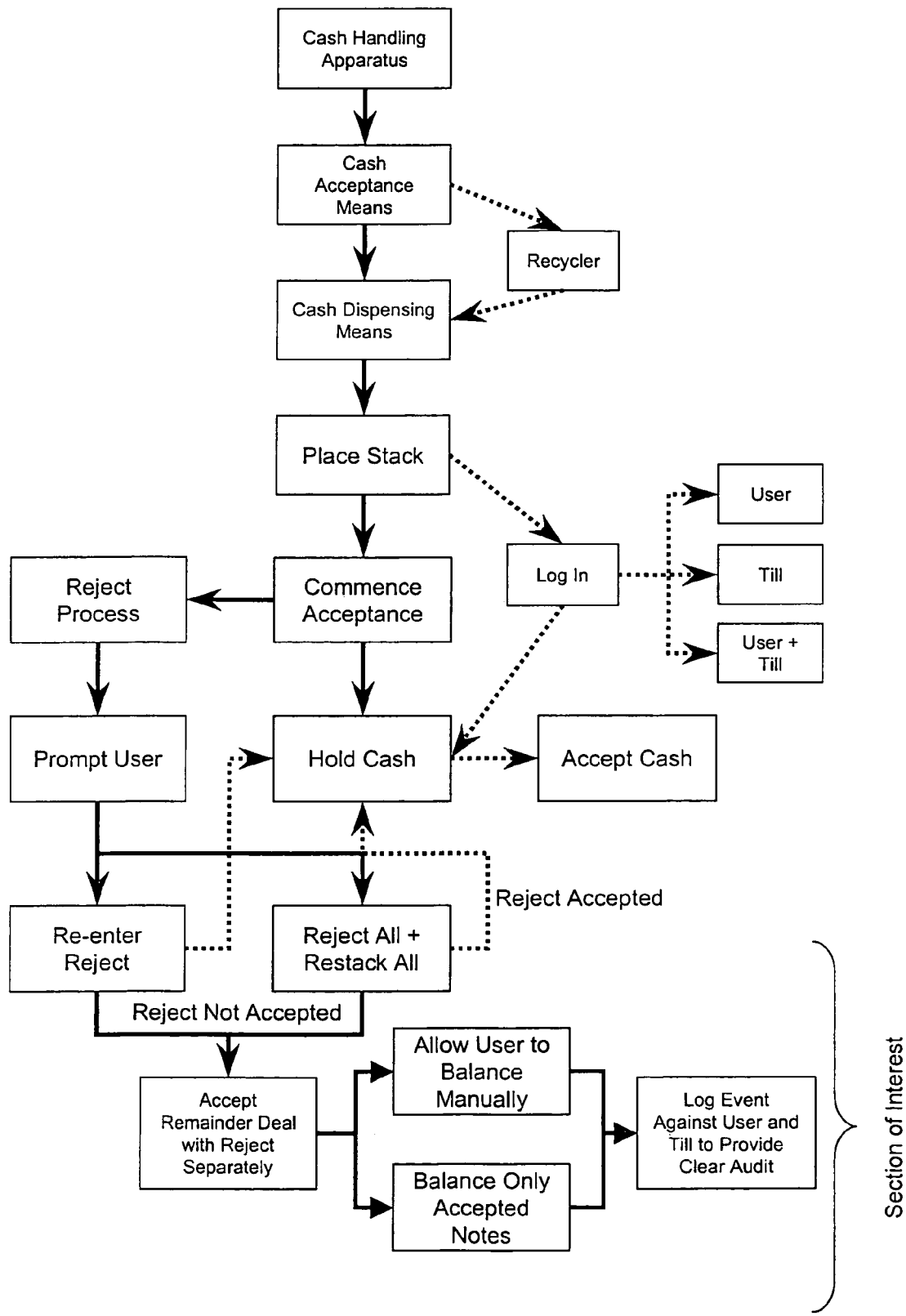
FIG. 12 illustrates a fourth embodiment of the current invention and shows and intelligent reject processing activity.

As with all environments where money is being exchanged, there inevitably will be some instances where payment media is accepted which is not in a fit state to be handled by the payment media handling apparatus. There are a number of reasons why payment media may not be accepted. These include counterfeits, heavily soiled, damaged or old issues of notes without the modern machine readable features. In some countries old notes are not taken out of circulation until they cease to be fit for use. It is therefore essential that any payment media handling process and therefore apparatus should be capable of dealing with and accounting for rejects. The fourth embodiment, illustrated in FIG. 12, shows a payment media handling apparatus and its associated reject handling process.

The process comprises a payment media handling apparatus having a payment media acceptance means and optionally a payment media dispensing means. The payment media dispensing and acceptance means may be combined within a single apparatus and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes it is not essential. Further to this, it is preferable that if a login process is utilized it is done so in accordance with the third embodiment (FIG. 11).

If a reject is found during the payment media acceptance process, the user is notified and the reject returned. Alternatively, though not preferably, all the notes may be returned. The user may then be prompted to re-enter the reject and, if the reject is a note, may also be advised to flatten the note or fold back any bent corners prior to re-entering the note. It is more usual within a retail environment for any rejects to be immediately dealt with separately in order to save time. The reject is typically placed in an envelope and then placed in a secure drop box. As an option, it is also proposed that the envelope could be issued from the apparatus and is provided with data relating to the user, till, time, and transaction data so its contents may be tracked back. This data may be provided in a machine readable format such as a bar-code, 2-D Bar-code or RFID device.

If a reject is handled separately, then dependent upon the user's authority, they may be allowed to make a decision on the denomination of the note and value balance the transaction manually. More typically such an action will not be allowed and only the till contents accepted by the apparatus will be tallied.

Alternatively the user may be allowed to value balance based upon other criteria apart from their level of authorization. For example the store may set rules allowing employees to value balance up to a given level, say $20. So long as the discrepancy falls within $20, the user is allowed to proceed. If the discrepancy is greater than $20 a supervisor may be notified or the event logged for cross-referencing subsequently. If the apparatus produces the envelope, it could be provided with the data as before plus details of the suggested denomination.

Intelligent Bank Deposit Process

Figure 13:
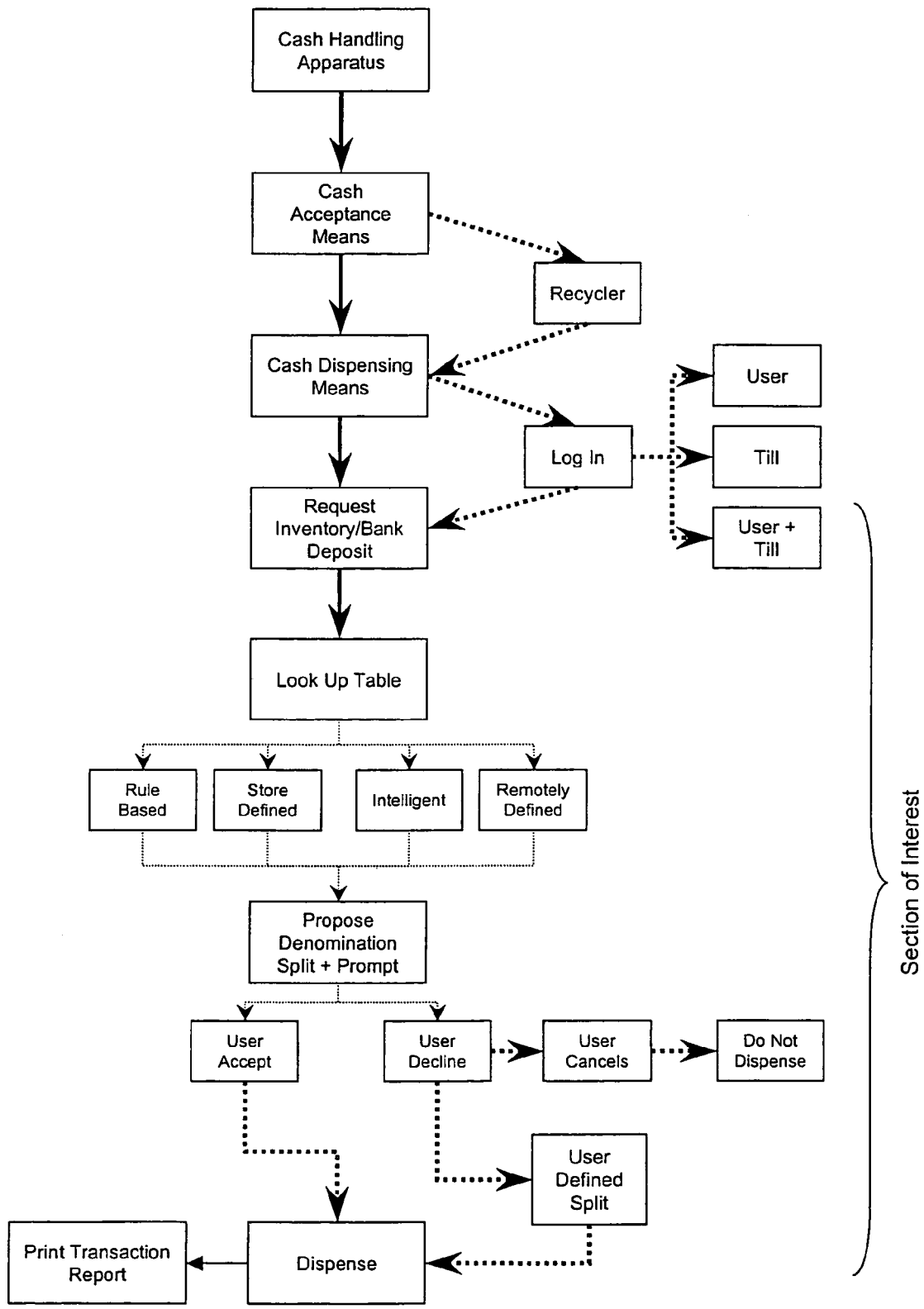
FIG. 13 illustrates a fifth embodiment of the current invention and shows the bank deposit process.

Another essential process required within the retail environment is the ability to make a bank deposit, or more precisely withdraw finds from an apparatus for storage or transportation off site to the CIT/commercial bank. Typically this will be done at the end of every day. The fifth embodiment is shown in FIG. 13.

Here a payment media handling apparatus comprises a payment media acceptance means and payment media dispensing means. The payment media dispensing and acceptance means may be combined within a single apparatus and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes it is not essential.

The user then makes the request to make a bank deposit via the user interface. As with previous examples, it is preferable that the user does not have to worry about what the size of the deposit should be or what the denomination split should be. To this end, the apparatus intelligently decides the value and denomination split of the deposit. This is again achieved in a similar manner to the Start Fund Process. Indeed, it is very likely that the start fund process and the bank deposit process be interdependent. Whereas the issuance of start funds typically happens first thing in the morning, the bank deposit process typically happens last thing at night. The aim of the bank deposit is to remove as much payment media as possible from the payment media handling apparatus so it can be stored safely. However the retailer would like to retain sufficient funds within the payment media handling apparatus to be able to issue the start fund the next morning. There is a fine balance between the need for security and the need for efficiency.

The size of the bank deposit can be controlled using the four methods described previously for the start find process. The most basic approach is the use of rules. The rules govern the value and denomination split of payment media to be retained within the payment media handling apparatus. For example, it is usual for the retailer to bank all the high and unusual denominations every night, e.g., all $100, $50 and $2 bills will be banked every night. Moreover, the payment media handling system can display all current denominations held in a payment media handling device's miscellaneous bill receptacle along with a deposit profile of those bills.

This is a basic approach and it is more likely a retailer would prefer to retain more control over the bank deposit process. So, typically a process that allows the retailer to define policy would be preferred. This would allow the retailer to modify the bank deposit if, for example, they were aware of a promotion running that would require an excess of $20 bills. By altering the bank deposit process and the start find process accordingly, the store owner could account for this.

Alternatively in some instances a remote authority may wish to control the bank deposit process, a retailer's head office for example. To enable this, the apparatus must be networked by some means. This may be, for example, by a dedicated connection, a closed network or a secure internet connection.

Finally, the bank deposit may be intelligently defined by monitoring activity on the shop floor. If the payment media handling apparatus was networked to the tills, it would be possible to analyze data from the shop floor either real time or over a prolonged period. This data could then be used to determine the optimum bank deposit to allow for not only the start fund issuance, but potential payment media advances and change request running through the next day.

By monitoring the bank deposit process, it is possible to minimize the need to empty, deplete or restock the payment media handling apparatus. Also by minimizing the amount of payment media to be banked, you reduce the associated costs of preparing for transport and counting of payment media by CIT operators.

Once the apparatus has determined the preferred bank deposit, the user will be notified or the dispense process may commence automatically. If the user is prompted, they may be given the opportunity to accept, decline or modify the proposed value and denomination split. As with previous examples, the ability to modify a denomination split and value will be very much dependent upon store policy and/or the user's level of authority.

When the notes are dispensed, they may be dispensed in a number of formats dependent upon user, store or head office policy. Preferably the notes will be dispensed in a format most suitable for the commercial bank or CIT operators to handle them subsequently. For example, the notes may be issued by denomination and in predefined amounts. Each defined amount or denomination stack may be provided with a header/footer card and/or banded. Header and/or footer cards are used by CIT operators and other major payment media sorting and counting centers to provide a variety of information about the notes to be counted and sorted. Typically the header is read just before feeding the first note of a stack and the footer just after feeding the last note in a stack. The information provided on a header may define the origin of the notes, the denomination to be expected, and the proposed value. It is proposed that the dispensing device either contains a selection of header/footer cards or be capable of generating them automatically or upon demand. Typically the dispensing apparatus would be provided with a suitable means for transferring information. This information may be in the form of a barcode, 2-D barcode, RFID, Magnetic-stripe or any other form of data storage device that can be subsequently interrogated.

In addition, or alternatively, the notes may be banded or placed directly into a secure container. The band or container may also be provided with tamper evident devices or be intelligently tagged as described in De La Rue International Limited's co-pending applications WO0245042 and WO03046845.

The systems and methods according to this aspect of the invention permit printing of a deposit slip by the apparatus at the ending of processing of a bank deposit function. The deposit slip may contain a barcode at an end of the slip to comply with the bank's (or CIT, etc.) requirements.

Cash Advance Process

Figure 14:
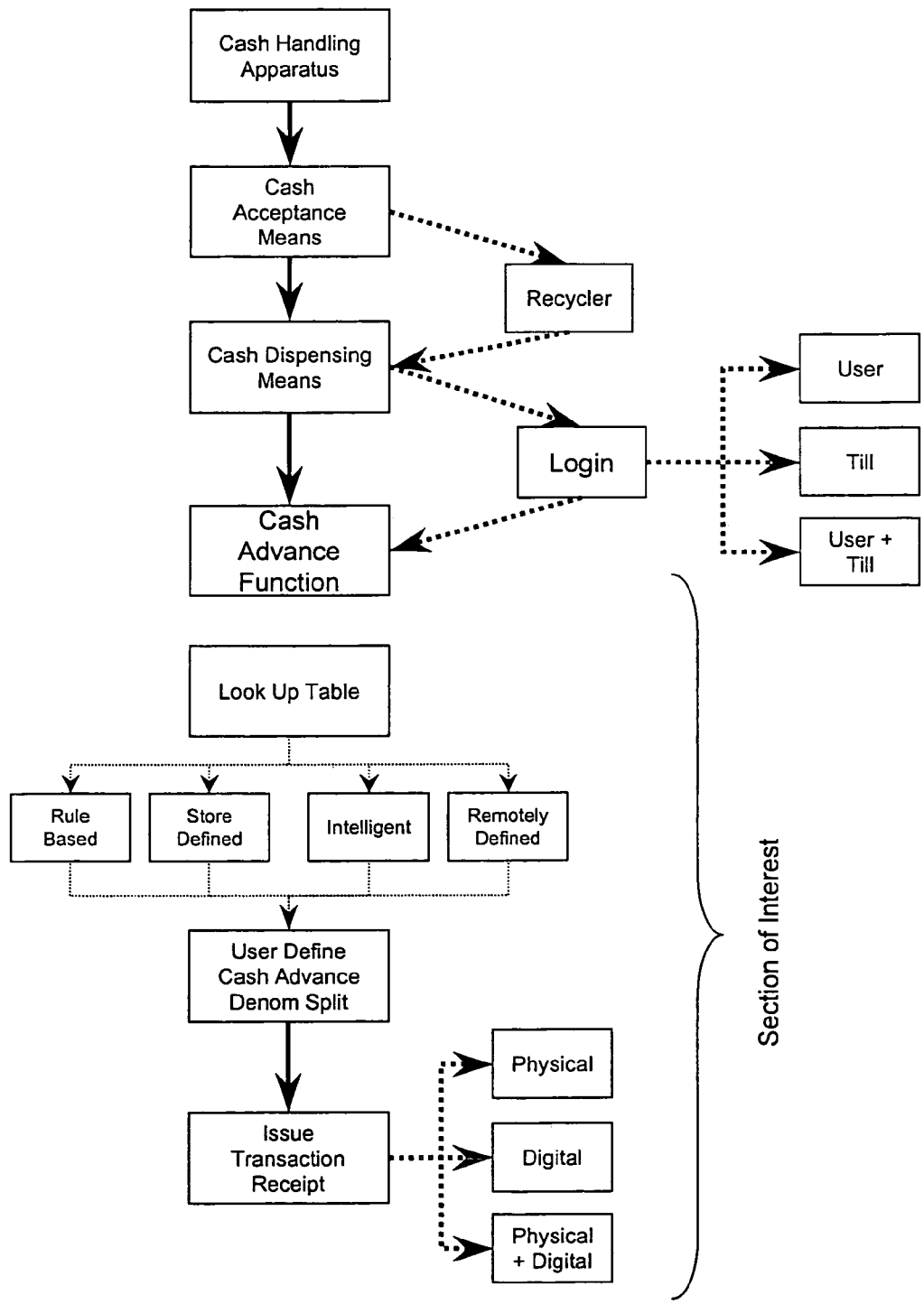
FIG. 14 illustrates a sixth embodiment of the current invention and shows a cash advance process.

Another needed function unique to retailers is to be able to issue a cash advance upon demand. FIG. 14 illustrates the sixth embodiment and comprises a payment media handling apparatus having payment media dispensing means and optionally a payment media accepting means. The payment media dispensing and acceptance means may be combined within a single apparatus, and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes, it is not essential.

The user approaches the apparatus and requests a cash advance. In the simplest form the apparatus will then prompt the user to indicate the value, denomination split and media type required for the cash advance. If the apparatus has required the user to logon or identify the till, it may make a decision as to whether it is acceptable to supply the value requested. For example, the apparatus may be set to allow only one automatic cash advance per day for any given till. An advance is the issuance of money to an entity, e.g., a specific individual supervisor, a start fund, a cashier, a till, etc. If a second cash advance is requested, a supervisor may be required to provide authorization.

A more sophisticated apparatus would use a more complex rule-based criteria to determine whether or not to dispense and also the value and split to dispense. The rules would be derived based on typical requirements. A yet more sophisticated apparatus would allow these rules to be defined by store or remote policy as for previous examples. Finally if the tills were networked to the apparatus, then an intelligent decision could be made as to the best value and denomination split for the cash advance based on the day's trading activity or data built up over a period of time. Having tills networked may also negate the need for supervisors to authorize multiple cash advances. The till would notify the user and the apparatus that it is short of particular funds and allow the cash advance to proceed.

On the other hand, supervisors and/or managers may be allowed to issue start funds for multiple entities without having to log in each time. For example, a supervisor or manager, may leave his or her log-in in effect at a payment media handling apparatus, provided only pre-approved cashiers are allowed subsequent access to the machine, until the supervisor's or manager's log-in is cancelled or the supervisor or manager logs off of the funds dispensing machine. As an alternative to logging-off, after dispensing of a cash advance, a supervisor or manager may simply hit "cancel" thereby signing-off completely, without a separate log-off.

If the user defines the value, denomination and media type split, it will issue automatically. Certain users can also define the time of day of issuance. Should the apparatus propose a denomination split, the user may be given the opportunity to accept or decline. If the user declines, they may be allowed to define their preferred value and denomination split dependent upon their level of authorization.

Moreover, the payment media handling system can report and track register activity and implement business rules to govern functional capability, such as, for example, no cap on the amount of money in an advance.

Finally the user may be issued with some form of receipt along with the cash advance. The receipt may be stored in the till or stored elsewhere and provides an additional physical audit of the transaction.

Capacity Management

Figure 15:
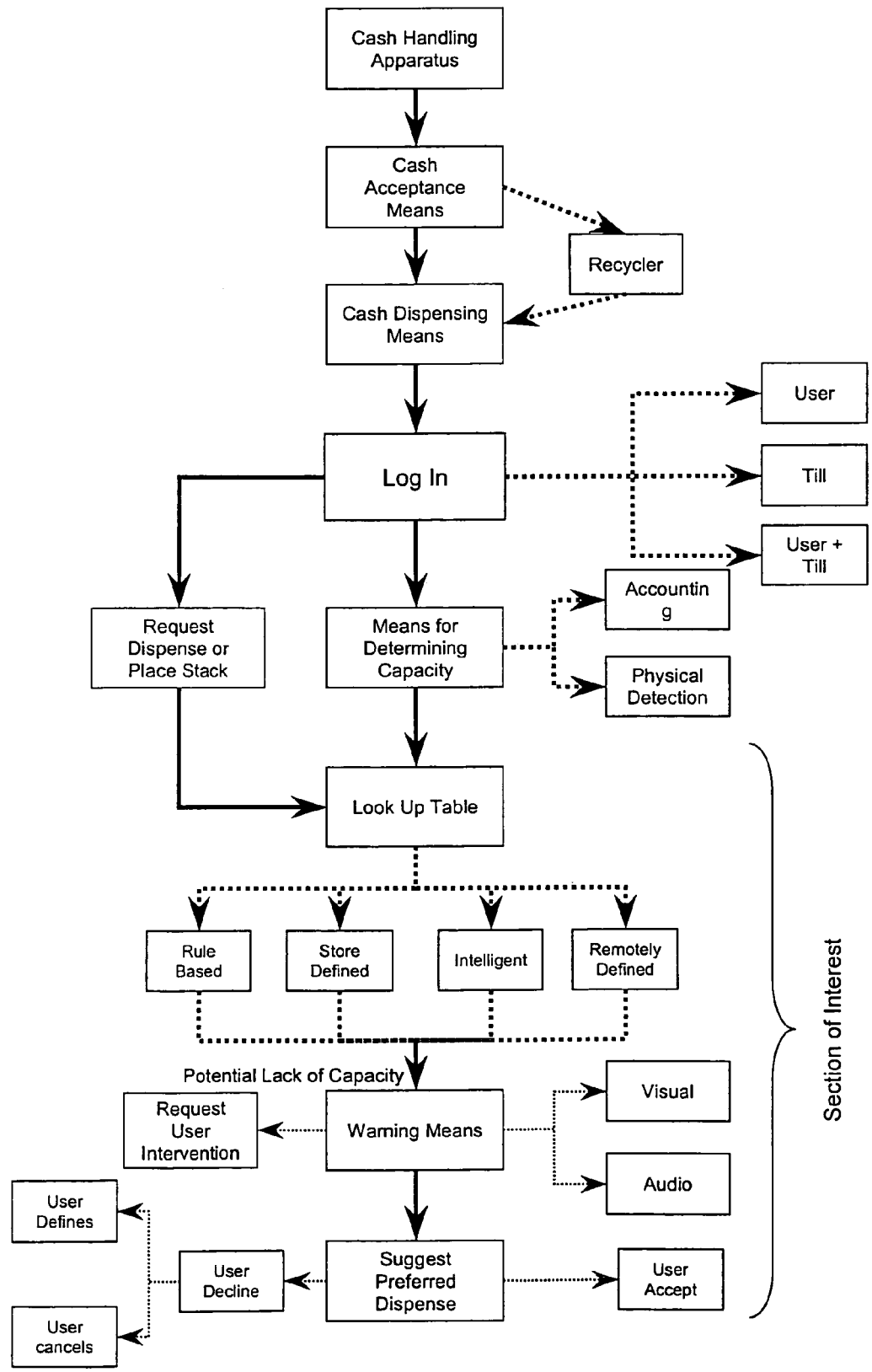
FIG. 15 illustrates a seventh embodiment of the current invention and shows an intelligent capacity management process.

As alluded to earlier when discussing both the start fund process and the bank deposit process, the ability to manage the capacity of the payment media handling apparatus is of key importance. FIG. 15 shows the seventh embodiment and illustrates the capacity management process.

Here the payment media handling apparatus comprises a payment media acceptance means and payment media dispensing means. The payment media dispensing and acceptance means may be combined within a single apparatus, and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes, it is not essential.

In addition, the apparatus has a means for determining its capacity. This may be provided by a physical means such as scale(s) for measuring weight, or by measuring the length of a stack of notes or any alternative. Alternatively, capacity may be more accurately monitored by accounting means. For example where a recycling apparatus such as the TCR Twin Safe™ device is used, you have a precise knowledge of what has been put in, so by default you know exactly what you can take out.

When an event is requested by a user, the apparatus reviews its capacity and determines whether it is capable of meeting the user's needs. The payment media handling system also maintains an inventory and threshold levels which act as triggers to launch an automated ordering routine for additional funds by, for example, contacting a bank or CIT provider for change orders. Also, banks and/or CIT providers may enter the system and provide such information to the payment media handling system on an as needed basis. In a preferred embodiment, the process runs in parallel to the other intelligent processes herein described. By using look up tables, rules or analyzing till behavior, the apparatus can determine the most appropriate course of action. Furthermore if more than one apparatus is present and they are networked either directly or via a host, a more versatile situation can be envisaged. Here if the apparatus at which the request was made is unable to meet the user's needs, it may direct the user to another apparatus.

This intelligent handling of events works for both the acceptance and dispensing process. For example if the user requests a start fund, the apparatus will first review its contents and cross reference this to the preferred start fund. If sufficient funds are available, the apparatus will dispense the preferred value and denomination split. If, however, the correct funds are not available, the apparatus may dispense an alternative start fund, alert a supervisor, or direct the user to another apparatus with the correct fund. One further alternative, though not preferred, is that the apparatus will dispense a part of the start fund and then direct the user to another apparatus to dispense the remainder of the start fund. If the till and apparatus were networked, the apparatus would be able to pre-empt the user's request and immediately direct them to another apparatus or alternatively alert a supervisor prior to the user's arrival.

Alternatively if the user wishes to deposit till contents, a similar process would take place. When the user identifies themselves, the apparatus may make a decision based upon simple rules, store policy, remote policy or based upon real time till activity as to whether to allow the user to try and enter the till contents. For example if from reviewing a look up table or rules the apparatus sees that the average till contents are usually in excess of its remaining capacity, it may direct the user to another apparatus or request assistance from a supervisor. If the apparatus decides to try and accept contents but subsequently finds it does not have sufficient capacity, it may return all or some of the notes to be deposited in another apparatus. Alternatively all the notes will be returned and assistance requested from a supervisor.

Typically the apparatus would review its contents both as an event is requested and just after. The advantage of analyzing contents both before and after an event will now be described in context of the event timing process.

Event Timing Process

Figure 16:
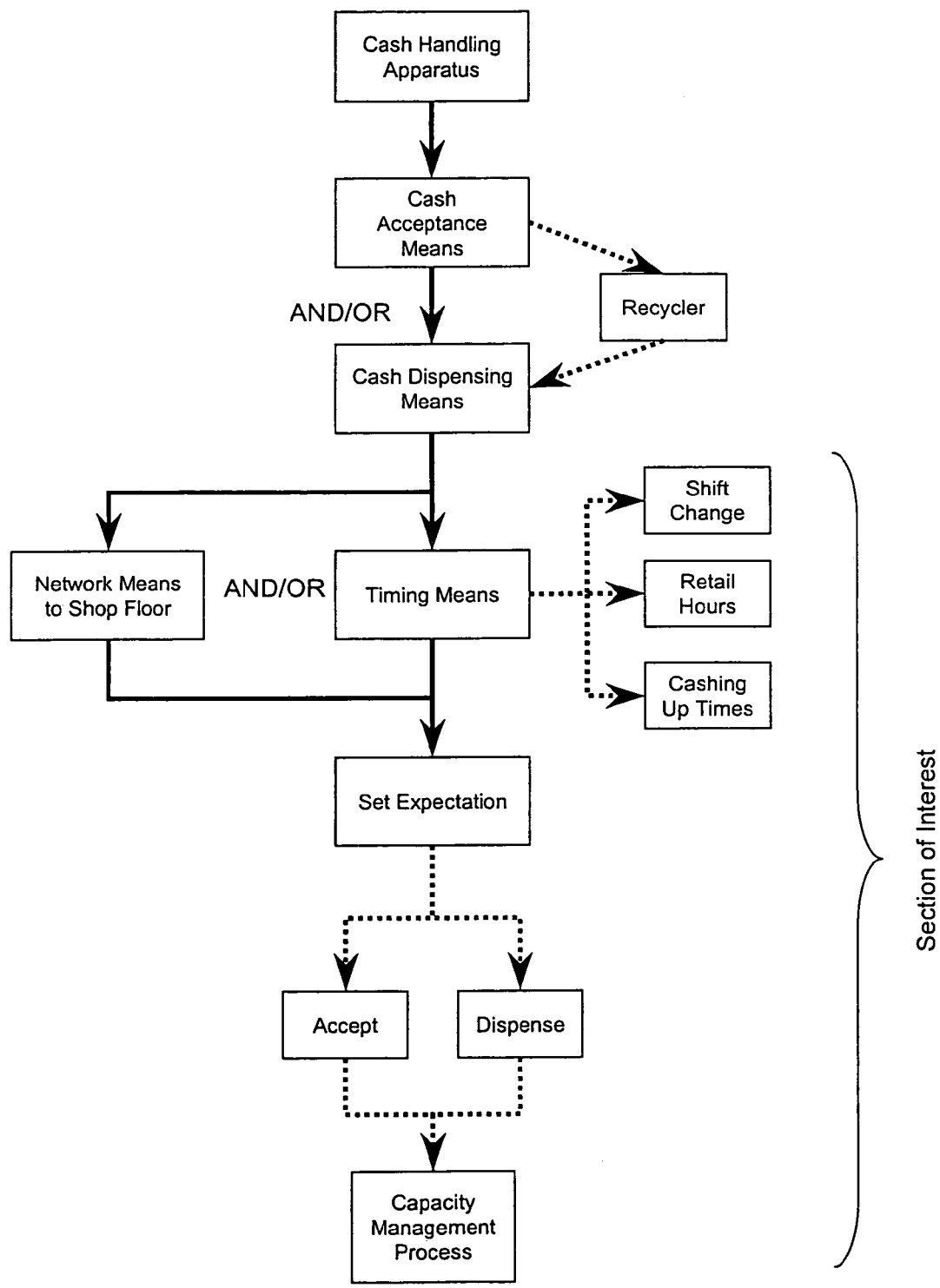
FIG. 16 illustrates an eighth embodiment of the current invention and illustrates an intelligent event timing process.

The event timing process is illustrated in FIG. 16. The event timing process is the eighth embodiment comprises a payment media handling apparatus having a payment media acceptance means and a payment media dispensing means. The payment media dispensing and acceptance means may be combined within a single apparatus, and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes, it is not essential.

In addition, the apparatus is provided with a timing device, or is networked to tills and other payment media handling apparatus, or is provided with both a network and a timing device. If the apparatus utilizes a timing device, it is also provided with information relating to the timing of key events where actions may be required. Such events include:

Staff shift changes.
Opening and closing times.
Till cashing up times.

By having knowledge of the timing of these events on a daily, weekly, seasonal or yearly basis, the apparatus can anticipate periods of activity. Further to this, the apparatus can predict the nature of the activity, be it a dispense or acceptance process, and also the scale of that activity.

By having this knowledge, the apparatus can review its capacity using the capacity management process to determine whether it is likely to meet the needs of the users. If for some reason the apparatus feels it may not have sufficient capacity or sufficient funds, dependent upon the type of event forthcoming, it will take action by alerting a supervisor or ensuring that an alternative apparatus is capable of handling the forthcoming event.

If the apparatus is networked to the tills and other apparatus, this timing process can be managed more effectively. By having a knowledge of exactly what is in the tills, the payment media handling apparatus can accurately determine whether it is capable of accepting the contents or supplying sufficient cash for an advance or till float.

Using either the timing device or a network process, the payment media handling device is in a much better position to pre-empt and predict forthcoming activity and take steps to ensure no delay is caused to the users.

In a further enhancement, the event timing process can be utilized to provide confidence in the integrity and security of the physical payment media and data associated with it whilst it is in transit. In the current context, the transit or movement of payment media will be from the till to the back office payment media handling apparatus.

When moving payment media from a first location to a second location, it is usual to do this as quickly as possible to limit the exposure to potentially fraudulent or illegal activity. Furthermore it can be estimated approximately how long that time should be. For example in a large department store it may take 30 minutes or more from collection of the payment media from a till until it reaches the back office and is counted into a secure environment. In a smaller retailer with fewer tills and less floor space it may only take 5 minutes or less. In either scenario an approximate transit time is known. If, for whatever reason, the payment media takes in excess of the usual period of time to make the journey, there is a greater risk that it has been tampered with or mishandled in some way.

The event timing process can be used as means to measure this risk and assess whether there may be a problem. For example the payment media handling apparatus knows, because of the event timing process, that a till is due to be cashed up at a certain time; it also knows how long it should take the till to payment media out and for the contents to be moved from the till to the back office. Further to this, the payment media handling apparatus can know, approximately or accurately, what the value of those till contents should be. If for some reason the value of the till contents falls short by a significant margin and the till took in excess of the estimated time to travel from the till to the back office, the payment media handling apparatus could be instructed to alert the user and a supervisor. The supervisor can then review the situation and make a decision as to whether the till contents were indeed correct or further action needs to be taken. A suitable tolerance can be built into both the timing aspect and the value aspect to prevent the payment media handling apparatus from alerting too frequently. The rules governing the process could be very simple, as above, or more complex. For example the longer the delay between till and back office, the lower the discrepancy needs to be between estimated value and actual value received.

A still further enhancement would be where the tills are networked to the payment media handling apparatus. The actual EPOS data from the till could be used to tell the payment media handling apparatus exactly how much payment media to expect. The till would also notify the payment media handling apparatus that it is being cashed up and to expect the contents in a period of time. Even when such accurate data as to expected funds is available, it is still likely some tolerance will be built in to allow some variation from the expected amount. This will allow for the wrong change being given occasionally or other minor, accidental errors that will always occur.

A further enhancement could be where payment media is transported from the till with data associated with it. The payment media may be held in a secure container, and associated with that container is a suitable data storage device providing detail on the value, denomination and potentially other EPOS data. Such a situation is described in more detail in De La Rue International Limited's co-pending applications WO0245042 and WO03046845.

Here, as the value and denomination is stored securely, it is theoretically possible to avoid the need to recount the payment media. However the user has to trust that both the physical and data has retained its integrity. Obviously, as before, the longer the secure container is not in a secure environment, such as being carried across a shop floor, the longer it is exposed to risk. If the container is transported from the till to the back office within the allotted time, the payment media handling apparatus will trust the data and will not request that the payment media be counted again. The container can then be stored securely in a safe area. Upon acceptance of the valid data, the payment media handling apparatus will update the data file to indicate that the payment media has been accounted for and stored securely. If however the payment media is not presented within the prescribed time limit, the payment media handling apparatus will request that the payment media be counted again. If the value is correct, the data file will be updated and the payment media taken for secure storage. If the value is wrong, a supervisor will be alerted and further action taken as required. The inventors recognize this application has wider value beyond the retail environment.

Error Handling Process

Figure 17:
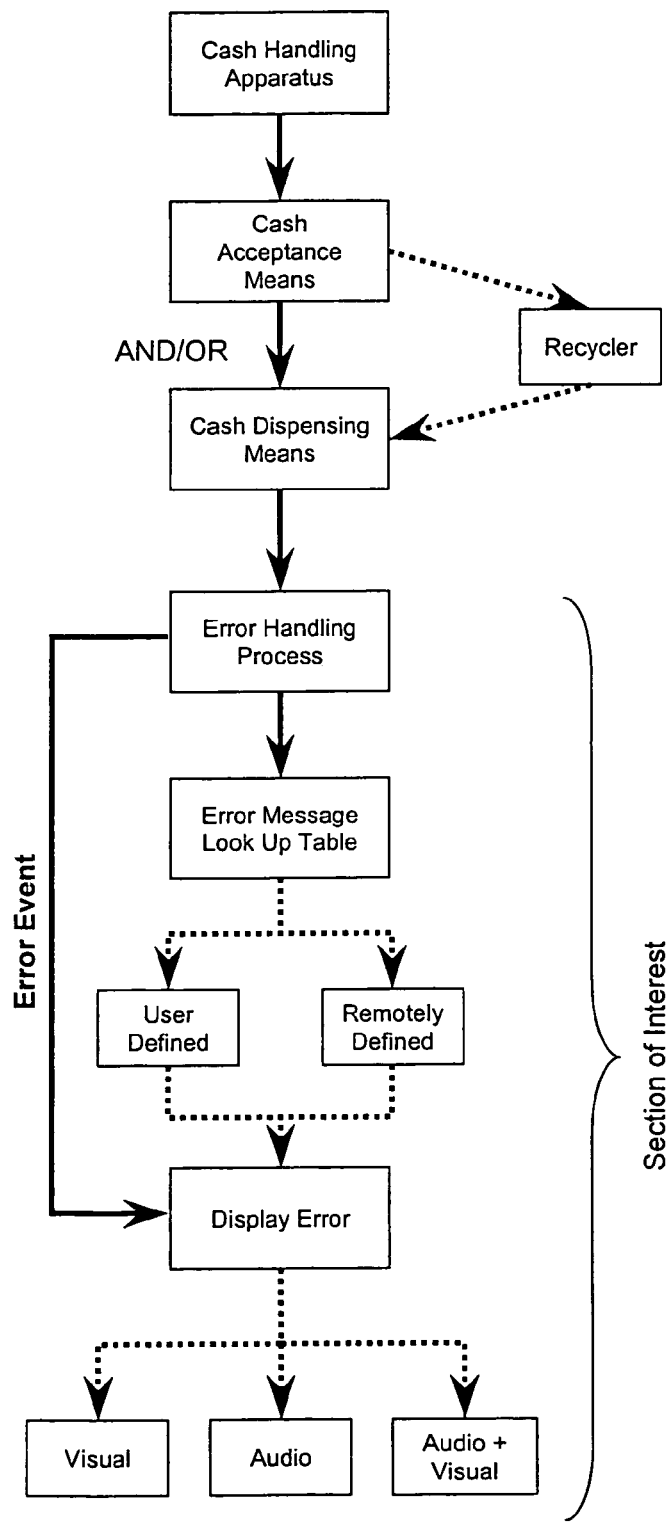
FIG. 17 illustrates a ninth embodiment of the current invention and shows a novel error handling process.

As with all apparatus, errors do occasional occur due to paper jams, misfeeds, double feeds etc. The ninth embodiment, illustrated in FIG. 17, shows the proposed error handling process.

A payment media handling apparatus is provided with a payment media acceptance means or a payment media dispensing means or optionally both. Where both are present, the payment media dispensing and acceptance means may be combined within a single apparatus, and further to this be capable of recycling payment media. The apparatus also has a user interface, which may be a traditional PC with a keyboard and a mouse or other pointing means such as a touch screen. The interface provides the means by which the user can easily interact with the payment media handling apparatus. Typically the first operation carried out by the user will be to login and identify either themselves, their till or both themselves and their till. Though this is preferable for security and auditing purposes, it is not essential.

Should an error occur, the apparatus identifies the error and refers to a look up table to find the correct error message to display to the user. In the current embodiment, it is envisaged that the retailer be allowed to modify the error messages to a limited extent to make them more user friendly. Such alterations would include changing the language of a message, the text of a message or providing details of where a user may find assistance internally. The error message may be modified by a supervisor in store or may be controlled by a remote location, such as a head office or even the apparatus supplier.

Once identified, the error message will be displayed, the user notified and provided with instructions for remedial action. The inventors have recognized that the provision of error messages can be vastly improved if an audio description is provided along with the visual diagram. Invariably when an error occurs, the user is required to open the machine to access the internal mechanism. Once the user is attempting to deal with the error, invariably they are unable to see the visual error message and the only way to see if it has changed is to return to the display. If an audio message is played in combination with the visual message, the user can hear when the message has changed and will also hear the next set of instructions. This allows the user to handle the error more rapidly and reduce the down time associated with the machine.

If the machine detects that the error cannot be dealt by a user and may require an engineer, the user is notified of this. Optionally the apparatus may dial up the engineer or a call center and automatically notify them of the error and request assistance.

Media Tracking Process

Figure 18:
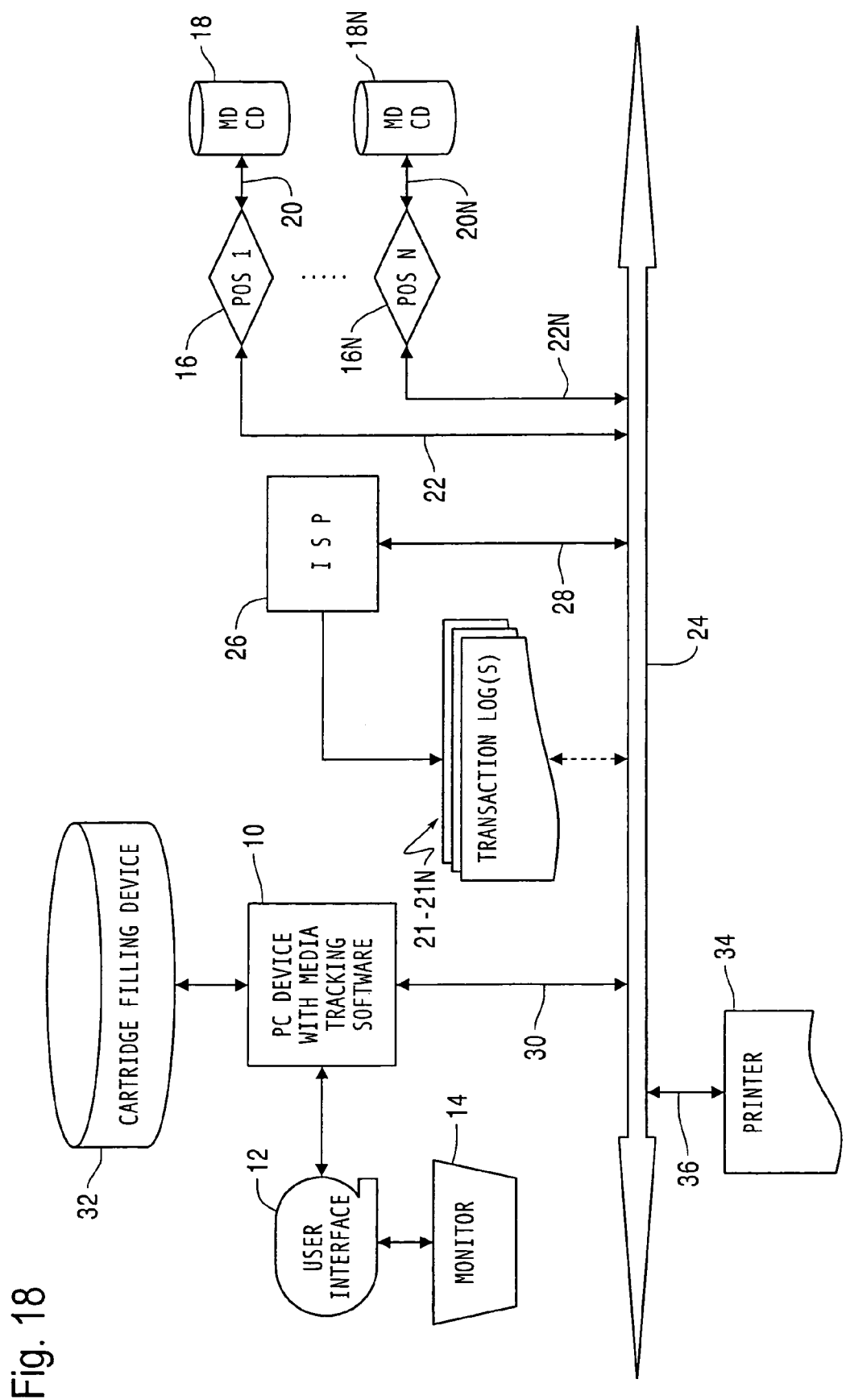
FIG. 18 illustrates a tenth embodiment of the current invention and shows a real time media tracking process which allows various intelligent processes illustrated by other embodiments of the invention.

FIG. 18 depicts a further embodiment of the present invention. This embodiment is employed to provide real time tracking of various types of media dispensed from devices typically connected to the register or device used to enter a transaction.

The embodiment includes a computer device 10 of known configuration such as a PC device employing a typical operating system such as Windows 2000 or Windows XP, although those specific applications are illustrative and not limiting. The computer is available to the operator in a known fashion through a user interface 12. This typically includes a key board and/or a mouse arrangement. A touch screen can also be employed to interact with the device 10 through a suitable connection. A monitor 14 is connected to the interface to display pertinent information.

Alternatively, the central control PC can be employed on which the media tracking software, as described hereinafter, is installed.

A series of command devices, such as registers 16 through 16N, where N is the number of such registers to be monitored, whether in a single store, multiple stores of the same type or a variety of stores selling different merchandise, are employed to record individual transactions between the customer and a store. These POS registers employ software for managing the check-out operations, for example, the above mentioned IBM 4860 or 4690 supermarket application.

The software generates among other things, a transaction log which for purposes of this embodiment, includes data representative of the cost of the transaction, the media tendered by the customer to pay for the goods or services acquired, and the change back to the customer. Of course, other data reflective of each individual transaction including the register identifier and/or till operator identifier may be included.

Still further for purposes of this embodiment, these registers are connected to respective media dispensing devices (MDCDs) 18 through 18N, each of which provides part of or all of the change back due a customer. The hook-up between the registers and the media dispensing devices is made typically through electrical connections 20 through 20N. Complementing electronics in both the registers and the media dispensing devices allow the media dispensing devices to respond to the change directive from the registers so as to issue the appropriate amount of media that is due the customer. In the case of coinage, devices 18 through 18N might be the InstaChange™ dispensing device which would respond to the change back command from the registers to issue coinage of various denominations, in accordance with an appropriate algorithm stored in the electronics internal to the InstaChange™ device, which will then issue the appropriate amount. Similarly, if this were a bill dispensing device, which was programmed to distribute bill denominations totaling the total amount of "dollar" change in accordance with a stored algorithm, it too, would respond to the command from the POS registers accordingly.

Each of the POS registers generates a transaction log 21 through 21N, respectively, which as noted above includes the change back due the customer. These transaction logs are available to the computing device 10 through electrical connections 22 through 22N which can be networked to the device 10 through various network connections 24 in a known manner. The transaction logs also can be made available to the computing device 10 through an internet service provider 26 linked in a known way to the network through connection 28. The computer device 10 accesses the transaction logs through its connection 30 to the network link 24.

As noted above, the media dispensing devices respond to a change back directive from the command device such as the POS register, and dispense funds, coinage or notes, sufficient to equal the change back due the customer. Devices, such as the InstaChange™ cartridge device, include an algorithm that responds to the coinage direction from the command device and issues unit amounts, quarters, dimes, nickels and pennies, totaling the coin portion of the change back. The InstaChange™ devices have sensor(s) internal thereto that alert the nearby attendant to the depletion of a particular unit of coinage, so that he can then contact the back office for replenishment. Typically these devices do not transmit data which would reflect the status of the individual coinage levels for the various denominations. Absent a periodic sensory check of the various levels, within a given cartridge, the attending cashier would have to wait until the level is reached and an audio or visual indication generated by the device. At this point the attendant would have to hold up further transactions at his register until the machine was replaced or refilled.

One object of this embodiment of the invention is to provide management with information concerning the present status of inventory of change media of each individual media dispensing device so as to advise, typically the back office, of the need to replace and/or replenish such devices prior to an alert from the attendant.

A further object of this embodiment is to monitor the change inventory throughout the store(s) so as to re-allocate the change resources throughout the store(s) and/or initiate change order requests to the CIT and/or bank.

To this end, the present embodiment employs software which duplicates in data form, what is happening at each of the media dispensing devices. The tracking media software installed on the computer device 10 accesses the transaction logs generated by the registers 16 through 16N via its network link 30.

Figure 19:
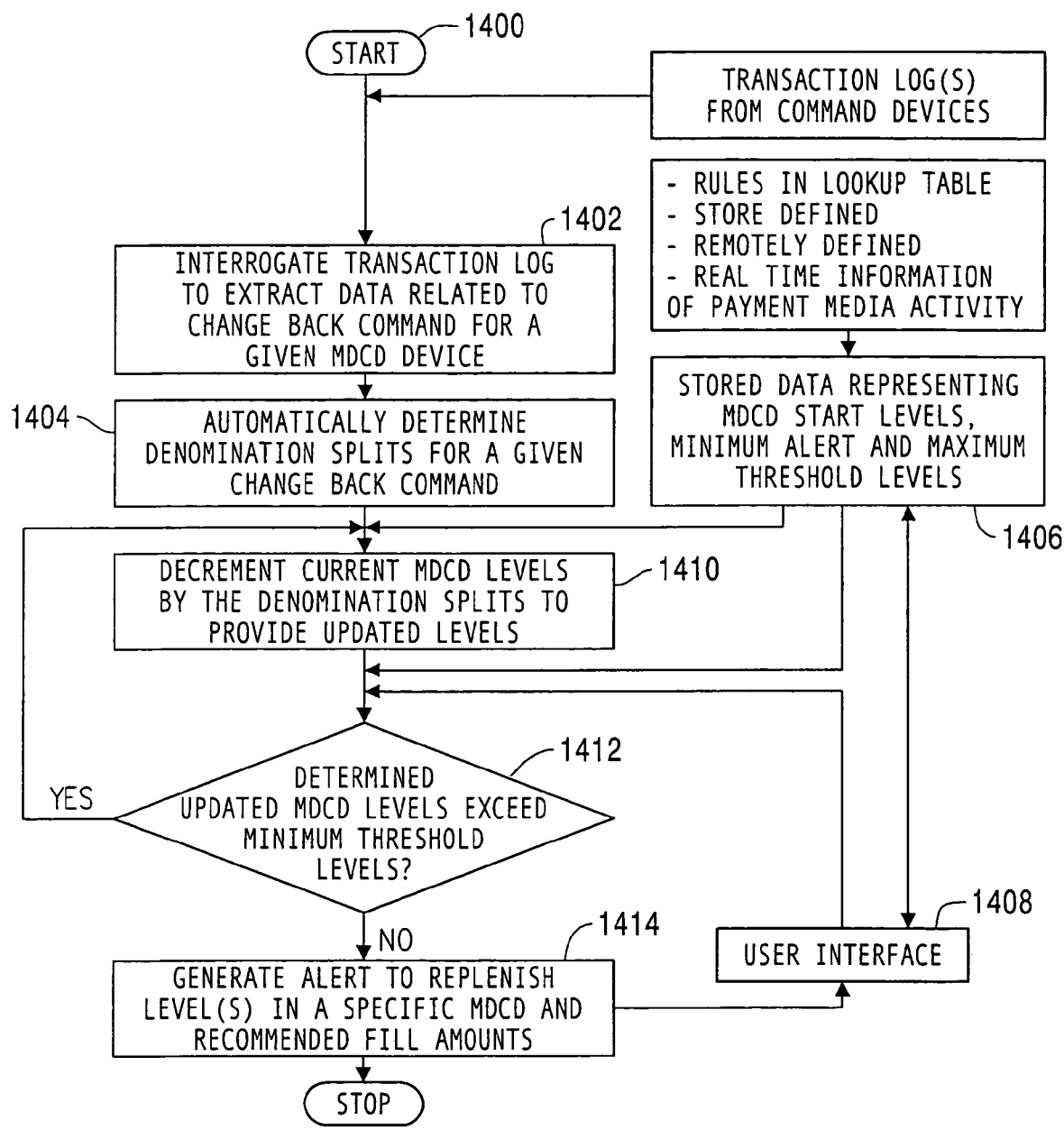
FIG. 19 is a flow chart outlining an embodiment of a method electronically processing the media tracking operation according to the invention as may be depicted in FIG. 18.

Referring to FIG. 19, the party charged with monitoring the status of the MDCDs initiates the media tracking software application in a known manner at step 1400.

The inventory status is calculated when the tracking media software is started. Initially in step 1402 the media tracking software interrogates successive transactions appearing in the transaction log for a given command device 16-16N and extracts data related to the change back command for each transaction. The tracking media software, by way of example, would include the same algorithm that is used by the MDCD device to determine the denomination splits, that is the number of each coin or bill unit, that is to be dispensed in response to the change back command from the devices 16 through 16N. This occurs at step 1404. Also available to the media tracking software is data representing MDCD start levels, as well as minimum and maximum denomination threshold levels, 1406. These levels can be established in a manner similar to the other embodiments set forth herein, that is through rules available in a look up table; as defined by a particular store; as defined remotely; and/or as set by real time information developed from actual payment media activity. The start levels could simply be the full capacity levels of a particular device or it may be based on the estimated usage from past analysis of transaction logs. Optionally, the tracking media software can provide as part of its inventory management capability a continual monitor analysis which will suggest lower inventories for given MDCD devices if a certain amount of media remains unused after an appreciable time period. Through the user interface 1408, the start levels can be adjusted manually. This could be done over the short term until a pattern develops, so that new start levels could be programmed in.

The tracking media software decrements the current MDCD denomination levels by the denomination splits determined in step 1404 so as to provide updated levels of inventory in a given MDCD device, step 1410.

In step 1412 the media tracking software compares the new MDCD level to see if it exceeds the minimum threshold levels as available in stored data 1406. If in fact the updated MDCD level does exceed the minimum threshold, the process continues the decrementing of that level through further application of step 1410 to subsequent transactions. If the comparison step of 1412 indicates that the then MDCD denominational level for any given unit no longer exceeds the minimum threshold level, then a suitable alert is generated in step 1414 accessible through the user interface, to indicate the need to replenish the indicated denomination at the specific MDCD.

Step 1414 can also provide refill suggestions back through the user interface which can either represent a total unit count for a particular denomination necessary to bring it back to the start level or can express, based on an internal algorithm, a number of full rolls of coins necessary to bring the particular denomination as close as possible to the stored upper limit for that denomination. The user through the interface can readjust the start level for that particular denomination if the amount of the recommended quantity to refill the denomination is more or less than the amount actually dispensed. In summary, by way of illustration, considering the InstaChange™ coin dispensing type MDCD devices, the tracking media software would provide InstaChange™ refill suggestions containing only full rolls of coins up to the user defined upper target limits. These limits can be set by the user manually at a point less than full capacity. This might occur for example if the store does not want to keep a full canister at a certain register so that a less than full capacity will be used as the upper limit. The levels are set by denomination and are displayed as a whole number of coins. The maximum threshold level would allow users to prevent excessive coin being held in the MDCD devices. A configurable lower level will prevent these devices from not being adequately filled.

The inventory of the media is maintained in real time by denomination for each MDCD device by solving a simple equation that inventory equals start position, minus used, plus reload.

The media tracking software provides for the generation of daily usage reports and displays same via the monitor or as prompted by a touch screen not shown, or prints them over printer 34 connected to the system through linkage 36. Optionally, weekly and long term reports would be available. Such reports might include a terminal by cashier inventory report which could show the sum of all cash dispensed transactions by a particular terminal by cashier and in transaction order. Another report could be a terminal media advance report showing the media added perhaps in full rolls only where coinage was the media involved. Yet another report would be a terminal by cashier detail report showing each cash dispense transaction reflected on the transaction log and shown by cashier sequentially. Still another report would be a so-called loan report which would provide loan data by terminal and/or cashier. All media in a MDCD device is considered part of the store inventory. All media dispensed is considered as a loan to the MDCD device or cashier depending on the store accountability. The report includes amounts for media loans. The store buy back is the sum of all dispensed media.

Still yet another report would be terminal inventory summary report, which would include the starting inventory for a particular MDCD device, the amount dispensed and the ending inventory amount for each terminal.

The media tracking software is further designed to allow the user to select individual MDCD devices for audit at any time. The audit period can be set in accordance with local store policy or as defined by remote policy. The audit period can be selected so as to randomly check each of the MDCD units so that over a given period of time all such units are checked. The software allows for the auditing party based on a physical observation, to type in the actual number of media dispensed at any given device and compare it to the value calculated by the software. The auditor would then select one of the two values either the actual or calculated and through the user interface reset the inventory level for that particular device.

At step 1414 in FIG. 19, the user is alerted to the need to replenish a level in a specific MDCD device and typically would make a recommendation as to the amount of media necessary to bring it up to an acceptable maximum level. The actual replenishment of the MDCD device can occur either manually or automatically through a cartridge filling device such as 32 in FIG. 18 in response to a command from the computer 10 as directed by the media tracking software.

Once again, various reports mentioned can be available through a network connection to the computer 10 over printer 34 also networked to the computer through connection 36.

The present embodiment of the invention can have application beyond the retail store command devices. For example, by monitoring a comparable data log emitting from an ATM or other bill dispensing device, and employing the same algorithm used by the ATM device to provide a denomination split in response to a cash request of a user, the inventory level of the ATM device can be maintained on a real time basis and alerts given when inventory levels are at or below the minimum threshold amounts.

Further, this embodiment has broader application to other paper media dispensing devices where value is provided to a customer as for example, gift certificates, postage stamps, royalty rewards and the like. Applying the tracking media software and the principles of this embodiment to such other media dispensing devices, the store's efforts in replenishing the items dispensed, real time tracking of the inventory of such items, and the auditing thereof are facilitated.

Once again, this embodiment allows management to predict its short falls in various media and anticipate its needs in an automatic way so as to minimize the impact of shortages as they might occur at each of such dispensing devices, thereby eliminating or at least minimizing the interruptions in customer service, minimizing or even eliminating the need to physically check the dispensing devices, except for audit, and reducing the time to refill or replenish such devices.

Still further, this embodiment may include within its breadth, applications where media dispensing devices, rather than containing within themselves necessary software responsive to a change back command, are essentially completely passive, that is they rely on the command device to direct the denomination split of the coinage and/or bills without inherit software to make such choices. The transaction log as interpreted by the tracking software, advised of the starting levels, could provide the present inventory of the MDCDs without the need to include in its processing the steps reflective of the algorithms employed by the MDCD.

And still further, the media tracking software of the present embodiment could interrogate the transaction log of those command devices associated with media accepting devices and discern the denominations received so as to continually update the media inventory.

Till Deposits

Tills are also known as cash registers and may refer to an entire cash register and/or the money tray(s) inside of a cash register. Till deposits or till collections may be identified to individual tills or collectively, as to a group of tills, such as, for example, at a single location, e.g., in a single kiosk. The systems and methods according to some aspects of the invention allow supervisors and/or other managers to perform multiple till deposits without logging off or logging out when each individual deposit till is made. The systems and methods, however, may automatically log out cashiers who make till deposits as soon as the till deposit has been made, thereby not permitting cashiers to make multiple till deposits at all or without logging off/out. The systems and methods according to this embodiment permit use of a number of different protocols for identifying till deposits and/or bank deposits. This permits acceptance of different IDs for the same deposit. This might include, for example, permitting deposits to be made with or without a leading zero identifying number for a till or other funds' deposit. The system also accounts for, and keeps track of unclaimed deposits, such as, for example, deposits made before logging in where the logging in process is delayed past a time allowed for logging in.

Bank Deposits

The systems and methods according to some aspects of this invention permit bank deposits to include checks. Information concerning checks can be provided to the payment media payment handling system using a deposit slip, for example, and the bank deposit made by the payment media handling system can include this check information, including amount of funds deposited by check, and in payment media. Moreover, the bank deposit information can be specified in terms of sales date. Additionally, the payment media handling apparatus dispensing bills may round down to the lowest number of straps that can be dispensed and dispense only full straps. The payment media handling system manages strap thresholds.

Reports, Audits, Safe Counts

The systems and methods according to some aspects of this invention may prepare, save, report and communicate payment media handling system inventories, audits, safe counts and similar activities. Inventory, audit, safe count and similar activity data can come from a variety of sources, including the payment media handling device deposit slip information, and can be tracked by the payment media handling system. For example, the payment media handling systems have the ability to keep track of rolls of coins and loose coins as well as bills. It can account for an emergency fund as part of a payment media handling system safe report, including fund analysis by denomination, period during which the funds were acquired, and/or dispensed, and by media type. Payment media handling systems may also account for both roll and loose change at any time they are within the payment media handling devices. The payment media handling system may also prepare daily activity reports (DARs) which report on, among other things, all payment media handling apparatus, starting inventory, start funds, deposits, bank deposits, safe inventory purges, cash advances, cash advance cap management, manual entries by users, etc. The reports may show these reported parameters by transaction, and present a summary which shows accumulated cash advances after each transaction. Safe Inventory Reports may also be prepared which show safe inventory by denomination, including the value of the notes (bills) and the number of notes (bills) in a note/bill storage unit which may be, for example, a Roll Storage Module (RSM). A typical safe inventory report shows an initial payment media handling apparatus inventory, an inventory of the notes dispensed, and an inventory of the funds remaining after funds have been dispensed.

For example a TCR Twin Safe™ dispenser suitable for use with embodiments of the invention has eight roll storage modules, each with a particular identification, e.g., roll storage module n, where n=1 to 8. Such reports can show the number of notes per denomination in the TCR Twin Safe™ device and/or the number of notes in each RSM or other receptacle or container, which may be a modular container. Add-to-Inventory Reports may also be prepared that show what denominations and value of each species was added to the TCR Twin Safe™ device inventory. The Add-to-Inventory reports may also indicate money placed in the TCR Twin Safe™ machine that is not associated with any register or till.

Moreover, the payment media handling system can take a real-time snapshot showing the contents of the payment media handling apparatus (e.g., TCR Twin Safe™ device) and report that snapshot individually, or collectively with other snapshots taken throughout a given period of time. Also, Purge/Empty Device Reports and Capacity Management Reports and/or Stock/Supply Reports may be generated. In a purge/empty report, typically performed late in the day, the system may determine how many bills are in the payment media handling apparatus, how many are expected, how much room is left to accommodate bills, per denomination, and to suggest what bills to withdraw to avoid an overflow.

For example, the payment media handling system may determine that there are 700 bills in the overflow receptacle and suggest that the overflow be purged. A Stock/Supply report is somewhat the reverse of a purge/empty report in that the system determines the number and denomination of notes that are needed to fill the needs of the store's tills and other units, e.g., refund desks, determine what bills are in the payment media handling apparatus at the start of the day, including, for example, the value and number of notes (bills) in each RSM (Roll Storage Module) that was purged (purged/emptied) previously, and put in what is needed. It should be noted that a roll storage module may include a roll of material, e.g., mylar, and bills/notes are stored between layers of the mylar. The payment media handling system can make localized and/or global corporate payment media handling apparatus capacity forecasts.

Among the audits performed by the payment media handling systems and methods is a Central Sales Audit, which is performed at a central location, and typically obtains information from a point of sale unit. Central Sales Audits like other audits, may be sent to local and/or remote management as a loss prevention tool. Moreover, any audit report or other report generated by the payment media handling system may be retained in a particular payment media handling system for a specified number of days and then backed up and or sent elsewhere for further storage. The payment media handling system may be programmed to backup and purge reports and audits on a periodic basis. The payment media handling system may be a centrally located system and perform backups for other payment media handling systems.

Information gathered by the payment media handling system is used in the central sales audit. Data used in the Central Sales Audit includes data concerning every funds' transfer, and every entity associated with that transfer, including deposits made from the same team member/cashier along with the time of day each deposit was made. Such data also includes status reports such as, for example, which payment media handling apparatus receptacles are full or empty or near full or near empty. This data is also used in Audit Trail Reports, which show details about every deposit and other funds' transfer made by every entity (which includes people, registers, tills, etc), including the time of day of the transfer. The payment media handling system also prepares a daily activity report (DAR) for the payment media handling system which includes data concerning starting inventory, start funds, till deposits, bank deposits, safe inventory purges, safe inventory stockings, advances, cap management, manual entries made, etc. The daily activity report shows activities by transaction type, time made, by what entity made, and gives a summary of activities by transaction.

Advances

The systems and methods according to some aspects of this invention also make advances from the safe portion of a payment media handling apparatus to the dispensing portion of a payment media handling apparatus and analyze the payment media advances in terms of denomination, time period during which the advances occurred, and by payment media, media type.

Payment Media Management Database Information

Systems and methods also include preparation and saving of desirable payment media management information, such as, for example, lists of legal tills or cash registers, and/or active and inactive registers, for one or more retail operations, lists of breakdowns of money denominations and species that make up CIT (e.g., armored car) and/or back deposits; starting inventories of tills; lists of POS transactions associated with tills; legitimate sales dates; special sales dates; etc. A validated list of registers or tills, for example, would permit payment media handling system methods which "allow" or "disallow" certain transactions such as, for example, case withdrawals or start fund allotments, or transactions made on "closed" business days, or after-hours transactions. Funds may be tracked by cashier and/or register providing a method to promote cashier accountability. A Point of Sale feed to the payment media handling system can provide data such as, for example, the amount of money that needs to be deposited by a certain till or cashier, which is useful in providing this tracking. Additional payment media management information may include point of sale (POS) feeds for cashier accountability. This, for example, would provide a feed from a point of sale terminal to the payment media handling system to determine an amount of currency that needs to be deposited for each register or till. Additional payment media management information may include a breakdown of mixed currency denominations during a bank deposit, e.g., showing it on a payment media handling apparatus user screen. Additional payment media management information may include every till deposit made from each team member, including the time of day the till deposit was made. Such information can also include an inventory having a breakdown of mixed bank denominations, usually kept in the overflow container or receptacle, e.g., RSM, during performance of a bank deposit function by a payment media handling apparatus.

Plural Machines, Plural Operations

The systems and methods according to this invention may involve management of more than one retail operation within a given store, e.g., grocery and clothing operations in a single store, by a single payment media handling system, and/or management of more than one retail store, e.g., closely situated stores, by the same payment media handling system. Moreover, the systems and methods provide for using multiple payment media handling apparatus and/or systems in a single retail operation or store, as well as using a single payment media handling system and/or machine for plural retail operations or stores, or floors or other units, physical or operational, within a given store. The systems and methods of this invention may provide a single system that maintains the integrity of inventory for more than one retail store or more than one type or retail operation in the same store.

Enhanced Communications

The systems and methods according to this invention may provide enhanced network communication functions among payment media handling apparatus, safes, front offices, back offices, remotely located personnel and operations; auditing trail communication, supervisory notifications, etc. A payment media handling system supports connectivity to other systems within the retail business or armored car or any other third party's business, and permits publication of payment media management data electronically via local area networks, wide area networks, intranets, and internets. Intranet and extranet connections that enable the payment media handling system to update cash-office and/or media-management system(s) can be launched manually or automatically. For example, the payment media handling system may have bank deposits of $500.00 that are reported to management, or to a third party, such as, for example, a CIT, or the machine can be accessed by till accounts, bank deposits, and can be tapped for funds issuing events, such as, for example, till funds and floats. Whereas a single computer may be used for the payment media handling system and cash-office and/or media-management system(s), multiple computers may be connected to one another as part of a complete payment media handling solution. A centralized dedicated audit computer may be used with the interconnections mentioned. Moreover, with networked computers, a supervisor can be contacted over a network, although supervisors can be contacted in other ways, e.g., telephone (wired and/or wireless). Moreover, by having network connectivity, reports generated by any computer connected to the network(s) can be distributed to and/or accessed by other computers on the network. For example, reports generated by the payment media handling system can be copied to a central server and/or data repository to allow reports to be retrieved and/or viewed online.

Any reports can be accessed online. For example, the payment media handling system reports can be copied to a central server and/or data repository to allow reports to be retrieved and viewed online.

Networking also permits electronic connections with other systems including, for example, point of sale (POS) systems, payment media management systems, cash offices, CITs (e.g., armored car services), sales audit systems and loss prevention systems. The payment media handling system can be electronically connected with other systems, such as, for example, point of sale systems, various payment media management systems, various cash office systems, CITs, various sales audit systems and various loss prevention systems.

Networking also permits real-time notifications and advisories to be sent to store management and third parties regarding current balance, forecasted balance, and requests for replenishment and bank deposits, overflow prevention, as well as any other events requiring attention, as needed. For example the payment media handling system can proactively communicate with a member of management when all or part of an payment media handling apparatus becomes full. This notification can tale place using any suitable communication technique(s) or system including, for example, a page, SMS, RF, fax, e-mail, etc. Additionally, payment media handling apparatus openings can be reported, and predetermined individuals can be notified using any suitable communication technique(s). Also, the payment media handling system can call a bank or CIT provider for change orders, and those third party entities can communicate with the payment media handling system. The payment media handling system also provides for confirmation of all bank and CIT deposits using suitable communication technique(s). Communications can take place with entities and items in the payment media handling system as well as outside of the payment media handling system.

Within some larger retail establishments, in addition to their own retail activities, other concessions may be present. Such additional concessions include, for example, children's rides, dry cleaners, photo processing, coin counting and exchange facilities, small shops etc. Such concessions are typically much smaller than the retailer and turn over smaller volumes of value media, e.g., payment media.

It is not always in the interest of such small retailers to invest in payment media counting equipment and they will typically count and reconcile takings manually. In the case of coin counting and exchange facilities, the deposited coin is often collected on a regular basis by a third party. A similar and equally applicable situation to that described above includes the example of a mall or shopping center having a single "back office" facility that numerous small or large retailers can use.

The systems and methods according to some aspects of this invention provide for a much more efficient reuse of the coin or other media generated by the various concessions and the retailer, and obviate any additional strain put on back office activities. The systems and methods utilize the counting of multiple third party media and management of multiple third party media find requirements in addition to that/those of the retailer. In one exemplary embodiment, when a third party wishes to deposit/obtain funds etc., the third party may be required to login and identify themselves, such as, for example, by using a PIN number, smart card, magnetic stripe card, or other suitable means. Once logged in, any third party transaction is reconciled against that party's account. Following the transaction a receipt may be issued to the third party which shows the nature and value of the transaction. Such a receipt may be issued by any number of means including, but not limited to, one or more of a physical printout, an email, fax, or other type of report.

A third party may carry out any of the transactions described previously such as making deposits, obtaining start funds, obtaining change etc. By using the fund media more efficiently for both the retailer and one or more third parties the systems and methods according to this invention may reduce the need for, or number and/or sizes of, payment media collections and deliveries by CIT. This benefits both the retailer and the third parties.

Additionally the retailer may impose a service charge to the third parties, such as, for example, concessionaires, for allowing them access to the retailer's "back office" facilities. The payment media handling system can be programmed to provide such features. Thus the retailer gains benefit from both the cost savings due to increased efficiency and a new revenue source.

Moreover, third parties depositing additional funds media include members of the public making a deposit into their bank accounts. The systems and methods provide for customers to make their deposits at the point of sale or in a retailer's "back office". For example, one exemplary embodiment provides for a customer to pay checks or payment media into their personal bank account(s) whilst they pay for their goods at a point of sale device or till. In one exemplary embodiment, in order to do this, the customer may be required to identify both themselves and the details of their bank account. In one exemplary embodiment, this can be done via a bank account deposit slip and/or by presenting a bank account card.

Deposited checks and/or payment media may be stored along with any other funds media in the till. The electronic point of sale (EPOS) data in the payment media handling system retains details of the transaction and ensures that the customer's account is credited with the correct amount.

In another exemplary embodiment, the traditional payment media "back office" is made directly or indirectly accessible to the customer who can then interface directly with "back office" funds dispensing/collecting apparatus. A user may be required to log in via a PIN number, or bank account card, in much the same manner as the retailer would. The login process identifies the users and their banking details and enables the user's "back office" transaction to be reconciled against their account(s). A user who carries out a "back office" transaction may be issued a receipt, as before. The "back office" apparatus may have one or more interfaces for public use and one or more interface for use by the retailer and/or other third party retailers.

The systems and methods reduce and/or eliminate labor expenses associated with this managing of such additional transactions by the retailer which would otherwise result in a significant increase in the cost of the back office activity. The systems and methods result in no significant additional workload and, therefore, the result is limited additional cost to the retailer. Moreover, the retailer may charge the customer or the customers' bank a charge for providing any such service, thus creating additional revenue for the retailer.

In another exemplary embodiment, the customer may pay into a customer's savings or "Christmas" club at the till and/or "back office."

The systems and methods of some aspects of this invention also provide communication between and among surveillance devices, such as, for example, between and among closed-circuit television cameras (CCTVs).

Foreign Currencies

The systems and methods according to some aspects of this invention also include-foreign-currency conversion and currency handling, e.g., in certain locations, e.g., in retail locations near foreign countries, banking centers, etc. The payment media handling systems are able to maintain current foreign currency inventories with exchange rate displays showing local currency values, as well as screens to show types, denomination, numbers and total value of bills/notes in current inventory. The payment media handling system can automatically feed currency conversion factors to payment media handling apparatus for display and use.

The systems and methods also provide for setting aside one or more of the roll storage modules (RSMs) in a TCR Twin Safe™ or other payment media storage unit for foreign currency(ies).

Error Detection and Notification

The systems and methods also may involve methods, including pre-programmed error detection and correction schemes, user interface menus, scripts or other guidance to facilitate overcoming malfunctions of payment media handling apparatus, as well as communication of malfunction status to responsible parties, e.g., police officials, maintenance technicians, supervisors, customers, etc. Device jams and other malfunctions can be detected and appropriate self-diagnostics and self-correcting actions taken, as well as the showing of slide shows and/or videos instructing users what actions to take to remedy and/or circumvent the malfunctions. For example, a slide show or video may indicate to a user that when a jam occurs, the already dispensed finds must be re-inserted into the payment media handling apparatus before another advance will be dispensed, and can indicate what authority level a user needs to be advanced more funds. Additionally, notification of maintenance personnel, security personnel and others may also take place. Moreover real-time notification and advisories are provided by the payment media handling system to store management and third parties regarding current balance, forecasted balance, requests for action such as, for example, requests for replenishment of a payment media handling apparatus, bank deposits and any other events and items which need attention.

User Friendly Characteristics

The systems and methods according to some aspects of this invention also provide user friendly characteristics of payment media handling system facilities, devices, and methods. This may include, for example, one or more touch screens mounted on a kiosk, wherein the touch screens have a number of user configurable and/or definable format schemes, looks, and mounting configurations, and are accessible from many, including all, sides of the kiosk, a calculator interface feature to enter numeric information such as, for example, till numbers in different formats for the same till, provision for full or truncated register numbers when depositing funds, such as, for example, "011" and/or "11", screen configuration change-ability, and/or a number of device and/or screen orientations so a user may access an payment media handling apparatus from a number of different user orientations.

The payment media handling apparatus may have not only one or more locks with keys, but also, or alternatively, digital or cipher or other electronic locks on the machine that require no physical key, including on the drop safe door portions thereof. Moreover, the drop safe door of a payment media handling apparatus may have one or more slots for rejected notes or bills. If the machine rejects bills or notes, the rejected notes may be placed in the rejected notes slot. In this regard, as noted herein, an electronic keypad can be provided separately or as part of a touch screen, for example, to enter the number and value of rejected notes into the payment media handling system. Additionally, an payment media handling apparatus can be designed to resemble an automatic teller machine, for example.

The systems and methods may permit withdrawals from payment media handling apparatus by personnel other than cashiers using established procedures, authorization levels, etc. For example, supervisors and/or managers may be allowed to issue start funds for multiple entities. The system may allow supervisors of a particular payment media handling apparatus machine and/or other management personnel to issue start funds for multiple entities without having to log in each time. Cashiers may be permitted to sign off after a funds dispense by simply using a touch screen to hit a cancel button to sign off completely without going through a more lengthy sign off procedure after pressing "log-off", for example. The payment media handling system completes the logoff after the "cancel" button is touched.

The current payment media handling may be used with individuals who have had little or no training in using the system. To this end, the payment media handling system interface is designed to be user friendly and simple to use. Moreover, the interface is designed so that the user spends as little time as possible at the apparatus carrying out a transaction.

A significant loss of time sometimes occurs when a user is required to make a decision. Various exemplary embodiments of the systems and methods of this invention have been configured so that as few decisions as possible are needed to be made by a user to accomplish a funds transaction.

However there will still be instances where a user must choose between two or more events. For example, users may be asked to confirm they have finished a transaction or asked if they wish to proceed with another transaction. Such a request may cause confusion and may result in time being wasted.

The inventors have recognized that in the majority of instances, one of two or more options will be selected and the selection of the alternative(s) is very much the exception. The systems and methods of some aspects of this invention facilitate user decisions using means that highlight, and/or provide preferred choices and/or set default choices for, the most commonly selected option(s). The highlighting means may be visual, tactile or audible. The systems and methods of the invention also use smart processing to guide a user through the decision making process.

In other exemplary embodiments, the payment media handling system interface is provided with a means to determine what the preferred selections are for each transaction type. This determination may be based on historical data captured from actual use of payment media handling devices. The interface may set default choices which may be installed periodically and/or during manufacture of the payment media handling device.

In other exemplary embodiments, a store may be able to define the preferred selections based on their empirical knowledge. A store may alter prescribed and/or default selections on a pre-selected periodic, or an "ad hoc" basis.

As an example, a store may wish to introduce a new step in its Start Fund process. Various exemplary embodiments of the systems and methods of this invention achieve this new step introduction with the aforementioned default setting procedure and/or with the aforementioned highlighting and/or predetermined choice guidance. Normally such a change would require retraining of staff to make them aware of the new step. However, various exemplary embodiments of this invention permit the user to be guided through the steps by the interface, e.g., by the highlighting of preferred selections. As a result, when users see a new selection they may just follow the highlighted selections and need no personalized training in using the interface.

Obviously if user does not agree with a highlighted step or has doubt about how to proceed, that user will have to make a conscious decision not to follow a highlighted or default or recommended selection.

In various exemplary embodiments of the systems and methods of the invention, a highlighted or recommended or default selection may be made from a remote location such as a head office, in a similar manner as it can be made in the store. Highlighted or recommended or default selections may also be determined based on user behavior. Typically a user must login and, as such, is identifiable to the payment media handling system. The payment media handling system can therefore build up a picture of user activity and highlight those choices the user usually makes. Moreover, if the payment media handling system determines that a user is selecting a non-highlighted, or not-recommended, or non-default option(s) one reason may be that users are confused by the interface. In various exemplary embodiments, the payment media handling system may notify a supervisor or other store personnel to spend some time with users and provide them some training in using the payment media handling system. In other exemplary embodiments, the payment media handling system interface may makes a highlighted or preferred or default selection even more obvious to the user by, for example, increasing the brightness of the color, volume of the warning, or making the highlighted selection flash on and off.

Security Measures

The systems and methods according to some aspects of this invention provide audit and audit trail generation, physical security measures, and methods of dealing with payment media shortages and payment media management errors. This may include register activity exception reporting, e.g., using exception based reporting rules, printing and displaying only if exceptions exist, e.g., if there is a missing deposit, a missing start fund, an overage or shortage that is out of predetermined tolerance, etc. The system also provides for back up of any data or other information in the system locally and/or at a central office or other location. Data relating to recovery from faults can also be captured and backed up. Register exception reporting rules can also be utilized. For example, the system may print and display information only if exceptions exist such as, for example, a deposit is missing, a start fund is missing, an out of tolerance condition exists for an overage or shortage, etc. As another example, a register may normally have a shortage and clearing fund, and when one is missing, or the register has been credited with two instead of one, an error is generated and displayed and/or printed.

The systems and methods also may provide methods of dealing with and/or reacting to security incidents, including robberies, alarms (including false alarms), jams, to include agendas, scripts, lockdowns, notification of authorities, supervisory notifications, etc. For example, the payment media handling system may provide for changing a user password, e.g., PIN, at predetermined time intervals, say every 90 days, or at randomly selected time intervals, or upon the occurrence of a specific event, such as, for example, a robbery, or POS password change. The password changes may be initiated over the network, for example. The system may accommodate passwords which never expire, or which expire upon certain incidents or after a specified period of time, for example. The system can also be linked with a central login system of a retail store.

A special robbery fund feature can involve dispensing a special "robbery fund" on a special request. A robbery fund may, for example, provide for dispensing a few large denominations at first, then a sequence of smaller denominations and end with a few larger denominations. Robbery funds, which may include messages such as "out of cash", are designed to trick a thief into believing that the thief has taken all of the remaining payment media from a payment media handling apparatus. Actions may also include triggering an alarm. A security event may include, for example, any safe opening. Alarm and other security events may be communicated to management member(s) using any known reasonable communication method, including network communications, pagers, wireless telephones, email, fax, sirens, SMS (short message service), cellular phone text messages, etc. Moreover, a payment media handling device alarm may be integrated into a local alarm via the payment media handling system.

The various processes described herein can be utilized to provide an intelligent, payment media handling solution for the retail back office. They enable a payment media handling apparatus to provide a user friendly, intelligent and versatile interface. The apparatus also greatly increases the security, and efficiency of the back office activity.

What is claimed is:

1. A method of electronically managing payment media, the method comprising:
   determining an amount of payment media dispensed from a payment media dispensing device, based on electronic point-of-sale data received from a point-of-sale register associated with the payment media dispensing device;
   determining an inventory amount of the payment media remaining in the payment media dispensing device based on the determined amount of payment media dispensed from the payment media dispensing device; and
   automatically determining a refill amount based on a comparison of the inventory amount to a maximum desired amount of the payment media to be contained in the payment media dispensing device,
   wherein the maximum desired amount is adjustable based on at least one of:

rules stored in a look-up table independent of the payment media dispensing device; and data received remotely.

2. The method of claim 1, wherein the step of determining the inventory amount also is based on a start amount of the payment media contained in the payment media dispensing device prior to dispensing the payment media.

3. The method of claim 1, further comprising:
automatically determining that a refill operation should be performed for the payment media dispensing device based on the determined inventory amount.

4. The method of claim 3, wherein it is automatically determined that the refill operation should be performed by comparing the determined inventory amount to a predetermined payment media level.

5. The method of claim 4, wherein the payment media dispensing device contains at least one of currency bills and coins of different denominations, and the comparing step is performed for each of the different denominations.

6. The method of claim 3, further comprising:
automatically determining the refill amount when it is determined that the refill operation should be performed.

7. The method of claim 6, wherein the payment media dispensing device contains at least one of currency bills and coins of different denominations, and the refill amount is determined for each of the different denominations for which the refill operation should be performed.

8. The method of claim 3, further comprising:
issuing an alert that the refill operation should be performed when it is determined that the refill operation should be performed.

9. The method of claim 8, wherein the alert is issued on a display screen.

10. The method of claim 1, wherein the refill amount is automatically determined at least at one of an end of a shift and a beginning of a shift of a cashier that operates the point-of-sale register.

11. The method of claim 1, wherein the maximum desired amount is set by a person other than an operator of the point-of-sale register with which the payment media dispensing device is used.

12. The method of claim 1, wherein the maximum desired amount is a full capacity amount of the payment media dispensing device.

13. The method of claim 1, wherein the payment media dispensing device contains at least one of currency bills and coins of different denominations, and the refill amount is determined for each of the different denominations.

14. The method of claim 1, wherein the inventory amount is determined each time that the payment media dispensing device dispenses the payment media.

15. The method of claim 1, wherein the inventory amount is determined at intermittent intervals.

16. The method of claim 1, wherein the method is performed for a plurality of payment media dispensing devices located within a place of business.

17. The method of claim 1, wherein the method is performed for a plurality of payment media dispensing devices disposed in different buildings.

18. The method of claim 1, wherein the payment media dispensing device is a passive device that does not generate data regarding the payment media dispensed from the payment media dispensing device.

19. The method of claim 1, further comprising:
providing reports based on the point-of-sale data, the reports being at least one of printed and displayed.

20. The method of claim 1, wherein the payment media dispensing device also is capable of accepting payment media from a customer.

21. The method of claim 1, wherein the payment media includes coupons.

22. The method of claim 1, wherein the payment media includes coins.

23. The method of claim 1, wherein the payment media includes currency bills.

24. A computer program product for use in a system that includes a computer, a payment media dispensing device and a point-of-sale register that is electronically linked to the payment media dispensing device, the computer being electronically linked to the point-of sale register via a network, the computer program product comprising a computer-readable recording medium that stores instructions that are executable by the computer for causing the computer to:
determine an amount of payment media dispensed from the payment media dispensing device, based on electronic point-of-sale data received from the point-of-sale register;
determine an inventory amount of the payment media remaining in the payment media dispensing device based on the determined amount of payment media dispensed from the payment media dispensing device; and
automatically determine a refill amount based on a comparison of the inventory amount to a maximum desired amount of the payment media to be contained in the payment media dispensing device,
wherein the instructions include instructions that enable the maximum desired amount to be adjustable based on at least one of: rules stored in a look-up table independent of the payment media dispensing device that is accessible to the computer; and data received remotely from the computer.

25. The computer program product of claim 24, wherein the instructions to determine the inventory amount determine the inventory amount based on a start amount of the payment media contained in the payment media dispensing device prior to dispensing the payment media.

26. The computer program product of claim 24, wherein the computer program product further comprises instructions to:
automatically determine that a refill operation should be performed for the payment media dispensing device based on the determined inventory amount.

27. The computer program product of claim 26, wherein it is automatically determined that the refill operation should be performed by comparing the determined inventory amount to a predetermined payment media level.

28. The computer program product of claim 27, wherein the payment media dispensing device contains at least one of currency bills and coins of different denominations, and the comparing step is performed for each of the different denominations.

29. The computer program product of claim 26, wherein the computer program product further comprises instructions to:
automatically determine the refill amount when it is determined that the refill operation should be performed.

30. The computer program product of claim 29, wherein the payment media dispensing device contains at least one of currency bills and coins of different denominations, and the refill amount is determined for each of the different denominations for which the refill operation should be performed.

31. The computer program product of claim 26, wherein the computer program product further comprises instructions to:

issue an alert that the refill operation should be performed when it is determined that the refill operation should be performed.

32. The computer program product of claim 24, wherein the instructions cause the refill amount to be automatically determined at least at one of an end of a shift and a beginning of a shift of a cashier that operates the point-of-sale register.

33. The computer program product of claim 24, wherein the instructions include instructions to prompt a person other than an operator of the point-of-sale register with which the payment media dispensing device is used to set the maximum desired amount.

34. The computer program product of claim 24, wherein the payment media dispensing device contains at least one of currency bills and coins of different denominations, and the refill amount is determined for each of the different denominations.

35. The computer program product of claim 24, wherein the instructions cause the inventory amount to be determined each time that the payment media dispensing device dispenses the payment media.

36. The computer program product of claim 24, wherein the instructions cause the inventory amount to be determined at intermittent intervals.

37. The computer program product of claim 24, wherein the instructions cause the inventory amount to be determined for a plurality of payment media dispensing devices.

38. The computer program product of claim 24, wherein the computer program product further comprises instructions to provide reports based on the point-of-sale data.

39. The computer program product of claim 24, wherein the payment media includes coupons.

40. The computer program product of claim 24, wherein the payment media includes coins.

41. The computer program product of claim 24, wherein the payment media includes currency bills.

* * * * *